(12) United States Patent
Matsui et al.

(10) Patent No.: US 10,929,042 B2
(45) Date of Patent: Feb. 23, 2021

(54) DATA STORAGE SYSTEM, PROCESS, AND COMPUTER PROGRAM FOR DE-DUPLICATION OF DISTRIBUTED DATA IN A SCALABLE CLUSTER SYSTEM

(71) Applicant: HITACHI, LTD., Tokyo (JP)

(72) Inventors: Yuko Matsui, Los Gatos, CA (US); Mitsuo Hayasaka, Tokyo (JP); Christopher James Aston, High Wycombe (GB); Jonathan Smith, Bracknell (GB); Daniel Picken, Sunnyvale, CA (US); James Gibbs, Wokingham (GB); Simon Crosland, Woking (GB)

(73) Assignee: HITACHI, LTD., Tokyo (JP)

( * ) Notice: Subject to any disclaimer, the term of this patent is extended or adjusted under 35 U.S.C. 154(b) by 137 days.

(21) Appl. No.: 16/304,727

(22) PCT Filed: Oct. 20, 2016

(86) PCT No.: PCT/US2016/057849
§ 371 (c)(1),
(2) Date: Nov. 27, 2018

(87) PCT Pub. No.: WO2018/075042
PCT Pub. Date: Apr. 26, 2018

(65) Prior Publication Data
US 2019/0278504 A1      Sep. 12, 2019

(51) Int. Cl.
*G06F 16/00* (2019.01)
*G06F 3/06* (2006.01)
*G06F 16/215* (2019.01)

(52) U.S. Cl.
CPC ............ *G06F 3/0641* (2013.01); *G06F 3/067* (2013.01); *G06F 3/0608* (2013.01); *G06F 3/0659* (2013.01); *G06F 16/215* (2019.01)

(58) Field of Classification Search
CPC .... G06F 16/215; G06F 3/0641; G06F 3/0608; G06F 3/0659; G06F 3/067
See application file for complete search history.

(56) References Cited

U.S. PATENT DOCUMENTS

| 7,778,972 B1 * | 8/2010 | Cormie | ............. H04L 29/08135 |
| | | | 707/626 |
| 8,171,065 B2 * | 5/2012 | Slik | ........................ G06F 16/164 |
| | | | 707/822 |

(Continued)

OTHER PUBLICATIONS

International Search Report of PCT/US2016/057849 dated Jan. 17, 2017.

*Primary Examiner* — Jean M Corrielus
(74) *Attorney, Agent, or Firm* — Mattingly & Malur, PC

(57) ABSTRACT

A data de-duplication in a distributed storage of data objects in a cluster system, in which plural data objects are distributed across a group of node apparatuses and stored in units of data blocks. Each metadata structure including a root metadata node and one or more direct metadata nodes, and optionally including one or more indirect metadata nodes; and a metadata object is stored for managing de-duplicated data blocks based on a metadata structure of the metadata object wherein at least one direct metadata node of the metadata structure of the metadata object includes a block reference pointing to a de-duplicated data block being associated with two or more data objects. Preferably, each of the metadata structures of the two or more data objects being associated with the de-duplicated data block includes a respective direct metadata node including an object reference to the metadata structure of the metadata object.

14 Claims, 20 Drawing Sheets

(56) References Cited

U.S. PATENT DOCUMENTS

| | | | |
|---|---|---|---|
| 9,015,150 B2* | 4/2015 | Raghavan | G06F 16/248 |
| | | | 707/722 |
| 9,710,407 B2* | 7/2017 | Oikarinen | G06F 13/18 |
| 9,753,848 B2* | 9/2017 | Barrall | G06F 12/0246 |
| 9,891,860 B1* | 2/2018 | Delgado | G06F 3/0689 |
| 9,996,286 B2* | 6/2018 | Hayasaka | G06F 3/065 |
| 10,031,672 B2* | 7/2018 | Wang | G06F 3/065 |
| 10,296,219 B2* | 5/2019 | Wang | G06F 3/0608 |
| 2010/0042790 A1 | 2/2010 | Mondal et al. | |
| 2014/0331011 A1* | 11/2014 | Kesavan | G06F 16/17 |
| | | | 711/133 |
| 2016/0162509 A1 | 6/2016 | Berrington et al. | |
| 2016/0210054 A1* | 7/2016 | Frank | G06F 12/0877 |
| 2016/0350006 A1* | 12/2016 | Wang | G06F 3/067 |
| 2016/0350325 A1* | 12/2016 | Wang | G06F 3/067 |
| 2017/0329541 A1* | 11/2017 | Hayasaka | G06F 12/0811 |
| 2018/0267985 A1* | 9/2018 | Badey | G06F 16/184 |
| 2018/0285002 A1* | 10/2018 | Hayasaka | G06F 3/0619 |

* cited by examiner

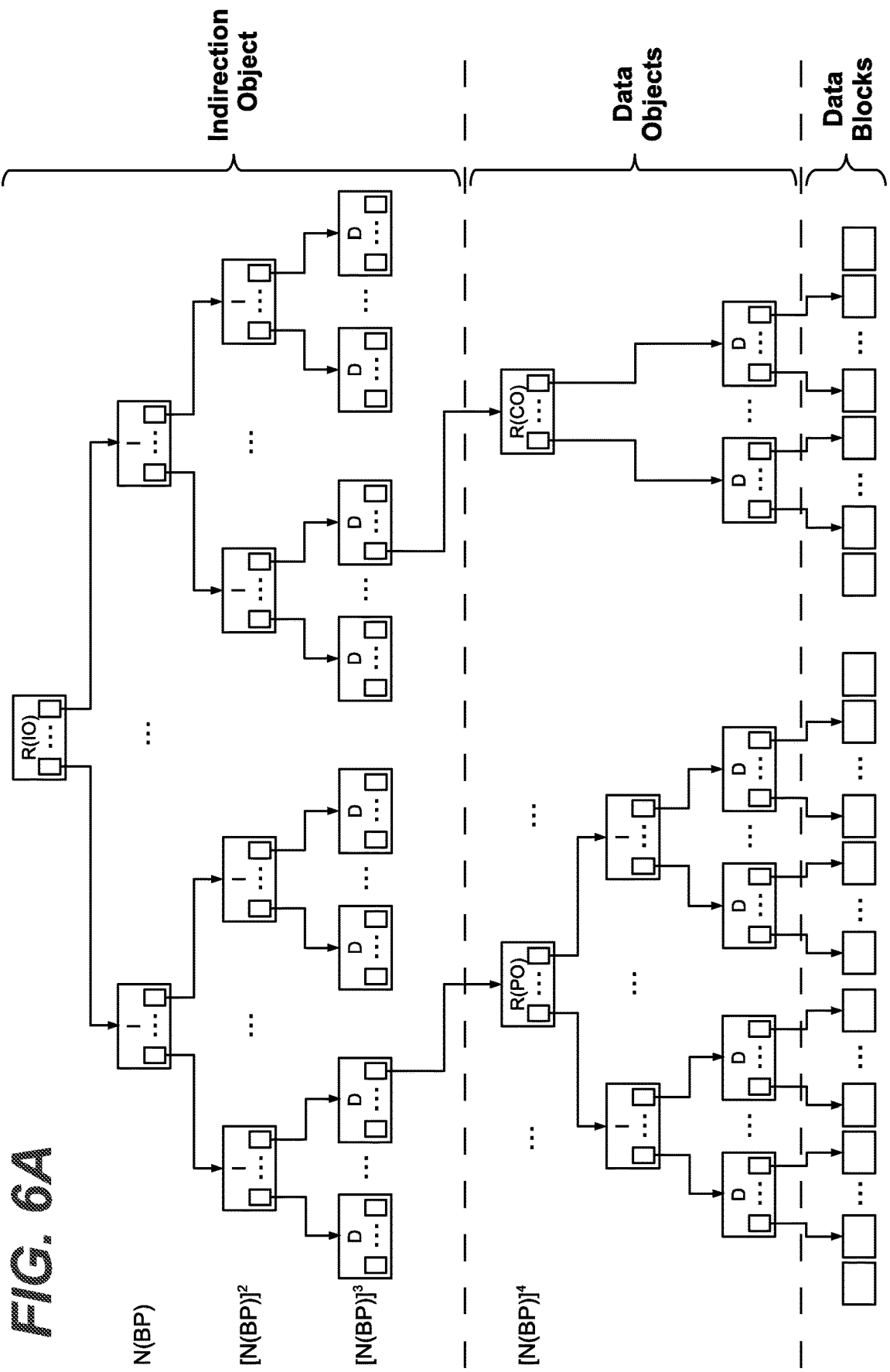

DATA STORAGE SYSTEM, PROCESS, AND COMPUTER PROGRAM FOR DE-DUPLICATION OF DISTRIBUTED DATA IN A SCALABLE CLUSTER SYSTEM

The present disclosure relates to a data storage system and/or a data storage apparatus connectable to one or more host computers, and in particular a data storage system and/or a data storage apparatus processing I/O requests.

The present invention specifically relates to a data storage system including a cluster system of a plurality of node apparatuses storing data objects in a distributed manner across the node apparatuses of the cluster system and the handling of I/O access requests to the data objects.

Data objects may relate to objects of a file system (such e.g. as files and directories to allow for I/O file access to data objects being file system objects) and/or logical or virtual volumes (such as e.g. LUs to allow for I/O block access to data objects being logical or virtual volumes), or other types of data objects.

Further, the present disclosure relates to methods of control of such data storage system and/or a data storage apparatus. Other aspects may relate to computer programs, computer program products and computer systems to operate software components including executing processing I/O requests at such data storage system and/or a data storage apparatus.

BACKGROUND

In the prior art, it is known to manage I/O requests from clients to data stored in units of blocks on storage devices of a storage apparatus based on a metadata tree structure including a root node directly or indirectly pointing to blocks e.g. via indirect nodes pointing to direct nodes and via direct nodes pointing to blocks of data, e.g. in connection with a log write method which writes modified data to newly allocated blocks.

Below, some potential objects are described. Exemplary embodiments and aspects as described in the following may be proposed to solve one, more or all of the below objects.

It is an object of the present invention to provide aspects in a data storage system in which a cluster system of plural node apparatuses is enabled to manage I/O access to one or more data objects distributed across a plurality of node apparatuses and is, at the same time efficiently and reliably enabled to perform de-duplication of data across one or more node apparatuses.

It is an object of the present invention to provide aspects in a data storage system, which provides an efficient and reliable scale-out approach in which a cluster system of plural node apparatuses is enabled to manage I/O access to one or more data objects distributed across a plurality of node apparatuses and is, at the same time efficiently and reliably enabled to perform de-duplication of data across one or more node apparatuses.

It is another object of the present invention to provide aspects in a data storage system, which allows to efficiently and reliably manage the I/O access independent of data location in the cluster system enabled to perform de-duplication of data across one or more node apparatuses.

It is yet another object of the present invention to provide aspects in a data storage system, which allows to efficiently and reliably allow for rebalancing and redistributing of data across node apparatuses of the cluster system by being, at the same time, enabled to perform de-duplication of data across one or more node apparatuses.

SUMMARY

According to the invention, for solving one or more of the above objects, there is proposed a computer program, a method and a data storage system according to independent claims. Dependent claims related to preferred embodiments.

According to exemplary aspects, there may be provided a computer program including instructions to cause a computer to execute a method for managing a data storage system.

The method may comprise: storing plural data objects to one or more storage devices of the data storage system in units of blocks; managing (processing) I/O access to the plural data objects based on metadata structures being respectively provided for each data object, each metadata structure including a root metadata node and optionally including one or more direct metadata nodes, and optionally further including one or more indirect metadata nodes; and/or storing a (first) metadata object for managing de-duplicated data blocks based on a metadata structure of the (first) metadata object including a root metadata node and optionally including one or more direct metadata nodes, and optionally further including one or more metadata indirect nodes.

According to some exemplary preferred aspects, at least one direct metadata node of the metadata structure of the (first) metadata object includes a block reference pointing to a de-duplicated data block being associated with two or more data objects.

According to some exemplary preferred aspects, the method may be further comprising: storing a de-duplication database storing hash values corresponding to data blocks being associated with data objects stored in the data storage system. Preferably, upon receiving a request to write a new data block for a target data object, the method may further comprise: calculating a hash value for the new data block, searching the calculated hash value in the stored de-duplication database, and/or determining whether a duplicate data block corresponding to the new data block is already stored in the data storage system, for example, based on a result whether a matching hash value exists in the de-duplication database.

According to some exemplary preferred aspects, at least one direct metadata node of the data object includes a block reference pointing to a data block being associated with the respective data object, and/or direct metadata nodes of the metadata structure of the first metadata object (e.g. a de-duplication object) only include block references pointing to de-duplicated data blocks being associated with two or more data objects.

According to some exemplary preferred aspects, if it is determined that a duplicate data block corresponding to the new data block is not yet stored in the data storage system, the method further comprises: newly writing the data block, and writing or updating at least one direct metadata node of the target data object to include a block reference pointing to the newly written data block.

According to some exemplary preferred aspects, if it is determined that a duplicate data block corresponding to the new data block is already stored in the data storage system and the duplicate data block is pointed to by a direct metadata node of another data object, the method further comprises: writing or updating at least one direct metadata node of the first metadata object to include a block reference pointing to the duplicate data block, updating at least one direct metadata node of the other data object to include an object reference to the first metadata object to indirectly reference the duplicate data block, and/or writing or updating at least one direct metadata node of the target data object to include an object reference to the first metadata object to indirectly reference the duplicate data block.

According to some exemplary preferred aspects, if it is determined that a duplicate data block corresponding to the new data block is already stored in the data storage system and the duplicate data block is pointed to by a direct metadata node of the first metadata object, the method further comprises: writing or updating at least one direct metadata node of the target data object to include an object reference to the first metadata object to indirectly reference the duplicate data block.

According to some exemplary preferred aspects, direct metadata nodes of data objects only include object references pointing to the metadata structure of the metadata object, and at least one direct metadata node of the metadata structure of the first metadata object (holding object) includes a block reference pointing to a data block being associated with only one data object.

According to some exemplary preferred aspects, if it is determined that a duplicate data block corresponding to the new data block is not yet stored in the data storage system, the method further comprises: newly writing the data block, writing or updating at least one direct metadata node of the first metadata object to include a block reference pointing to the newly written data block, and/or writing or updating at least one direct metadata node of the target data object to include an object reference to the first metadata object to indirectly reference the newly written data block.

According to some exemplary preferred aspects, if it is determined that a duplicate data block corresponding to the new data block is already stored in the data storage system, the method further comprises: writing or updating at least one direct metadata node of the target data object to include an object reference to the first metadata object to indirectly reference the duplicate data block.

According to some exemplary preferred aspects, the method may further comprise: storing a second metadata object for managing reference counts of data blocks based on a metadata structure of the second metadata object including a root metadata node and optionally including one or more direct metadata nodes, and optionally further including one or more metadata indirect nodes. Preferably, at least one direct metadata node of the metadata structure of the second metadata object may include a block reference pointing to a data block storing information indicative of a reference count of a certain data block pointed to by a direct metadata node of the first metadata object.

According to some exemplary preferred aspects, the respective direct metadata node of the metadata structure of the second metadata object and the respective data block storing information indicative of the reference count of the certain data block pointed to by the respective direct metadata node of the first metadata object are stored on a same node apparatus in the data storage system as the certain data block and the respective direct metadata node of the first metadata object.

The method may be comprising: managing I/O access to a respective data object based on metadata structures including a metadata structure being associated with a parent object of the respective data object and plural metadata structures being respectively associated with one of a plurality of child objects of the respective data object.

For each child object, the metadata structure of the respective child object is stored to one of the node apparatuses of the group of node apparatuses for managing locations of data blocks of the data object.

The metadata structure of the respective child object includes a root metadata node and optionally includes one or more direct metadata nodes, optionally further including one or more indirect metadata nodes.

The root metadata node of the respective child object(s) may include references (pointers) to direct and/or indirect metadata nodes of the respective child object(s).

The indirect metadata node of the respective child object(s) may include references (pointers) to direct and/or indirect metadata nodes of the respective child object(s).

The direct metadata nodes of the respective child object(s) may include references (pointers) to data blocks storing data of the data object.

The metadata structure of the parent object associated with the data object is distributed across the plural node apparatuses of the group of node apparatuses for managing locations of child objects of the data object.

In particular, the metadata structure of the parent object or parts thereof may be stored in a distributed manner on different node apparatuses.

For example, each of plural node apparatuses may store the metadata structure of the parent object, or different node apparatuses may store respective parts of the metadata structure of the parent object, preferably such that each of plural parts of the metadata structure of the parent object are stored on at least one node apparatus.

The metadata structure of the parent object includes, on each node apparatus of the group of node apparatuses, a root metadata node and optionally includes one or more direct metadata nodes, optionally further including one or more indirect metadata nodes.

The root metadata node of the parent object may include references (pointers) to data blocks, direct and/or indirect metadata nodes of the parent object, and/or to root metadata nodes of child objects (the latter may be realized by pointers to data blocks storing location information of the respective child objects or by pointers to root metadata nodes of child objects on the same or other apparatuses).

The indirect metadata node of the parent object may include references (pointers) to direct and/or indirect metadata nodes of the parent object.

The direct metadata nodes of the parent object may include references (pointers) to root metadata nodes of child objects on the same and/or other node apparatuses. This may be realized by pointers to data blocks storing location information of the respective child objects or by pointers to root metadata nodes of child objects on the same or other apparatuses.

According to some exemplary preferred aspects, the parent object on a certain node apparatus includes object-references indicating locations of one or more child objects of the data object; the parent object in the data storage system includes a respective object-references for each child object of the data object; and/or each child object is referenced by an object reference of the parent object on at least one of the node apparatuses.

According to some exemplary preferred aspects, upon creation of the data object, the parent object on a certain node apparatus includes object-references indicating locations of the one or more child objects of the data object created on the same certain node apparatus; and/or, upon creation of the data object, each child object on a certain node apparatus is referenced by an object reference of the parent object on the same certain node apparatuses.

According to some exemplary preferred aspects, the method further comprises: moving, for I/O access load balancing, one or more child objects from a source node apparatus to a target node apparatus and updating an object reference of the parent object on the source node apparatus, or on another node apparatus, to reflect the new location of the one or more moved child objects.

According to some exemplary preferred aspects, the method further comprises: creating the data object; including: dividing the data of the data object into a plurality of data segments, each data segment having a size smaller than or equal to a pre-determined distribution size, storing the data segments in a distributed manner across the plural node apparatuses of the group of node apparatuses, creating a respective child object for each stored data segment, and/or creating a respective parent object on each node apparatus on which a child object is created.

According to some exemplary preferred aspects, storing the data segments in a distributed manner across the plural node apparatuses of the group of node apparatuses is executed based on a deterministic distribution algorithm and/or based on a distribution map being generated based on a deterministic distribution algorithm.

According to some exemplary preferred aspects, an input value of the deterministic distribution algorithm depends on at least one of: an object identifier of the data object and an offset of a data segment in the data object.

According to some exemplary preferred aspects, the method further comprises: receiving an I/O access request to access a target data segment of the data object on a receiving node apparatus, determining a child object node apparatus being the designated location of a child object associated with the target data segment based on a deterministic algorithm, sending an I/O access request to access the target data segment from the receiving node apparatus to the determined child object node apparatus, obtaining an object reference to the child object associated with the target data segment from the parent object on the determined child object node apparatus, and accessing the child object associated with the target data segment based on the object reference obtained from the parent object on the determined child object node apparatus.

According to some exemplary preferred aspects, the method further comprises: accessing the child object associated with the target data segment on the determined child object node apparatus; or determining that the child object associated with the target data segment has been moved to another node apparatus based on the object reference obtained from the parent object on the determined child object node apparatus, and accessing the child object associated with the target data segment on the other node apparatus.

According to some exemplary preferred aspects, the metadata structure of the parent object is distributed across the plural node apparatuses of the group of node apparatuses in that the complete metadata of the parent object is stored on each of the plural node apparatuses of the group of node apparatuses; or the metadata structure of the parent object is distributed across the plural node apparatuses of the group of node apparatuses in that each of the plural node apparatuses of the group of node apparatuses stores a respective part of the metadata structure of the parent object.

According to another aspect, there may be provided a data storage system, comprising: a plurality of node apparatuses communicably connected to each other, the data storage system being configured to store plural data objects to one or more storage devices of the data storage system in units of blocks, the plural data objects being distributed across a group of node apparatuses of the data storage system; the data storage system being configured to manage I/O access to the plural data objects based on metadata structures being respectively provided for each data object, each metadata structure including a root metadata node and optionally including one or more direct metadata nodes, and optionally further including one or more indirect metadata nodes; and/or the data storage system being configured to store a metadata object for managing de-duplicated data blocks based on a metadata structure of the metadata object including a root metadata node and optionally including one or more direct metadata nodes, and optionally further including one or more metadata indirect nodes; wherein at least one direct metadata node of the metadata structure of the metadata object may include a block reference pointing to a de-duplicated data block being associated with two or more data objects.

According to another aspect, there may be provided node apparatus for use in a data storage system as discussed above or below, comprising: an interface for establishing a communication connection to one or more other node apparatuses of the data storage system; one or more storage devices for storing data; and/or a storage controller for controlling a data storage distribution in the data storage system, including: storing plural data objects to one or more storage devices of the data storage system in units of blocks, the plural data objects being distributed across a group of node apparatuses of the data storage system; managing (processing) I/O access to the plural data objects based on metadata structures being respectively provided for each data object, each metadata structure including a root metadata node and optionally including one or more direct metadata nodes, and optionally further including one or more indirect metadata nodes; and/or storing a metadata object for managing de-duplicated data blocks based on a metadata structure of the metadata object including a root metadata node and optionally including one or more direct metadata nodes, and optionally further including one or more metadata indirect nodes; wherein at least one direct metadata node of the metadata structure of the metadata object may include a block reference pointing to a de-duplicated data block being associated with two or more data objects.

According to another aspect, there may be provided method for managing (e.g. controlling de-duplication of data in) a data storage system, comprising: storing plural data objects to one or more storage devices of the data storage system in units of blocks; managing (processing) I/O access to the plural data objects based on metadata structures being respectively provided for each data object, each metadata structure including a root metadata node and optionally including one or more direct metadata nodes, and optionally further including one or more indirect metadata nodes; and/or storing a metadata object for managing de-duplicated data blocks based on a metadata structure of the metadata object including a root metadata node and optionally including one or more direct metadata nodes, and optionally further including one or more metadata indirect nodes; wherein at least one direct metadata node of the metadata structure of the metadata object may include a block reference pointing to a de-duplicated data block being associated with two or more data objects.

According to further aspects there may be provided data storage system connectable to one or more client computers, comprising a processing unit including a processor and/or a programmable logic device; a cache memory; and one or more storage devices and/or an interface to communicably connect with one or more storage devices; the processing unit being preferably adapted to execute one or more methods according to one or more of the above aspects and/or one or more methods of the present disclosure.

BRIEF DESCRIPTION OF THE DRAWINGS

FIG. 6A exemplarily shows a schematic diagram of an exemplary metadata tree structure on a node apparatus according to some exemplary embodiments;

DETAILED DESCRIPTION OF THE ACCOMPANYING DRAWINGS AND EXEMPLARY EMBODIMENTS

Figure 1A:
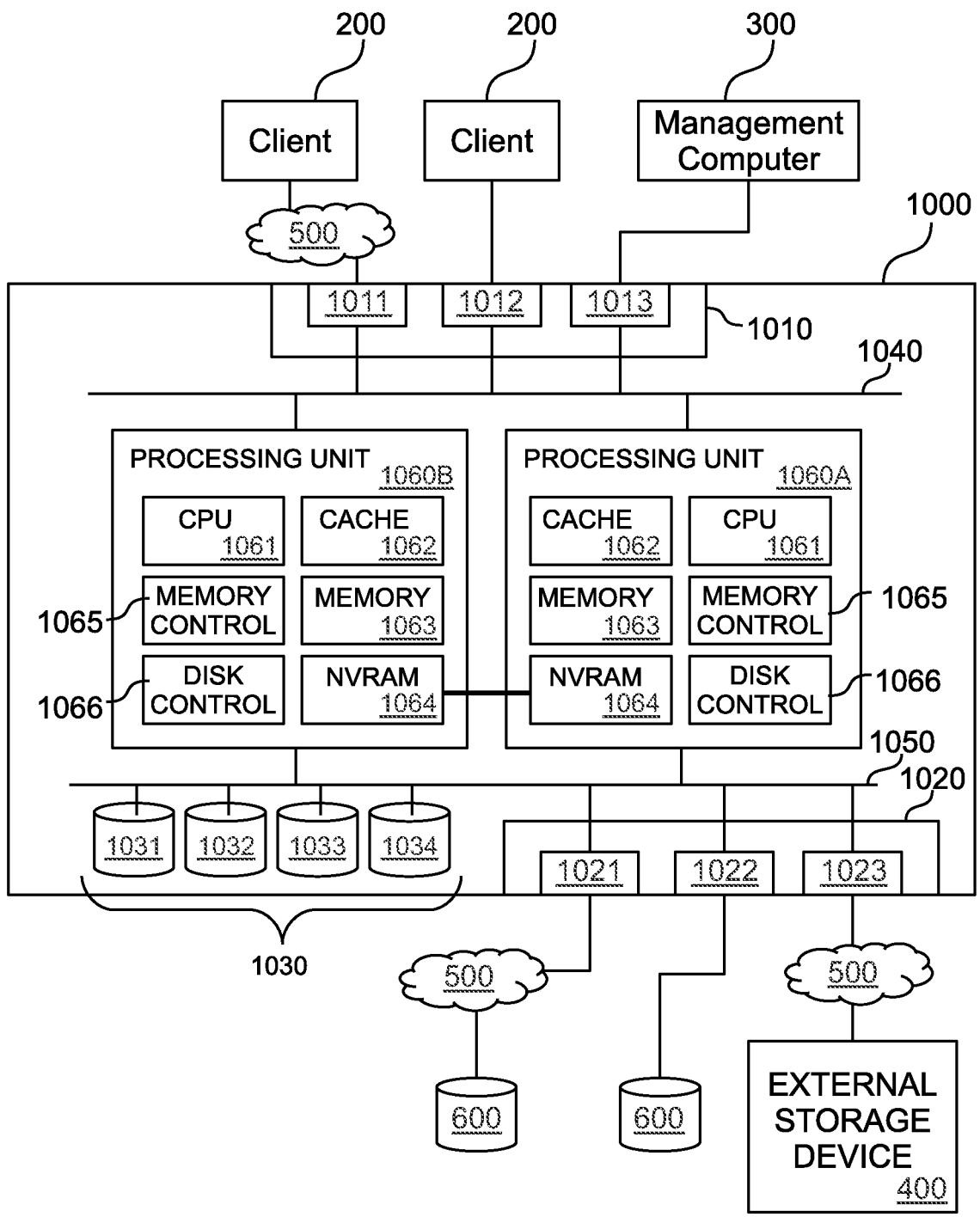
FIG. 1A exemplarily shows a schematic diagram of a data storage apparatus according to some exemplary embodiments.

In the following, preferred aspects and exemplary embodiments will be described in more detail with reference to the accompanying figures. Same or similar features in different drawings and embodiments are sometimes referred to by similar reference numerals.

It is to be understood that the detailed description below relating to various preferred aspects and preferred embodiments are not to be meant as limiting the scope of the present invention.

I. Terminology

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of storage devices without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with more or much more than two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs. In some embodiments, file systems are managed as a group of objects, each file or directory being associated with and/or managed as a file system object. Metadata of the file system, its configuration and the file system objects may be stored and managed in system objects and/or metadata objects. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

In the exemplary embodiments, it is to be noted that the terms "objects" and "blocks" do not refer to only the application to file systems. Rather, objects may relate to logical volumes, logical units (LUNs), file systems, file system objects, object-type storage, and may others. In general, an object is an entity that stores related data in one or more data blocks, and data stored for an object may be extended, truncated, modified, deleted, over-written, to name but a few operations. Each data object has related metadata indicating information of logical and/or physical storage locations, such metadata being managed and stored as one or more tree structures of metadata nodes.

Exemplary embodiments of the present invention are described with reference to an exemplary file system of the type used in various file servers e.g. as sold by Hitachi Data Systems, although it should be noted that various concepts may be applied to other types of data storage systems.

An exemplary file server is described in U.S. Pat. No. 7,457,822, entitled "Apparatus and Method for Hardware-based File System", which is incorporated herein by reference, and PCT application publication number WO 01/28179 A2, published Apr. 19, 2001, entitled "Apparatus and Method for Hardware Implementation or Acceleration of Operating System Functions", which is incorporated herein by reference.

Another implementation of an exemplary file server and hardware-implemented file system management is set forth in U.S. application Ser. No. 09/879,798, filed Jun. 12, 2001, entitled "Apparatus and Method for Hardware Implementation or Acceleration of Operating System Functions", which is incorporated herein by reference.

An exemplary file storage system is described in WO 2012/071335 and U.S. application ser. No. 13/301,241 entitled "File Cloning and De-Cloning in a Data Storage System", which was filed on Nov. 21, 2011, which are incorporated herein by reference.

An exemplary file server including various hardware-implemented and/or hardware-accelerated subsystems, for example, is described in U.S. patent application Ser. Nos. 09/879,798 and 10/889,158, which are incorporated by reference herein, and such file server may include a hardware-based file system including a plurality of linked sub-modules, for example, as described in U.S. patent application Ser. Nos. 10/286,015 and 11/841,353, which are incorporated by reference herein.

II. Exemplary Architectures of Data Storage Systems of Exemplary Embodiments

FIG. 1A exemplarily shows a schematic diagram of a data storage apparatus 1000 in a data storage system according to exemplary embodiments. One or more such data storage apparatuses 1000 may be used to realize a functional layer structure of any of FIGS. 2A to 2D below.

The data storage apparatus 1000 exemplarily includes an I/O interface 1010 (e.g. front-end interface) exemplarily having physical ports 1011, 1012 and 1013 and being connectable to one or more input/output devices 200 (such as e.g. the clients 200, and/or a management computer 300). Such I/O interface 1010 functions and/or functional handling thereof may be included in an interface/protocol layer 110 of any of FIGS. 2A to 2D below.

The data storage apparatus 1000 exemplarily further includes an external storage interface 1020 (e.g. back-end interface) exemplarily having physical ports 1021, 1022 and 1023 and being connectable to one or more externally connected storage devices 600 (e.g. one or more storage disks and/or storage flash modules) for storing metadata (e.g. system metadata) and data (e.g. user data) and/or to an external storage system 400 (which may include one or more externally connected storage devices such as storage disks and/or storage flash modules) for storing metadata (e.g. system metadata) and data (e.g. user data). Such external storage interface 1020 functions and/or functional handling thereof may be included in a storage device layer 140 of any of FIGS. 2A to 2D below.

The connections to the above interfaces 1010 and 1020 may be direct, via wired connections or wireless connections, and/or via communication networks, such as e.g. networks 500 in FIG. 1A.

Furthermore, exemplarily, the data storage apparatus 1000 further includes one or more internal storage devices 1031, 1032, 1033 and 1034 (e.g. one or more storage disks and/or storage flash modules), summarized as internal storage devices 1030, for storing metadata (e.g. system metadata) and data (e.g. user data).

In further exemplary embodiments, the data storage apparatus(es) may only include internal storage devices (not being connected to external storage devices/systems) and in further exemplary embodiments, the data storage apparatus (es) may only be connected to external storage devices/ systems (not having internal storage devices).

The data storage apparatus 1000 exemplarily further includes a processing unit 1060A and optionally another processing unit 1060B. The processing units 1060A and 1060B exemplarily communicate with the interfaces 1010 and 1020, as well as with the internal storage devices 1030, via internal bus systems 1040 and 1050.

Each of the processing units 1060A and 1060B exemplarily includes a processor 1061 (e.g. central processing unit, or CPU), a memory controller 1065, a disk controller 1066 and memories such as e.g. the cache memory 1062, the system memory 1063 and the non-volatile memory 1064 (e.g. NVRAM). The memory controller 1065 may control one or more of the memories such as e.g. the cache memory 1062, the system memory 1063 and the non-volatile memory 1064 (e.g. NVRAM).

The I/O requests/responses to/from the internal storage devices 1030 and/or to/from the external storage devices/ systems 400 and 600 (via the interface 1020) is exemplarily controlled by the disk controller 1066 of the data storage apparatus 1000. Accordingly, the disk controller 1066 and/or its functions and/or functional handling thereof may be included in a storage device layer 140 of any of FIGS. 2A to 2D below.

Exemplarily, e.g. for mirroring purposes, the NVRAMs 1064 of the processing units 1060A and 1060B of the data storage apparatus 1000 are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

For example, the connection between the non-volatile memories 1064 may be exemplarily realized as a non-transparent bridge connection, e.g. by PCIe connection.

Further exemplarily, each of the processing units 1060A and 1060B exemplarily includes a system memory 1063 (e.g. for storing processing related data or program data for execution by the respective processing units) and a cache memory 1063 for temporarily storing data such as e.g. cache data related with metadata and/or data for handling I/O access messages.

For controlling the system memory 1063, the cache memory 1064 and/or the non-volatile memory 1064 (NVRAM), each of the processing units 1060A and 1060B exemplarily includes a memory controller 1065.

For processing, handling, converting, and/or encoding headers of messages, requests and/or responses, the data storage apparatus 1000 exemplarily further includes the processor 1061 (or other type of processing unit which may include one or more processors, one or more programmable logic devices such as integrated circuits, Field Programmable Gate Arrays (FPGAs), or the like, and/or one or more processors such as e.g. CPUs and/or microprocessors).

For temporarily storing data (including metadata and/or user data), the data storage apparatus 1000 includes the non-volatile memory 1064 (e.g. one or more NVRAMs). The non-volatile memory and/or NVRAM(s) may also be referred to as "cache memory" in exemplary embodiments, e.g. if the cache memory 1062 is formed as a portion of the non-volatile memory.

For example, in some embodiments, the difference between cache memory and the non-volatile memory may be that the data in non-volatile memory is stored such as to be retained even after power loss (i.e. being non-volatile), while cache memory may refer to volatile memory. In some exemplary embodiments a difference between the configuration of cache memory and the non-volatile memory (NVRAM) may be that the data stored in the non-volatile memory may additionally be mirrored to another non-volatile memory (e.g. one or more NVRAMs of the other processing unit or another connected data storage apparatus).

The processing unit(s) 1060A and/or 1060B and/or its functions and/or functional handling thereof may be included in a metadata layer 120 and/or a data protection layer 130 of any of FIGS. 2A to 2D below.

Figure 1B:
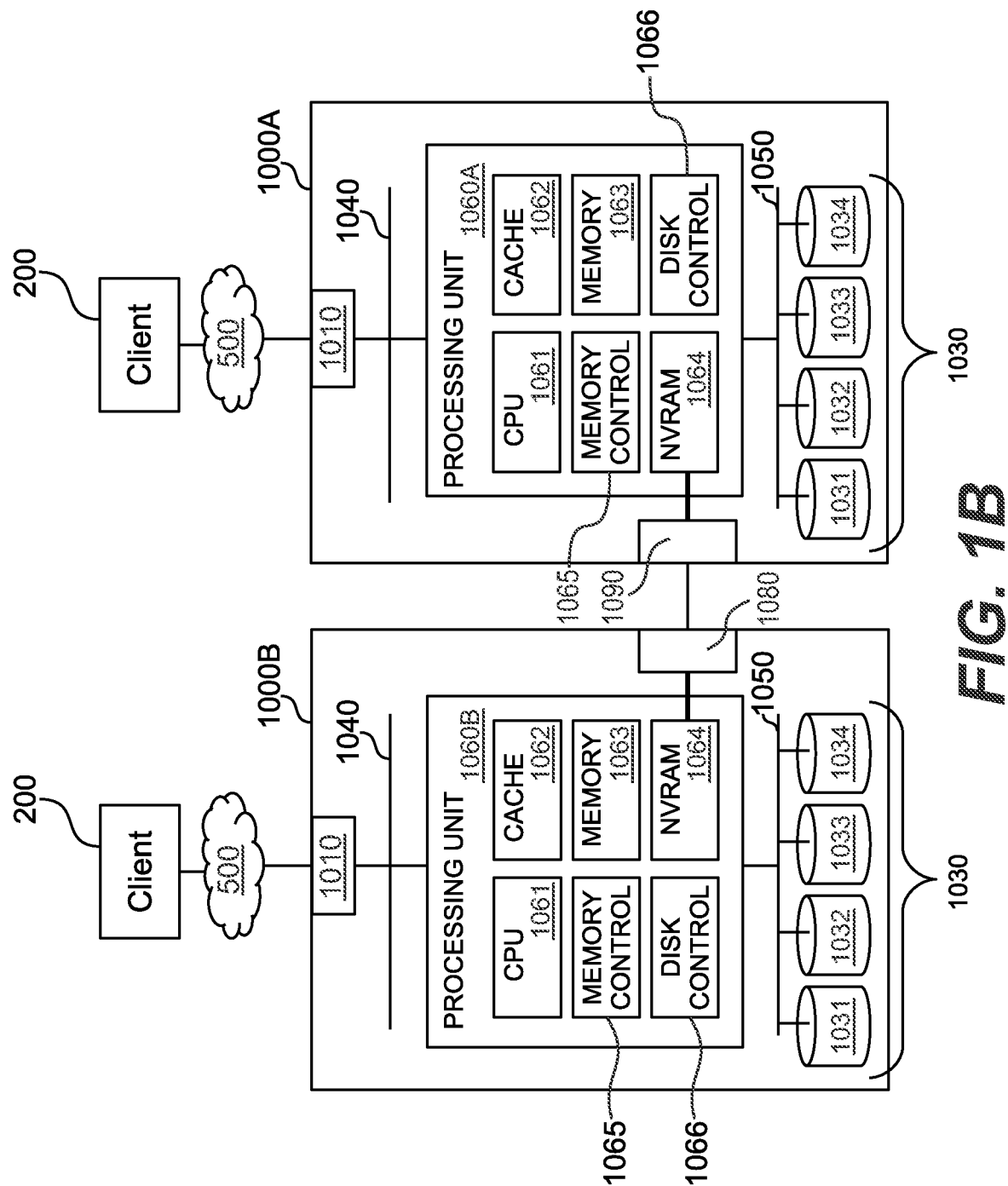
FIG. 1B exemplarily shows a schematic diagram of a data storage system comprising plural data storage apparatuses according to some exemplary embodiments.

FIG. 1B exemplarily shows a schematic diagram of a data storage system comprising plural data storage apparatuses 1000A and 1000B in a data storage system according to further exemplary embodiments.

The data storage apparatuses 1000A and 1000B may be realized as node apparatuses in a storage system cluster of plural node apparatuses, which may be communicably connected with each other via the network interfaces 1010 (or via other front-end or back-end interfaces).

A difference to the data storage apparatus 1000 of FIG. 1A is that the non-volatile memory 1064 (e.g. NVRAM) of the respective processing units 1060 of both data storage apparatuses 1000A and 1000B are connected via a connection between the respective interfaces 1090 of the data storage apparatuses 1000A and 1000B, in particular for mirroring data of the non-volatile memory 1064 (e.g. NVRAM) of the data storage apparatus 1000A in the non-volatile memory 1064 (e.g. NVRAM) of the data storage apparatus 1000B, and vice versa.

Exemplarily, the interfaces 1020 of the data storage apparatuses 1000A and 1000B are not shown in FIG. 1B, but additional interfaces 1020 for connection to external storage devices and/or storage systems may be provided.

Exemplarily, e.g. for mirroring purposes, the NVRAMs 1064 of the processing units 1060 of both data storage apparatuses 1000A and 1000B are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

Figure 1C:
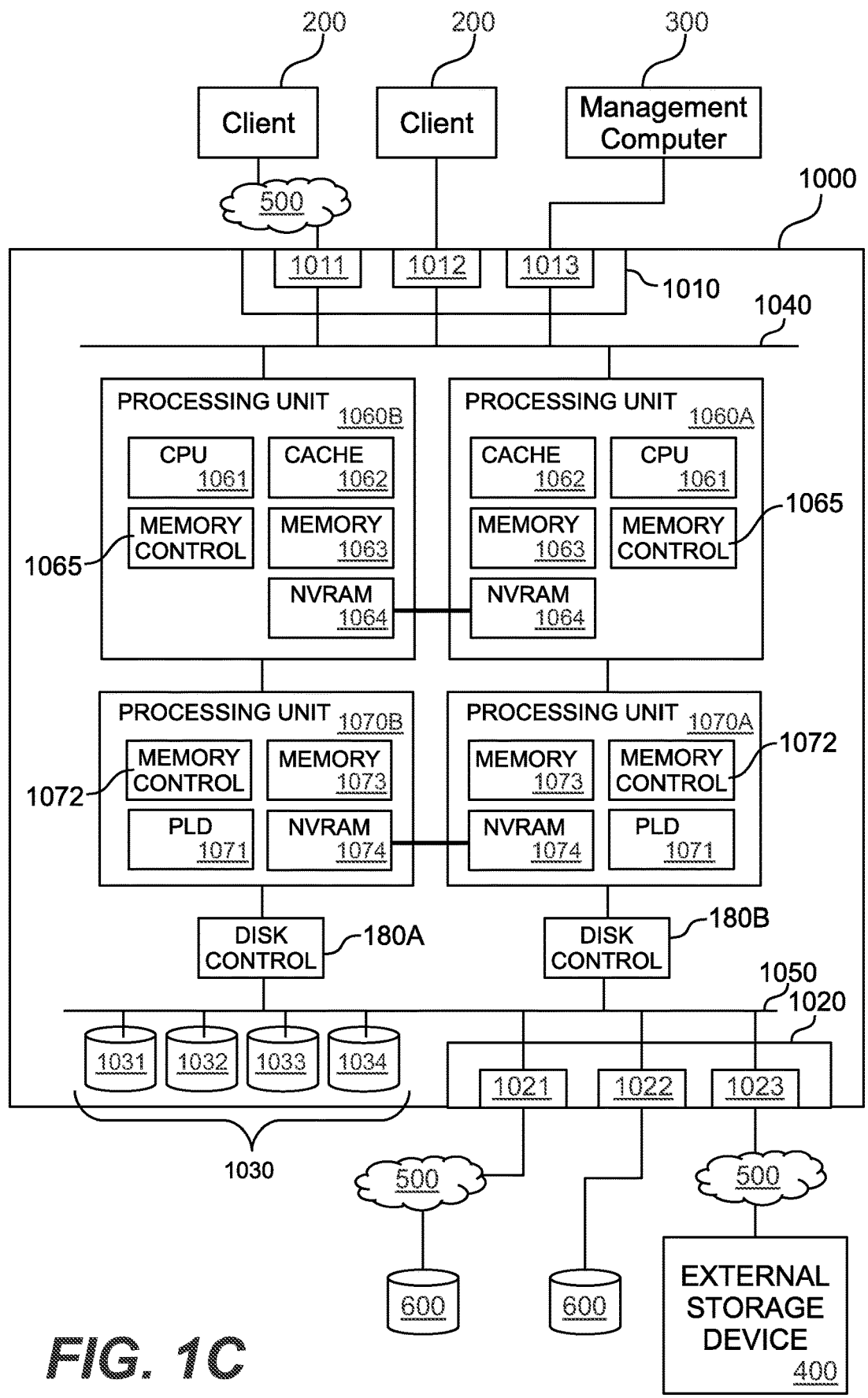
FIG. 1C exemplarily shows a schematic diagram of another data storage apparatus according to some exemplary embodiments.

FIG. 1C exemplarily shows a schematic diagram of another data storage apparatus 1000 according to exemplary embodiments.

Exemplarily, in FIG. 1C, in addition to the processing units 1060A and 1060B which may be provided similar as in FIG. 1A, the data storage apparatus 1000 includes, for hardware acceleration purposes, further processing units 1070A and 1070B which may be provided with respective programmable logic devices 1071 (e.g. instead or in addition to processors) for processing data movement, data handling or request/response handling in addition to or in support of the processors 1061 of the processing units 1060A and 1060B.

The programmable logic devices 1071 may be realized by one or more integrated circuits such as e.g. including one or more Field Programmable Gate Arrays (FPGAs). The processing units 1070A and 1070B may include own memories 1073 and non-volatile memories 1074 (e.g. NVRAMs), as well as e.g. their own memory controllers 1072. However, the programmable logic devices 1071 may also be responsible for the control of the memories 1073 and 1074.

Exemplarily, e.g. for mirroring purposes, the NVRAMs 1074 of the processing units 1070A and 1070B of the data storage apparatus 1000 are exemplarily connected to each other to transfer data between the NVRAMs 1074.

For example, each NVRAM 1074 may be divided into two portions of similar size, and one portion of each NVRAM 1074 is provided to store data and or metadata handled by its respective processing unit 1070 and the other portion of each NVRAM 1074 is provided to store mirrored data from the other NVRAM via the connection, respectively.

For example, the connection between the non-volatile memories 1074 may be exemplarily realized as a non-transparent bridge connection, e.g. by PCIe connection.

Figure 1D:
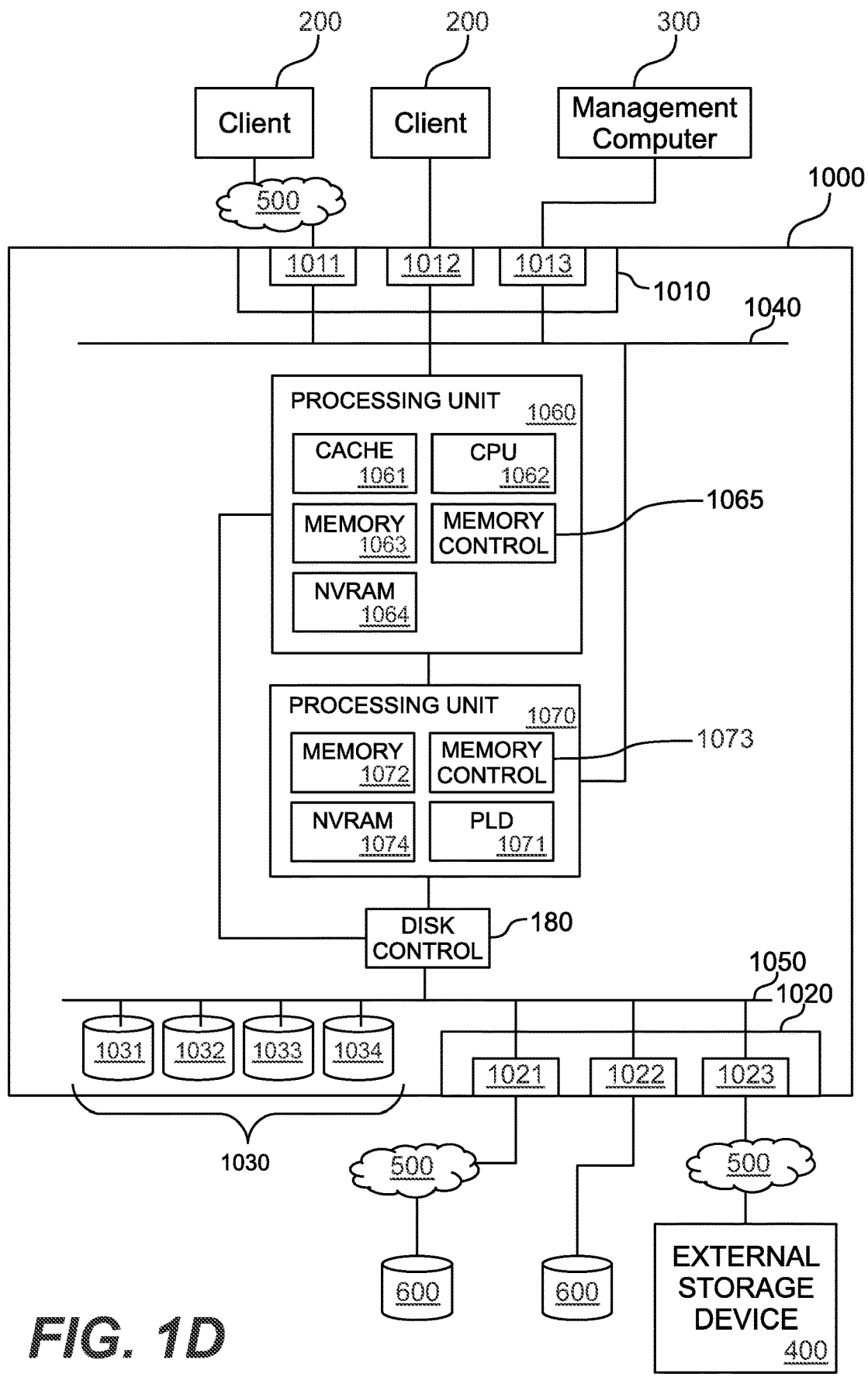
FIG. 1D exemplarily shows a schematic diagram of another data storage apparatus according to some exemplary embodiments.

FIG. 1D exemplarily shows a schematic diagram of another data storage apparatus 1000 according to some exemplary embodiments.

Exemplarily, in FIG. 1D, in addition to the processing unit 1060 which may be provided similar as in FIG. 1A, the data storage apparatus 1000 includes, for hardware acceleration purposes, further another processing unit 1070 which may be provided with a respective programmable logic device 1071 (e.g. instead or in addition to processors) for processing data movement, data handling or request/response handling in addition to or in support of the processor 1061 of the processing unit 1060.

The programmable logic device 1071 may be realized by one or more integrated circuits such as e.g. including one or more Field Programmable Gate Arrays (FPGAs). The processing unit 1070 may include its own (cache and/or ROM and/or RAM) memory 1073 and non-volatile memory 1074 (e.g. NVRAM), as well as e.g. its own memory controller 1072. However, the programmable logic device 1071 may also be responsible for the control of the memories 1073 and 1074.

In all of the above configurations, the processing unit/units of the data storage apparatus(es) may be configured, by one or more software programs and/or based on hardware implemented processing (e.g. by support of programmable logic devices), to execute, by themselves or in combination with one or more further processing unit(s), the processing and methods of examples of control and management processes described herein.

III. Exemplary Layer Structures of Data Storage Systems of Exemplary Embodiments The below descriptions relate to some exemplary software layer configurations in exemplary embodiments. However, it is to be noted that the shown layer structures shall not be intended to be interpreted in any limiting way. The ordering or configurations of layers may be different in other exemplary embodiments, and also additional layers can be added or some of the layers do not need to be present in other exemplary embodiments.

Figure 2A:
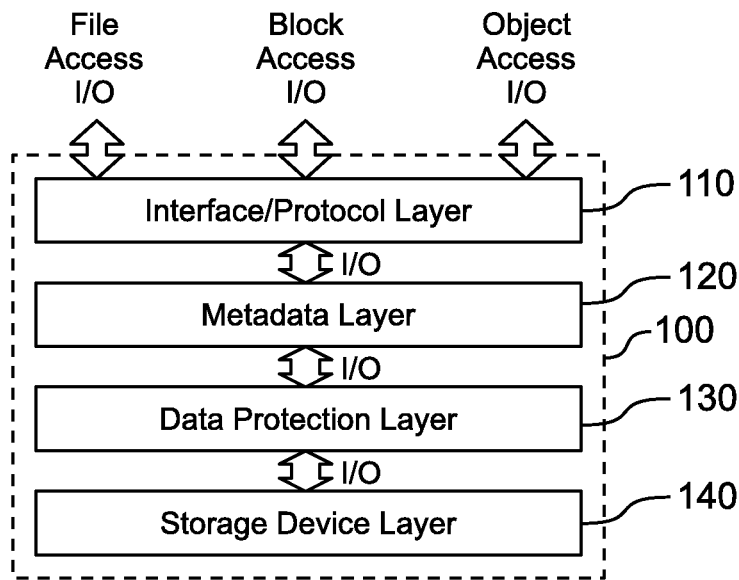
FIG. 2A exemplarily shows a schematic diagram of a data storage system layer architecture according to some exemplary embodiments.

FIG. 2A exemplarily shows a schematic diagram of a data storage system layer architecture 100 according to exemplary embodiments.

Such functional data storage system layer architecture 100 (which may be provided by software, hardware or any combination thereof) can be realized on any one of the data storage apparatuses 1000 (1000A, 1000B) of FIGS. 1A to 1D.

Some or all respective layers may use shared resources (such as sharing processing units, processors, programmable logic devices, memories such as system memories, cache memories and/or non-volatile memories or NVRAMs, controllers and/or storage devices), or some or all layers may be provided on their own respective resources (e.g. having their own dedicated processing units, processors, programmable logic devices, memories such as system memories, cache memories and/or non-volatile memories or NVRAMs, controllers and/or storage devices).

Also the layers may share some resources with other layers for some functions while they own other resources for other functions by themselves.

The data storage system layer architecture 100 exemplarily includes an interface/protocol layer 110, a metadata layer 120, a data protection layer 130 and a storage device layer 140. The data storage system layer architecture 100 may be realized on one or more servers, file servers, computers, storage devices, storage array devices, cluster node apparatuses etc., in particular exemplarily according to configurations of any of FIGS. 1A to 1D.

The interface/protocol layer 110 can exemplarily be communicably connected to client computers 200 and/or an exemplary optional management computer 300, e.g. via physical ports and/or communication networks (e.g. via front-end interfaces 1010 above, such as network interfaces or the like).

The interface/protocol layer 110 may include one or more physical interfaces including one or more physical ports, physical switches, physical connectors, physical interface boards, wireless interfaces etc. for physical connection, network connection and/or wireless connection to one or more networks, computers (clients, hosts, management computers, etc.), servers, or the like.

Also, the interface/protocol layer 110 may include functions, executed on one or more processing units (e.g. processing units of any of FIGS. 1A to 1D), for example, to receive, process, convert, handle, and/or forward messages, requests, instructions, and/or responses in multiple protocols and I/O access types.

Specifically, the interface/protocol layer 110 is preferably configured to receive, process, convert, handle one or more (and preferably all) of:

file-access I/O messages (including file-access I/O requests directed to files and/or directories of one or more file systems) according to one or file access protocols (such as e.g. one or more of AFP, NFS, e.g. NFSv3, NFSv4 or higher, or SMB/CIFS or SMB2 or higher);

block-access I/O messages (including block-access I/O requests directed to blocks of virtual, logical or physical block-managed storage areas) according to one or block access protocols (such as e.g. one or more of iSCSI, Fibre Channel and FCoE which means "Fibre Channel over Ethernet"); and object-access I/O messages (including object-access I/O requests directed to objects of an object-based storage) according to one or object-based access protocols (such as e.g. IIOP, SOAP, or other object-based protocols operating over transport protocols such as e.g. HTTP, SMTP, TCP, UDP, or JMS).

The above connection types and communication functions may include different interfaces and/or protocols, including e.g. one or more of Ethernet interfaces, internet protocol interfaces such as e.g. TCPIP, network protocol interfaces such as e.g. Fibre Channel interfaces, device connection bus interfaces such as e.g. PCI Express interfaces, file system protocol interfaces such as NFS and/or SMB, request/response protocol interfaces such as e.g. HTTP and/or HTTP REST interfaces, system interface protocols such as e.g. iSCSI and related interfaces such as e.g. SCSI interfaces, and NVM Express interfaces.

The interface/protocol layer 110 is exemplarily configured to connect to and communicate with client computers 200 and/or the management computer 300 to receive messages, responses, requests, instructions and/or data, and/or to send messages, requests, responses, instructions and/or data from/to the client computers 200 and/or the management computer 300, preferably according to plural different protocols for file access I/Os, block access I/Os and/or object access I/Os.

Accordingly, in some exemplary embodiments, such requests and responses exchanged between the data storage system layer architecture 100 and the client computers 200 may relate to I/O requests to one or more file systems (e.g. based on file access protocol I/O messages) and/or to I/O requests to blocks of physical, logical or virtual storage constructs of one or more storage devices (e.g. based on block access protocol I/O messages) of the data storage system 100.

Also, such requests and responses exchanged between the data storage system layer architecture 100 and the client computers 200 may relate to I/O requests to objects of object-based storage (e.g. based on object access protocol I/O messages) provided by the data storage system 100.

The I/O requests on the basis of file access protocols may be including e.g. read requests to read stored data in a file system (including reading file data, reading file system metadata, reading file and/or directory attributes) or write data into a file system (including creating files and/or directories, modifying files, modifying attributes of files and/or directories, etc.).

The I/O requests on the basis of block access protocols may be including e.g. read requests to read stored data in one or more blocks of a block-based storage area (including reading data or metadata from blocks of a virtual, logical or physical storage area divided in blocks based on block addresses such as e.g. logical block addresses LBAs, and/or block number, e.g. reading data blocks of logical units (LUs)) and write data to blocks of a block-based storage area (including writing data blocks to newly allocated blocks of a virtual, logical or physical storage area divided in blocks based on block addresses such as e.g. logical block addresses LBAs, and/or block number, e.g. writing data blocks of logical units (LUs); or modifying data of previously written data blocks in blocks of the block-based storage area).

In the context of block-based storage on virtual, logical and/or physical storage devices organized in one or more storage areas being provided in units of blocks, it is emphasized that the terms "storage block" and "data block" may refer to related aspects, but are generally intended to differentiate between the "storage block" as a construct for storing data as such, e.g. having a certain block size and being configured to store data of an amount according to the block size, and the "data block" shall refer to the unit of data of an amount according to the block size, i.e. to the block sized unit of data that is written to (or can be read from) one "storage block". When using the term "block" as such, this typically may refer to the "storage block" in the sense above.

As mentioned above, the I/O requests/responses exchanged between clients 200 and the interface/protocol layer 110 may include object-related I/O requests/responses relating to data objects of object-based storage (which may also include an object-based managed file system), file-system-related I/O requests/responses relating to files and/or directories of one or more file systems, and/or block-related I/O requests/responses relating to data stored in storage blocks of block-managed storage areas (provided virtually, logically or physically) on storage devices.

The interface/protocol layer 110 communicates with the metadata layer 120, e.g. for sending requests to the metadata layer 120 and receiving responses from the metadata layer 120.

In exemplary embodiments, the communication between interface/protocol layer 110 and metadata layer 120 may occur in an internal protocol which may be file-based, block-based or object-based. However, standard protocols may be used.

The interface/protocol layer 110 may receive messages (such as I/O requests) from the clients in many different protocols, and the interface/protocol layer 110 is configured to convert messages of such protocols, or at least headers thereof, to the messages to be sent to the metadata layer 120 according to the protocol used by the metadata layer 120. In some exemplary embodiments, the metadata layer 120 may be configured to handle object-related I/O requests.

The metadata layer 120 may then preferably be configured to convert object-related I/O requests relating to data objects (which may relate to block-based storage areas managed as data objects, to file-based files and/or directories of one or more file systems managed as file system objects, and/or to data objects or groups of data objects managed as data objects) into corresponding block-related I/O requests (according to a block access protocol) relating to data stored in storage blocks of virtually, logically or physically provided storage areas of storage devices, and vice versa.

In some exemplary embodiments, the metadata layer 120 may be configured to hold and manage metadata on a data object structure and on data objects of the data object structure in a metadata structure and/or metadata tree structure according to later described examples and exemplary embodiments.

The metadata layer 120 preferably communicates with the data protection layer 130, e.g. for sending requests to the data protection layer 130 and receiving responses from the data protection layer 130, preferably as block-related I/O requests (according to a block access protocol).

The data protection layer 130 communicates with the storage device layer 140, e.g. for sending requests to the storage device layer 140 and receiving responses from the storage device layer 140, preferably as block-related I/O requests (according to a block access protocol).

The data protection layer 130 may include processing involved in connection with data protection, e.g. management of data replication and/or data redundancy for data protection. For example, the data protection layer 130 may include data redundancy controllers managing redundant data writes, e.g. on the basis of RAID configurations including mirroring, and redundant striping with parity. The data protection layer 130 could then be configured to calculate parities.

The storage device layer 140 may execute reading data from storage devices and writing data to storage devices based on messages, requests or instructions received from the data protection layer 130, and may forward responses based on and/or including read data to the data protection layer 130.

In general, I/O processing may be realized by the layer architecture such that the interface/protocol layer 110 receives an I/O request (file-access, block-access or object-access) and converts the I/O request (or at least the header thereof) to a corresponding I/O request in the protocol used by the metadata layer 120 (e.g. object-based, object access).

The metadata layer 120 uses address information of the received I/O request and converts the address information to the address information used by the data protection layer 130. Specifically, the metadata layer 120 uses address information of the received I/O request and converts the address information to related block addresses used by the data protection layer 130. Accordingly, the metadata layer 120 converts received I/O requests to block access I/O in a block-based protocol used by the data protection layer 130.

The data protection layer 130 receives the block access I/O from the metadata layer 120, and converts the logical block address information to physical block address information of related data (e.g. taking into account RAID configurations, and parity calculations, or other error-code calculations) and issues corresponding block access I/O requests in a block-based protocol to the storage device layer 140 which applies the block access I/O to the storage device (e.g. by reading or writing data from/to the storage blocks of the storage devices).

For response messages, e.g. based on read requests to read user data, the corresponding response (e.g. with the user data to be read) can be passed the other way around, for example, in that the storage device layer 140 returns the read user data in a block-based protocol to the data protection layer 130, the data protection layer 130 returns the read user data in a block-based protocol to the metadata layer 120, the metadata layer 120 returns the read user data preferably in an object-based protocol to the interface/protocol layer 110, and the interface/protocol layer 110 returns the final read response to the requesting client.

However, for the above processing, the metadata layer 120 may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

Figure 2B:
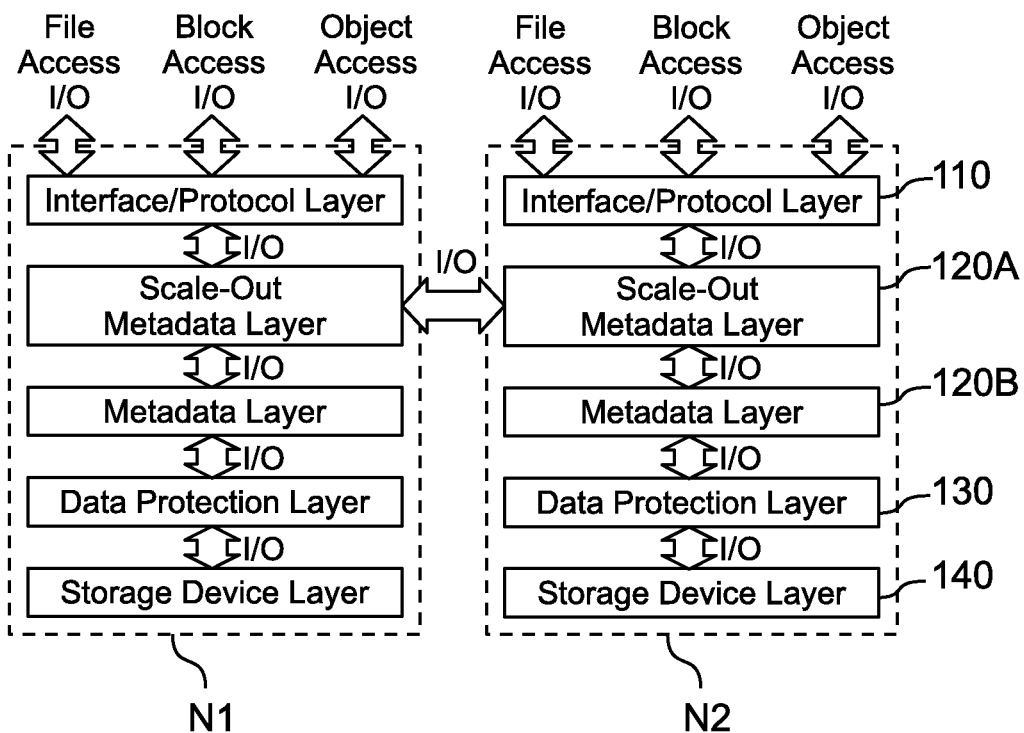
FIG. 2B exemplarily shows a schematic diagram of another data storage system layer architecture according to some exemplary embodiments.

FIG. 2B exemplarily shows a schematic diagram of another data storage system layer architecture 100 according to further exemplary embodiments.

Exemplarily, the data storage system layer architecture 100 of FIG. 2B is proposed for scale-out purposes, in which multiple node apparatuses (which may also operate as single data storage apparatus, preferably) may be connected to form a cluster system which may be extended (scale-out) by adding further node apparatuses, when needed.

In this connection, it is indicated that the term "node apparatus" in the present context refers to a device entity which forms a part of a cluster system of inter-connectable "node apparatuses". This needs to be distinguished from "metadata nodes", (e.g. "root nodes", "direct nodes" or "indirect nodes") as described later, as such "metadata nodes" from data constructs (data elements) which are units of metadata managed in metadata tree structures as described below. Sometimes, "metadata nodes" are also referred to as onodes or inodes.

Exemplarily, FIG. 2B shows two node apparatuses N1 and N2 included in a cluster of two or more node apparatuses (i.e. including at least N1 and N2), each node apparatus having an interface/protocol layer 110, a metadata layer 120B (similar to the metadata layer 120 above), a data protection layer 130 and a storage device layer 140, similar to the exemplary embodiment of FIG. 2A.

However, in order to scale out the request/response handling to the cluster node apparatuses, preferably between the interface/protocol layer 110 of the data storage system layer architecture 100 and the metadata layers 120B of the node apparatuses N1 and N2, the data storage system layer architecture 100 of FIG. 2B further includes a scale-out metadata layer 120A preferably provided between the interface/protocol layer 110 and the metadata layer 120B, to communicate I/O access messages (e.g. I/O requests or responses) between the scale-out metadata layers 120A of the node apparatuses of the cluster.

By such structure, the clients can send I/O requests to each of the node apparatuses (i.e. to which one or more node apparatuses they are connected themselves) independent of which node apparatus actually stores the target data of the I/O access or actually manages the storage device(s) storing the target data, and the scale-out metadata layers 120A respectively handle metadata managing mapping information locating the target data on the cluster.

Accordingly, the client may issue the I/O access request to either one of the cluster node apparatuses, and the scale-out metadata layer 120A of the receiving node apparatus identifies the node apparatus storing the target data based on scale-out metadata (which may also be stored in storage devices), and issues a corresponding I/O access request to the scale-out metadata layer 120A of the identified node apparatus.

The identified node apparatus handles the I/O request and responds to communicate an I/O response to the scale-out metadata layer 120A of the initial receiving node apparatus to return a corresponding response via the interface/protocol layer 110 of the initial receiving node apparatus to the requesting client.

Other layers in FIG. 2B may have functions similar to the corresponding layers of the layer architecture of FIG. 2A.

Figure 2C:
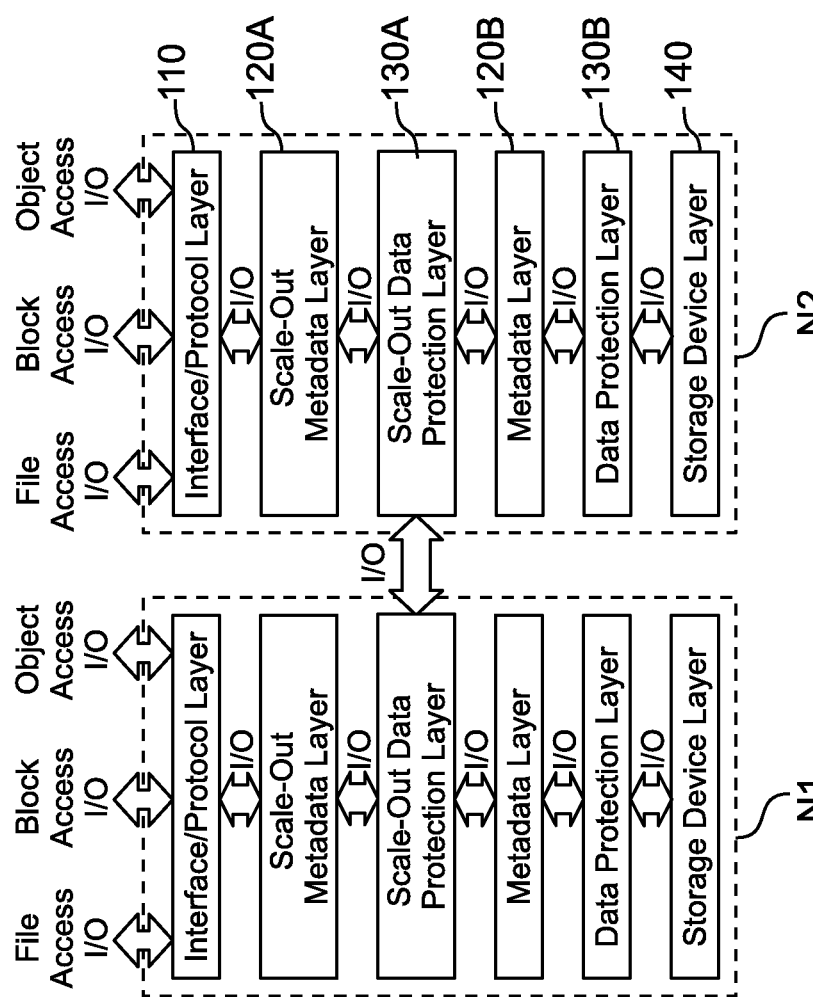
FIG. 2C exemplarily shows a schematic diagram of another data storage system layer architecture according to some exemplary embodiments.

FIG. 2C exemplarily shows a schematic diagram of another data storage system layer architecture 100 according to further exemplary embodiments.

Again, the data storage system layer architecture 100 of FIG. 2C is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2C exemplarily further includes another scale-out data protection layer 130A exemplarily between the scale-out metadata layer 120A and the metadata layer 120B (which communicates with the data protection layer 130B), wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

Figure 2D:
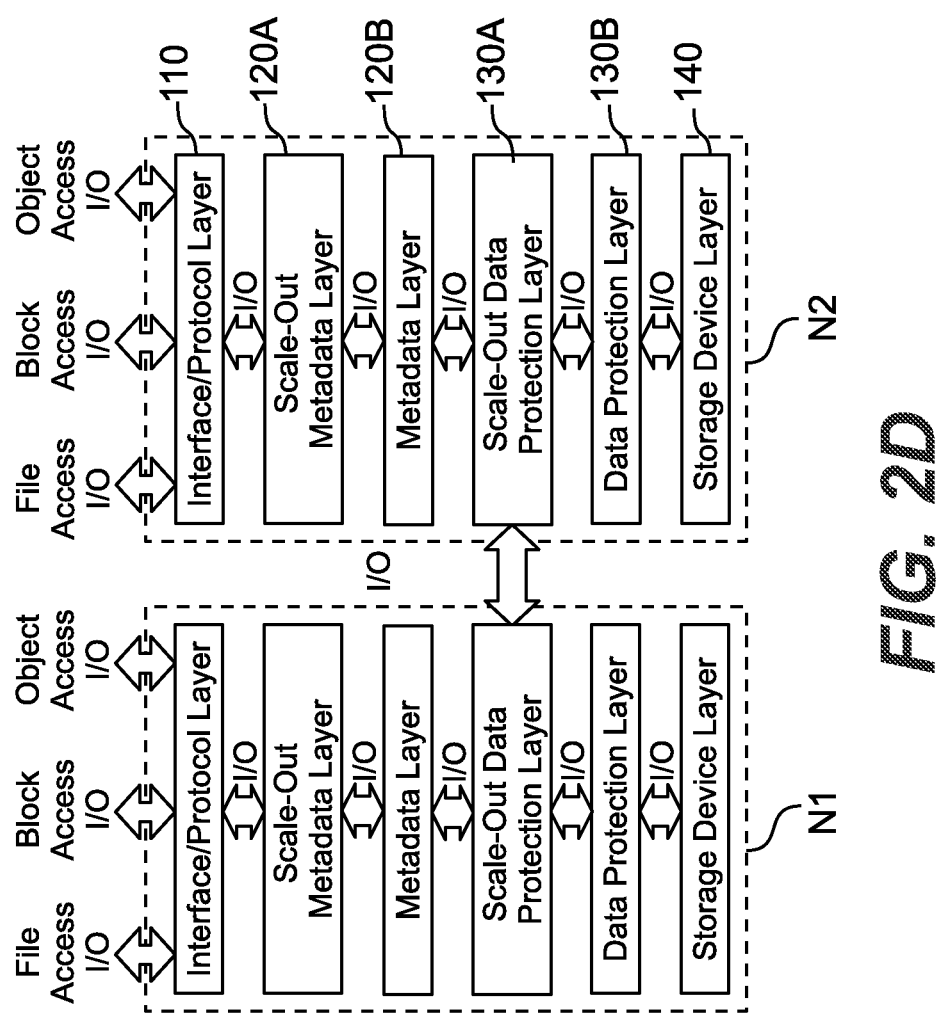
FIG. 2D exemplarily shows a schematic diagram of another data storage system layer architecture according to some exemplary embodiments.

FIG. 2D exemplarily shows a schematic diagram of another data storage system layer architecture 100 according to some exemplary embodiments.

Again, the data storage system layer architecture 100 of FIG. 2D is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2D exemplarily further includes another scale-out data protection layer 130A exemplarily between the metadata layer 120B and the data protection layer 130B, wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

In the above exemplary configurations, the metadata layer 120 (and/or 120B) may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

IV. Data Object Location Management in Exemplary Embodiments

Figure 3B:
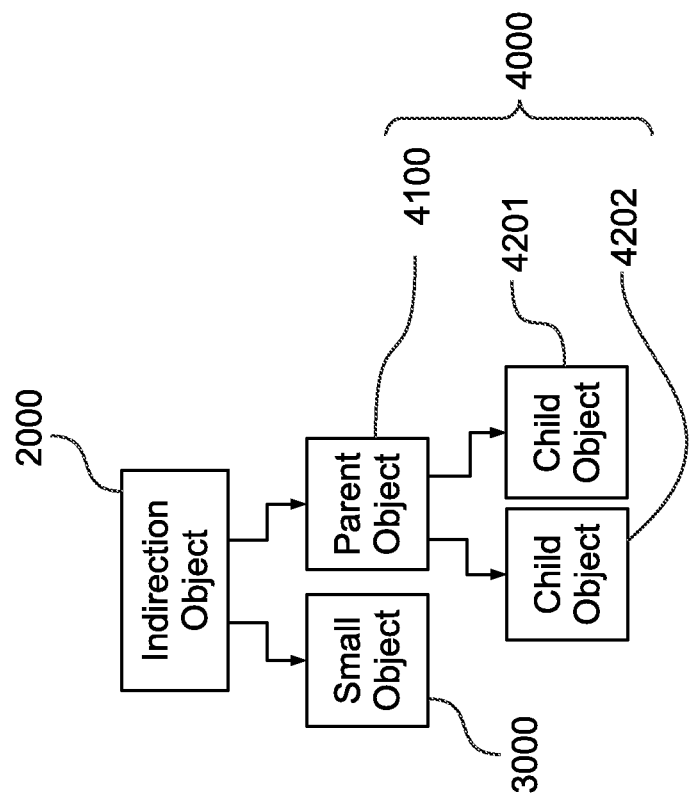
FIGS. 3A and 3B exemplarily show a metadata tree hierarchy of small and large data objects according to some exemplary embodiments.
Figure 3A:
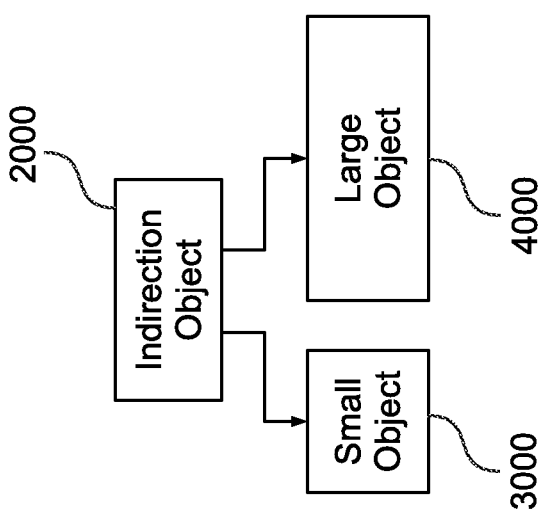

FIGS. 3A and 3B exemplarily show a metadata tree hierarchy of small and large data objects according to some exemplary embodiments.

IV.1 Data Objects and Data Object Metadata Tree Structures

Exemplarily, data objects are managed based on metadata structures, wherein, in principle, a data object can be managed based on an associated metadata tree structure including a root metadata node of the data object pointing directly and/or indirectly (e.g. via one or more direct and/or indirect metadata nodes) to data blocks or optionally pointing directly and/or indirectly (e.g. via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

IV.1.1 Indirection Object

On a higher level, an indirection object 2000, which has a metadata tree structure similar to other data objects, is provided, and the indirection object 2000 exemplarily points to other data objects. For example, the indirection object 2000 may be provided on each node apparatus of the cluster system, and the indirection object 2000 on each node apparatus may preferably point to the respective data objects on the respective node apparatus.

IV.1.2 Data Objects

In exemplary embodiments, the data objects may be provided as two types, including small data objects 3000 and large data objects 4000. The indirection object 2000 exemplarily points to small data objects 3000 as well as large data objects 4000, see e.g. FIG. 3A.

IV.1.2.1 Small Data Objects

Exemplarily, small data objects 3000 may be of a size that is smaller than a threshold size, referred to e.g. as distribution size, and such small data objects 3000 may be stored on one particular node apparatus, and such small data objects 3000 can be moved to another node apparatus of the cluster system as a whole.

IV.1.2.2 Large Data Objects

Further exemplarily, large data objects 4000 may be of a size that is larger than the threshold size, referred to e.g. as distribution size, and such large data objects 4000 may be stored in a distributed manner on plural node apparatuses, and such large data objects 4000 can be partially moved to other node apparatuses of the cluster system in units of the distribution size.

In exemplary embodiments, the large data objects 4000 are managed such that the data thereof is managed in segments of the distribution size. That is, each large data object 4000 is divided in plural data segments of the distribution size.

For example, if the size of a large data object 4000 is N times the distribution size (or more precisely larger than N−1 times but smaller than or equal to N times the distribution size), the data of the large data object 4000 will be stored in N distinct segments, which may be distributed to plural node apparatuses. In some exemplary embodiments, the respective data segments are managed as child objects 4200 of a certain parent object 4100.

IV.1.3 Exemplary Metadata Structures

In FIG. 3B, the indirection object 2000 exemplarily points to a small data object 3000 and a parent object 4100 of a large data object 4000, and the parent object 4100 points to two exemplary child objects 4201 and 4202 of the large data object 4000.

In this example, the large data object 4000 has two data segments of the distribution size, each being managed by a respective child object.

Similar to the indirection object 2000, the parent object 4100 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

The number of tree levels in the indirection object 2000 as well as the parent object 4100 may be unlimited, so that the number of data objects pointed to by the indirection object 2000 as well as the number of child objects 4200 pointed to by the parent object 4100 is generally unlimited.

Moreover, the metadata tree structures of data objects can be dynamically extended by adding further metadata nodes or even further metadata tree levels so as to increase the manageable data. For example, by extending the metadata tree structure of the indirection object 2000, the number of data objects managed (manageable) by the indirection object 2000 can be increased, and by extending the metadata tree structure of the parent object 4100, the number of child objects 4200 managed (manageable) by the parent object 4100 can be increased.

However, the size of small data objects 3000 as well as child objects 4200 is exemplarily limited and is smaller or equal to the distribution size. Accordingly, the number of tree levels in the small data object 3000 as well as the child object 4200 may be limited to a maximal number of tree levels.

In some exemplary embodiments, the small data object 3000 as well as the child object 4200 may be managed by an associated metadata tree structure including a root metadata node of the respective object pointing directly to plural direct metadata nodes which may include references to data blocks and/or references to other data objects. Then, the number of tree levels may be limited to two tree levels, including the first tree level of the root metadata node and the next tree level of the direct metadata nodes.

In other exemplary embodiments, the small data object 3000 as well as the child object 4200 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally including plural indirect metadata nodes being pointed to by the root metadata node of the data object or by other indirect metadata nodes and pointing directly and/or indirectly (via one or more other indirect metadata nodes) to plural direct metadata nodes, wherein the number of tree levels of indirect metadata nodes between the first tree level of the root metadata node and the last tree level of the direct metadata nodes is fixed to a maximum number (being one or an integer larger than one).

For example, FIG. 6A exemplarily shows a schematic diagram of an exemplary metadata tree structure on a node apparatus according to some exemplary embodiments. Exemplarily, the indirection object in FIG. 6A includes four tree levels including a first tree level of the root metadata node R(IO) of the indirection object, two tree levels of intermediate indirect metadata nodes and a last tree level of the direct metadata nodes.

Assuming exemplarily that the number of pointers N(BP) per metadata node are fixed and equal for root metadata nodes, direct metadata nodes and indirect metadata nodes, the root metadata node R(IO) of the indirection object points to up to N(BP) intermediate indirect metadata nodes of the second metadata tree level of the indirection object.

On the other hand, each of the second tree level indirect metadata nodes may also point to up to another N(BP) intermediate indirect metadata nodes of the third metadata tree level of the indirection object, and each of the third tree level indirect metadata nodes may also point to up to another N(BP) direct metadata nodes of the fourth metadata tree level of the indirection object.

Accordingly, the maximum number of direct metadata nodes in the indirection object of four tree levels is the number N(BP) of pointers per metadata node to the third power (i.e. $[N(BP)]^3$), and, since each of the direct nodes in the indirection object may point to a respective root metadata node of another data object (e.g. small object, parent object or child object), the indirection object of four tree levels can manage a number of up to the number of pointers N(BP) per metadata node to the fourth power (i.e. $[N(BP)]^4$) of data objects.

For example, if the number N(BP) of pointers per metadata node is, for example, 128, then the indirection object of one single tree level can manage up to 128 data objects, the indirection object of two tree levels can manage up to 16384 data objects (more than 16 thousand data objects), the indirection object of three tree levels can manage up to 2097152 data objects (more than 2 million data objects), and the indirection object of four tree levels can manage up to 268435456 data objects (more than 268 million data objects), etc.

For example, in other exemplary embodiments, if the number N(BP) of pointers per metadata node is, for example, 256, then the indirection object of one single tree level can manage up to 256 data objects, the indirection object of two tree levels can manage up to 65536 data objects (more than 65 thousand data objects), the indirection object of three tree levels can manage up to 16777216 data objects (more than 16 million data objects), and the indirection object of four tree levels can manage up to 4294967296 data objects (more than 4 billion data objects), etc.

However, if further data objects are added, additional layers/levels of indirect nodes may be added to the indirection object to enable management of the additional data objects.

Furthermore, in FIG. 6A exemplarily the indirection object points (more specifically a pointer of a direct node thereof) to the root metadata node R(PO) of a parent object, and the parent object metadata tree structure exemplarily has three tree levels, including a tree level of intermediate indirect metadata nodes and a last tree level of direct metadata nodes.

However, if further data is added to the parent object, additional layers/levels of indirect nodes may be added to the parent object to enable management of the additional added data.

In that pointers of direct metadata nodes of the parent object respectively include a respective reference pointing/leading to a root metadata node of a respective child object, the maximum number of child objects manageable by a parent object is equal to the number of direct nodes of the parent object times the number N(BP) of pointers per metadata node.

Accordingly, the maximum number of direct metadata nodes in the parent object of three tree levels is the number of pointers N(BP) per metadata node to the second power, or squared, (i.e. $[N(BP)]^2$), and, the maximum number of child objects manageable by the parent object is the number of pointers N(BP) per metadata node to the third power (i.e. $[N(BP)]^3$).

For example, if the number of pointers per metadata node is, for example, 128, then the parent object of one single tree level can manage up to 128 child objects, the parent object of two tree levels can manage up to 16384 child objects (more than 16 thousand child objects), the parent object of three tree levels can manage up to 2097152 child objects (more than 2 million child objects), and the parent object of four tree levels can manage up to 268435456 child objects (more than 268 million child objects), etc.

For example, in other exemplary embodiments, if the number N(BP) of pointers per metadata node is, for example, 256, then the parent object of one single tree level can manage up to 256 child objects, the parent object of two tree levels can manage up to 65536 child objects (more than 65 thousand child objects), the parent object of three tree levels can manage up to 16777216 child objects (more than 16 million child objects), and the parent object of four tree levels can manage up to 4294967296 child objects (more than 4 billion child objects), etc.

As previously mentioned, pointers of direct metadata nodes of the indirection object respectively point to root metadata nodes of other data objects (e.g. small objects, parent objects or child objects) and pointers of direct metadata nodes of a parent object respectively point to root metadata nodes of child objects (either by direct pointer reference or by indirect object reference, as discussed further below).

On the other hand, pointers of direct metadata nodes of a child object (or pointers of direct metadata nodes of a small object) point to data blocks storing the actual data of the data object.

The block size BS of data blocks is exemplarily fixed, e.g. to 4 kilobytes in exemplary embodiments, and therefore the size of data that can be stored in a child object (or small object) is equal to the number of direct metadata nodes thereof times the number of pointers N(BP) per metadata node.

That is, if the number of tree levels of a child object (or small object) is limited to a level threshold LT (e.g. maximally two tree levels at LT=2, or maximally three tree levels at LT=3), the maximal size of a child object (or small object) is the block size BS times the number of pointers N(BP) per metadata node to the power of (LT), i.e. the maximal size of a child object (or small object) is $BS \times [N(BP)]^{LT}$.

For example, if the number of pointers per metadata node is, for example, 128 and the block size BS of data blocks is exemplarily fixed to 4 kB in exemplary embodiments, the maximal size of a child object (or small object) at a maximum of one tree level per child object (or small object) is 512 kB, the maximal size of a child object (or small object) at a maximum of two tree levels per child object (or small object) is 64 MB, and the maximal size of a child object (or small object) at a maximum of three tree levels per child object (or small object) is 8 GB.

For example, in other exemplary embodiments, if the number of pointers per metadata node is, for example, 256 and the block size BS of data blocks is exemplarily fixed to 4 kB in exemplary embodiments, the maximal size of a child object (or small object) at a maximum of one tree level per child object (or small object) is 1024 kB (1 MB), the maximal size of a child object (or small object) at a maximum of two tree levels per child object (or small object) is 256 MB, and the maximal size of a child object (or small object) at a maximum of three tree levels per child object (or small object) is 64 GB.

In a preferred exemplary embodiment, the number of metadata node pointers is 256 and the maximum tree level of child objects is 2 (i.e. the child objects would not include any indirect metadata nodes).

Then, the maximum data (maximal size) of a child object (or small object) is exemplarily determined as 256 MB.

This means that if a data object (small object) at a size smaller or equal to 1 MB (1024 kB) is written or created, exemplarily the data object only includes the root metadata node, and the up to 256 pointers of the root metadata node of that object directly point to the up to 256 data blocks of 4 kB size each.

As soon as at least another $257^{th}$ data block is accumulatively written to the data object or such data object larger than 1 MB is created (at up to 256 MB), such small object is extended or created to include at least one direct metadata node and up to 256 direct metadata nodes. Such (small) data objects would cover the data object sizes between more than 1 MB (1024 kB) and up to 256 MB.

As soon as more than 256 MB of data is accumulatively written to the data object or the created data object includes more than 256 MB, the data object would be created or would become a large data object. Such large object would include a parent object having at least a root metadata node, and at least two child objects. Specifically, for data object sizes between more than 256 MB and up to 64 GB (256 child objects of 256 MB each), the data object would include a parent object including only the root metadata node (but no direct or indirect nodes), and such root metadata node would point to two or more and up to 256 root metadata nodes of the respective two or more and up to 256 child objects.

For objects larger than 64 GB, the parent object of the large object would include at least one or more direct metadata nodes, and optionally being further extended by one or more indirect metadata nodes.

The size of large data objects is practically unlimited, and already for three node tree levels in a parent object (i.e. one root metadata node, up to 256 indirect metadata nodes and therefore up to 65536 direct metadata nodes), the parent object can point to up to 16777216 child objects, which translates to up to 4096 TB (i.e. 4 PB).

In view of the above, it should become clear that the respective metadata tree structure of each object, including the indirection object, the small data object, the parent object and the child object includes at least the respective root metadata node and being extendible optionally and on requirement by one or more direct metadata nodes and optionally further extended by one or more indirect metadata nodes.

Only for small data objects or child data objects, the tree structure may be limited to only a root metadata node, to a root metadata node and direct metadata nodes, or to a root metadata node, direct metadata nodes and a limited number of one or more tree levels of indirect metadata nodes, depending on the maximum size of small/child data objects.

In exemplary embodiments, the maximum size of small/child data objects may be configurable.

In FIG. 6A exemplarily the indirection object (more specifically a pointer of a direct node thereof) points to the root metadata node R(CO) of a child object, and the child object metadata tree structure exemplarily has two tree levels, including a tree level of the root node a second/last tree level of direct metadata nodes.

Accordingly, the size of the child object is exemplarily limited to the block size BS times the square of the number of pointers N(BP) per metadata node. If further data is written to a large data object, since the size of child objects is fixed, additional child objects may be created when new data is written to the large data object.

In FIG. 6A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

Figure 6B:
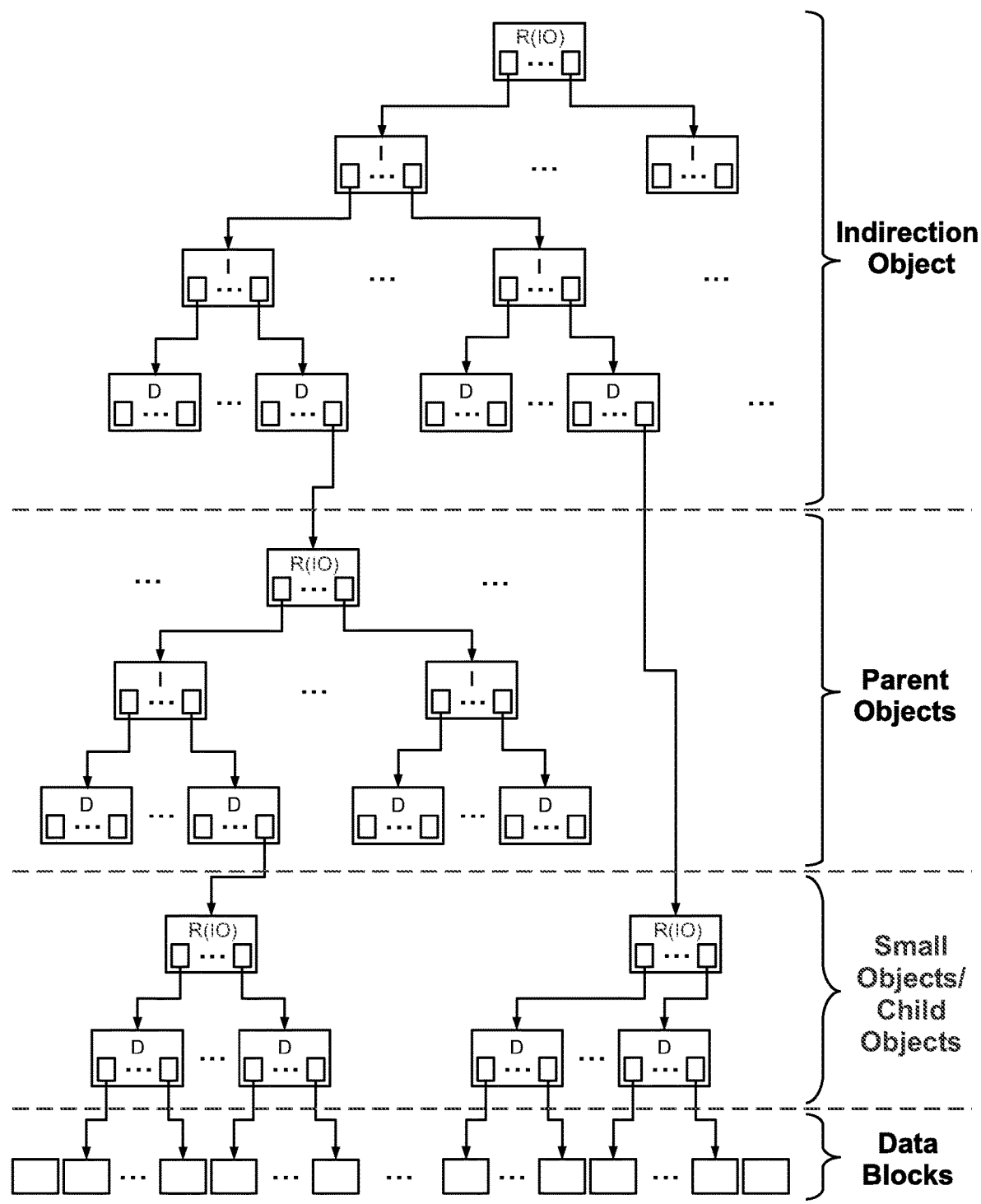
FIG. 6B exemplarily shows a schematic diagram of an exemplary metadata tree structure on a node apparatus according to some exemplary embodiments.

FIG. 6B exemplarily shows a schematic diagram of an exemplary metadata tree structure on a node apparatus according to some exemplary embodiments.

While most features of FIG. 6B are similar to FIG. 6A, in FIG. 6B, the pointers of direct metadata nodes of the parent object PO point to the root metadata nodes R(CO) of its associated respective child objects (local pointer or local object reference). The indirection object's direct metadata node pointers respectively point either to root metadata nodes of small objects or child objects which have been moved to this particular node apparatus, such as the other child object CO in FIG. 6B, e.g. such as child objects being referenced by a non-local pointer or non-local object reference from another node apparatus.

V. Data Object Distribution in Exemplary Embodiments

V.1.1 Stateless Distribution Approach

In a stateless scale-out approach, the data segments of the large data object are stored as independent child objects on the respective node apparatuses 1000, and each of the child objects points to the respective data blocks storing the respective data segment(s) of the large data object. However, exemplarily, no additional parent objects are provided.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the child object pointing to the target data of the data segment addressed by the received I/O access request.

For example, the location of data segments and/or child objects in the cluster system may be determined based on a deterministic algorithm. The deterministic algorithm may be used to determine intended locations of data segments of a large data object at the time of distributing the data segments thereof across the node apparatuses of the cluster system, and may be used to determine locations of data segments of a large data object when receiving I/O requests. Locations of child objects on node apparatuses may be managed by respective indirection objects.

For example, the I/O access request may include a reference to an offset of the target data in the large data object (or to another type of ID of the target data segment of the I/O access request), and the location of the respective target data/target data segment in the cluster may then be determined on the basis of the deterministic approach, which was already used at the time of distributing the data segments thereof across the node apparatuses of the cluster system. Such deterministic distribution approach may use a predetermined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective data segment.

Accordingly, when the receiving node apparatus 1000 receives an I/O access request to a data segment of the large data object, the receiving node apparatus 1000 (e.g. the scale-out layer thereof) determines the location of the target data segment based on information included in the I/O access request (e.g. input information or input parameter for the deterministic algorithm included in the I/O access request or determined based on information included in the I/O access request) and the defined deterministic algorithm to determine the node apparatus 1000 being responsible for the target data segment (i.e. the node apparatus 1000 storing the child object associated with the target data segment).

Then, upon determining the node apparatus 1000 being responsible for the target data segment, the receiving node apparatus 1000 may send the (or a corresponding) I/O access request to the identified node apparatus 1000 handling the respective target data segment. Upon processing the I/O request on the identified node apparatus 1000, a respective I/O response can be returned to the receiving node apparatus 1000 to issue an I/O response to the requesting client from the receiving node apparatus 1000.

A benefit of such stateless approach is that the number of message hops between node apparatuses of the cluster system in the handling/processing of I/O access requests is low, and typically only two hops are required (i.e. one message hop from the receiving node apparatus to the target node apparatus having the child object of the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system. However, since the distribution of data segments of a large data object is done based on a deterministic approach, hot spot data (such as data segments of storage devices being accessed frequently, or data segments stored on frequently accessed node apparatuses) cannot be re-distributed due to the deterministic approach.

Accordingly, the stateless approach advantageously allows for efficient communication across node apparatuses in the handling of I/O requests but has the disadvantage that hot spot data (such as frequently accessed data segments, or data segments stored on a frequently accessed storage device or node apparatus) cannot be moved to another node apparatus for rebalancing the system if needed or desired.

V.1.2 Stateful Distribution Approach

In a stateful scale-out approach, the data segments of the large data object are also stored as child objects on the respective node apparatuses 1000, and each of the child objects points to the respective data blocks storing the respective data segment(s) of the large data object.

Further exemplarily, one single parent object is provided for the large data object on one node apparatus, and the parent object points to all of the distributed child objects of the large data object, including the one or more child objects on the same node apparatus as the parent object and the other child objects on other node apparatuses. Therefore, no deterministic algorithm needs to be used in the handling of I/O access requests for finding the respective child object of the target data segment, however, a deterministic algorithm may still be used at the time of distribution of data segments.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the parent object of the respective data object and that (parent) node apparatus 1000 may need to forward the received I/O access request (or a corresponding I/O access request) to yet another node apparatus 1000 having the respective child object pointing to the target data of the data segment addressed by the received I/O access request.

For example, in the stateful scale-out approach, the location of data segments and/or child objects in the cluster system may be determined based on pointers of the associated parent object and, in particular, the pointers of the parent object to respective child objects on the same or on other node apparatuses may be used to determine locations of data segments of a large data object on the same or on other node apparatuses as the parent object.

For example, the I/O access request may include a reference to the parent object (such as an identifier of the parent object, or location information indicating the location of the parent object) and a reference to an offset of the target data in the large data object (or to another type of ID of the target data segment of the I/O access request), and the location of the respective target data/target data segment in the cluster may then be determined by first finding the parent object and then determining the location of the respective child object based on a pointer of the parent object identified based on the offset of the target data segment.

For example, the location of the parent object can be selected/determined by a simple function using the parent object ID (e.g. a parent object number) as input, e.g. a modulo function (such as the parent object number modulo a number of node apparatuses in the cluster system). Locations of parent and child objects on node apparatuses may be managed by respective indirection objects.

Accordingly, when the receiving node apparatus 1000 receives an I/O access request to a data segment of the large data object, the receiving node apparatus 1000 (e.g. the scale-out layer thereof) determines the location of the respective parent object of the large data object based on information included in the I/O access request (such as e.g. location information on the parent object and/or an identifier of the parent object) and sends the (or a corresponding) I/O access request to the identified node apparatus 1000 handling the respective parent object so that the identified node apparatus 1000 further handles the I/O request to be sent to the node apparatus 1000 having the respective child object pointing to the target data segment.

Alternatively, the receiving node 1000 may communicate with the identified node apparatus 1000 handling the respective parent object so as to determine the location of the respective child object and to send the I/O access request (or corresponding request) to the node apparatus 1000 having the respective child object pointing to the target data segment.

Then, upon determining the node apparatus 1000 being responsible for the target data segment, the receiving node 1000 or the parent object's node apparatus 1000 may send the (or a corresponding) I/O access request to the identified node apparatus 1000 handling the respective child object and target data segment.

Upon processing the I/O request on the identified node apparatus 1000, a respective I/O response can be returned to the receiving node apparatus 1000 directly or indirectly via the parent object's node apparatus 1000 to issue an I/O response to the requesting client from the receiving node apparatus 1000.

A benefit of such stateful approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node.

Accordingly, the stateful approach advantageously allows for efficient handling of hot spot data and easy re-distribution of child objects across node apparatuses of the cluster system, and easily provides the advantage that hot spot data (such as frequently accessed data segments, or data segments stored on a frequently accessed storage device or node apparatus) can be moved to another node apparatus for rebalancing the system if needed or desired.

However, the number of message hops between node apparatuses of the cluster system in the handling/processing of I/O access requests is higher, and typically at least three or even four hops are required (i.e. one message hop from the receiving node apparatus to the parent node apparatus having the parent node for forwarding the I/O request, one message hop from the parent object's node apparatus to target node apparatus having the child object of the respective target data segment for forwarding the I/O request, and one or more message hops from the target node apparatus back to the receiving node apparatus returning the I/O response).

That is, as a disadvantage, handling of I/O access requests can be handled across the node apparatuses with higher numbers of message hops.

Accordingly, the stateful approach has the disadvantage of less efficient communication across node apparatuses in the handling of I/O requests but has the advantage that hot spot data (such as frequently accessed data segments, or data segments stored on a frequently accessed storage device or node apparatus) can be moved easily to another node apparatus for rebalancing the system if needed or desired.

V.1.3 Hybrid Distribution Approach According to Exemplary Embodiments

In a hybrid scale-out approach, the data segments of the large data object are stored as plural child objects on the respective node apparatuses 1000, and each of the child objects points to the respective data blocks storing the respective data segment(s) of the large data object.

Further exemplarily, a parent object is provided for the large data object on each of the node apparatuses, and the parent object on each node apparatus points to all or at least some child objects of the large data object, including some or all of the child objects being held on the same node apparatus as the parent object.

In some embodiments, the parent object can be fully stored on each node apparatus 1000 so that each parent object on each node apparatus 1000 points to all of the child objects, and any child object may be located by observing an arbitrary one of the parent objects thereof. However, in preferred exemplary embodiments, each node apparatus 1000 may store only part of the parent object, each respective part of the parent object managing locations of a certain group of child objects, such that each child object is pointed to by one of the parts of the parent object. For example, upon creation of the data object (including creation of the parent object and the plural child objects), the child objects may be distributed across the plural node apparatuses of the cluster system, and each node apparatus may have the part of the parent object managing the locations of child objects initially created on the same node apparatus.

For example, in the hybrid scale-out approach, the intended location of data segments and/or child objects in the cluster system may be determined based on a deterministic algorithm.

The deterministic algorithm may be used to determine intended locations of data segments of a large data object at the time of distributing the data segments thereof across the node apparatuses of the cluster system, and may be used to determine the locations of respective parent object parts managing the locations of the data segments of a large data object when receiving I/O requests.

Locations of child objects and parent objects or parent object parts on node apparatuses may be managed by respective indirection objects.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the part of the parent object or parent object pointing to the respective child object pointing to the target data of the data segment addressed by the received I/O access request.

For example, the I/O access request may include a reference to an offset of the target data in the large data object (or to another type of ID of the target data segment of the I/O access request), and the intended location of the respective target data/target data segment in the cluster may then be determined on the basis of the deterministic approach, which was already used at the time of distributing the data segments thereof across the node apparatuses of the cluster system. Such deterministic distribution approach may use a pre-determined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective parent object or parent object part managing the location of the targeted child object or data segment.

Typically, on the time of creation, the child objects will be created on the same node apparatus 1000 which also stores the parent object or parent object part managing/indicating the location of the respective child object, so that typically the parent object or parent object part on a node apparatus 1000 points to child objects created/stored on the same node apparatus 1000, unless moved exceptionally to another node apparatus 1000 for purposes of load balancing.

Accordingly, when the receiving node apparatus 1000 receives an I/O access request to a data segment of the large data object, the receiving node apparatus 1000 (e.g. the scale-out layer thereof) determines the intended location of the target data segment based on a determination of the location of the parent object or parent object part based on information included in the I/O access request (e.g. input information or input parameter for the deterministic algorithm included in the I/O access request or determined based on information included in the I/O access request) and the defined deterministic algorithm to determine the node apparatus 1000 being responsible for the parent object or parent object part responsible for the target child object or target data segment (i.e. the node apparatus 1000 storing the parent object or parent object part associated with the child object associated with the target data segment).

Then, upon determining the node apparatus 1000 being responsible for the parent object or parent object part responsible for the target data segment, the receiving node apparatus 1000 may send the (or a corresponding) I/O access request to the identified node apparatus 1000 handling the parent object or parent object part responsible for the respective target child object/data segment.

On that node apparatus 1000 the location of the child object pointing to the target data segment may be determined, which may typically be on the same node apparatus 1000 but also on another node apparatus 1000 (e.g. in case the respective child object has been moved to another node apparatus 1000 since creation thereof).

If the respective child object is on the same node apparatus 1000, the I/O access request may be processed locally on that node apparatus 1000. On the other hand, if the parent object or parent object part on that node apparatus 1000 has a pointer relating to the target child object that points to another node apparatus 1000, the (or a corresponding) I/O access request may be sent to the other node apparatus 1000 to process the I/O access request.

Upon processing the I/O request on the identified node apparatus 1000, a respective I/O response can be returned directly or indirectly to the receiving node apparatus 1000 to issue an I/O response to the requesting client from the receiving node apparatus 1000.

Accordingly, in principle, the child object will be on the same node apparatus as the parent object or parent object part pointing to that respective child object, and the number of required hop messages in I/O request processing may be as low as in the above stateless approach.

However, as a benefit of the hybrid approach it is easily possible to move one or more child objects to other node apparatuses 1000 if required for purposes of load balancing, e.g. by moving hot spot data.

A further benefit of such hybrid approach is that the number of message hops between node apparatuses of the cluster system in the handling/processing of I/O access requests is low, and typically only two hops are required (i.e. one message hop from the receiving node apparatus to the target node apparatus having the parent object or parent object part pointing to the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system.

As previously mentioned, another benefit of such hybrid approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node or parent node part.

Accordingly, the hybrid approach advantageously allows for efficient handling of hot spot data and easy re-distribution of child objects across node apparatuses of the cluster system for purposes of load balancing, and easily provides the advantage that hot spot data (such as frequently accessed data segments, or data segments stored on a frequently accessed storage device or node apparatus) can be moved to another node apparatus for rebalancing the system if needed or desired.

Summarizing, the hybrid approach on the one hand advantageously allows for efficient communication across node apparatuses in the handling of I/O requests, similar to the benefits of the above stateless approach, and, on the other hand, also has the advantage that hot spot data (such as frequently accessed data segments, or data segments stored on a frequently accessed storage device or node apparatus) can be moved to another node apparatus for rebalancing the system if needed or desired, similar to the benefits of the above stateful approach.

As a consequence, the hybrid approach combines the benefits of both of the above stateful and stateless approaches.

V.2 Distribution of Data Objects According to Exemplary Embodiments

As discussed above, the data objects may be managed either as small data objects, if the size thereof is equal to or smaller than the distribution size, or large data objects which include a parent node pointing to two or more child objects, each child object being of a size equal to or smaller than the distribution size while the size of the large data object is larger as the distribution size.

V.2.1 Distribution of Small Data Objects

Figure 4A:
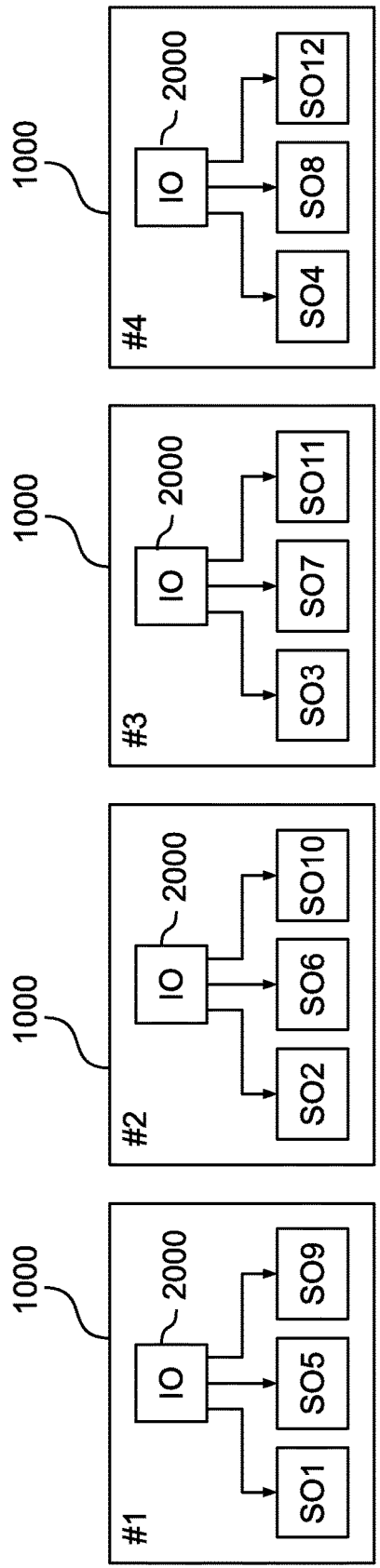
FIG. 4A exemplarily shows a distribution of plural small data objects across a plurality of node apparatuses of a cluster system according to a hybrid scale-out approach according to some exemplary embodiments.

FIG. 4A exemplarily shows a distribution of plural small data objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

Further exemplarily, the twelve small data objects SO1 to SO12 (each of a size equal or smaller than a predetermined distribution size) are stored in a distributed manner across the node apparatuses 1000 (numbered #1 to #4), and exemplarily the small data objects SO1 to SO12 are distributed across the cluster system in accordance with a deterministic algorithm.

That is, based on an identifier (such as e.g. an object ID or object number) of the respective small data object, the deterministic algorithm allows to determine a location of the respective small data object.

Still, for load balancing purposes, the small data objects can be moved to other node apparatuses.

In some exemplary embodiments, such movement of a small object may involve to assign another identifier (such as e.g. an object ID or object number) to the respective small data object corresponding to the new location, i.e. such that the deterministic algorithm outputs the new location of the respective small data object after movement thereof based on the new assigned identifier.

However, in other preferred exemplary embodiments, if the identifier object such as an object ID or object number of the object shall preferably not be changed despite the data movement, thereby making object management easier, the indirection object may be updated such as to indicate the location of the moved small data object.

For example, upon movement of a small data object from one node apparatus to another node apparatus, the indirection object may be updated so that the respective block pointer in the direct node of the indirection object pointing to the respective small data object is updated so as to point to the new location on the other node apparatus instead of the previous location on the local node apparatus.

For such purpose, in some exemplary embodiments, the indirection object may support and/or have metadata nodes including two types of pointers, such as e.g. a local pointer type (e.g. using a disk or storage device reference) that points to a location of a root metadata node of a data object on the local node apparatus, and a non-local pointer type (e.g. using an object reference) that points to a location of a data object or the root metadata node of the data object on another node apparatus.

For a similar purpose, in some exemplary embodiments, the parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus. Such aspects will be described for some exemplary embodiments in more detail below.

V.2.2 Distribution of Large Data Objects

Figure 4B:
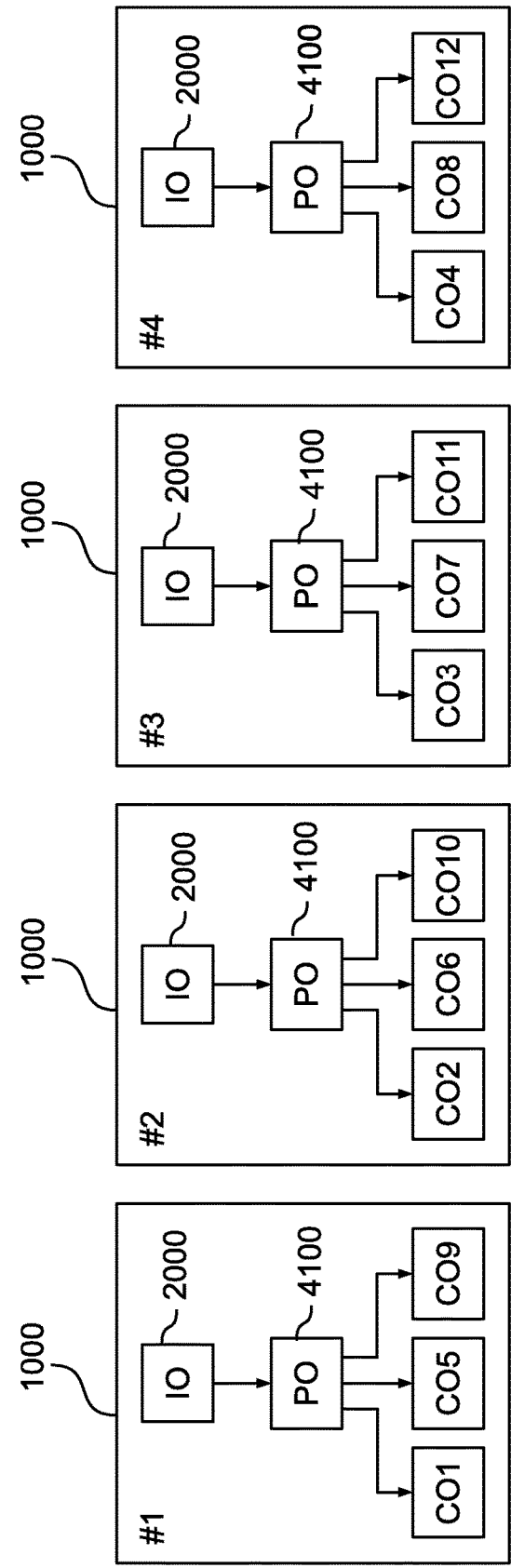
FIG. 4B exemplarily shows a distribution of plural large data objects across a plurality of node apparatuses of a cluster system according to a hybrid scale-out approach according to some exemplary embodiments.

FIG. 4B exemplarily shows a distribution of a large data object including the parent object and child objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000, and each node apparatus 1000 stores a group of child objects of the child objects CO1 to CO12 of the respective large data object.

Further exemplarily, each of the node apparatuses 1000 storing a group of child objects of the child objects CO1 to CO12 of the respective large data object additionally stores an associated parent object 4100 (or parent object part) which exemplarily points to the locations of the respective child objects stored on the particular node apparatus 1000.

Accordingly, while the node apparatus 1000 labeled with #1 in FIG. 4B stores the child objects CO1, CO5 and CO9 of the respective large data object, the respective associated parent object 4100 (or parent object part) of the large data object on the node apparatus 1000 labeled with #1 in FIG. 4B points to these child objects CO1, CO5 and CO9.

So, generally the parent object 4100 (or parent object part) on a node apparatus 1000 points to the child objects stored on the same node apparatus 1000 (but it may also point to all other child objects on other node apparatuses in further exemplary embodiments).

Further exemplarily, the twelve child objects CO1 to CO12 (each of a size equal or smaller than a predetermined distribution size) are stored in a distributed manner across the node apparatuses 1000 (numbered #1 to #4), and exemplarily the child objects CO1 to CO12 are distributed across the cluster system in accordance with a deterministic algorithm, at least at the time of creation of the large data object in the cluster system.

Accordingly, based on an identifier of the respective child objects and based on the deterministic algorithm, the intended location of each child object may be determined, and the respective child object may then be accessed through the parent object 4100 (or parent object part) stored in the node apparatus 1000 of the intended location according to the deterministic algorithm.

Still, the child object can be moved to another node apparatus 1000 (contrary to the stateless approach discussed above) in that the child object is moved to another node apparatus and the pointer to that child object in the parent object or parent object part on the node apparatus of the former location is adjusted or updated based on the new location.

Then, the location of the responsible parent object or parent object part may be determined still on the basis of the same deterministic approach but the location of the respective child object on another node apparatus 1000 may be dynamically determined by reading the respective pointers or references in that parent object or parent object part.

While FIG. 4B exemplarily shows that each node apparatus 1000 of the cluster system has child objects and a parent object of the same large data object, distributed according to a distribution map (1,2,3,4), other distribution schemes are possible. Specifically, it is possible that child objects of a certain large data object are distributed across a subset of node apparatuses 1000 of the cluster system, and e.g. that child objects of different large data objects are distributed across different subsets of node apparatuses 1000 of the cluster system, e.g. based on different cluster maps.

For example, in the below example of FIG. 5A, two large data objects, and child objects thereof, are distributed on different subsets of three node apparatuses 1000 in a cluster system including four node apparatuses 1000 labelled #1 to #4.

Figure 5A:
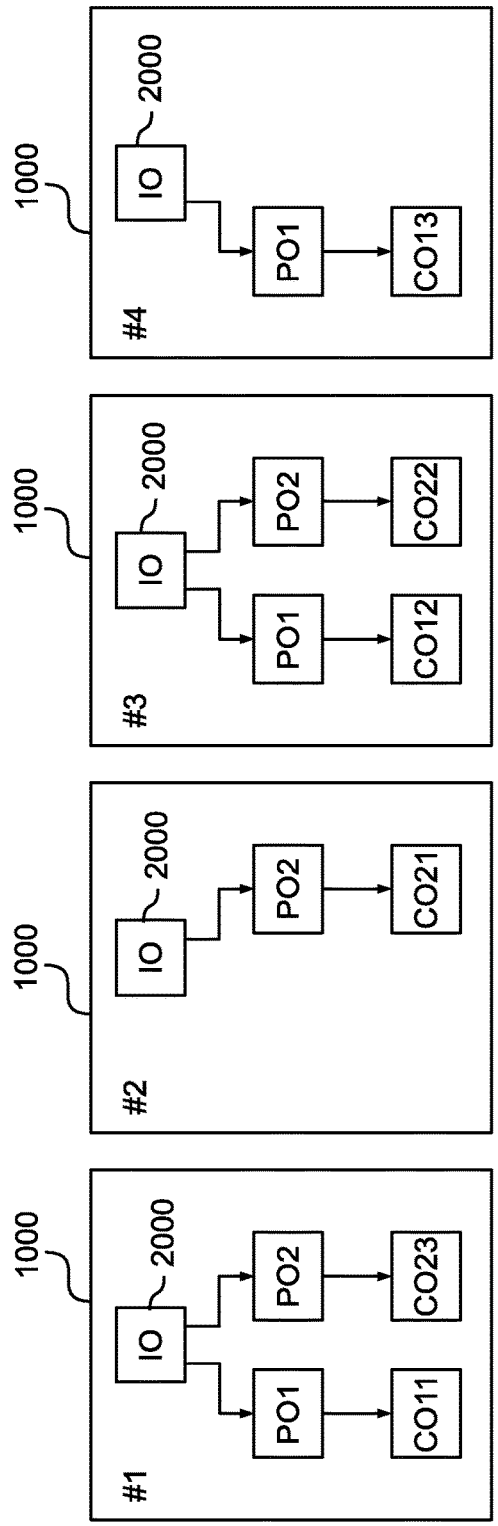
FIG. 5A exemplarily shows a distribution of plural large data object across a plurality of node apparatuses of a cluster system according to a hybrid scale-out approach according to exemplary embodiments.
Figure 5B:
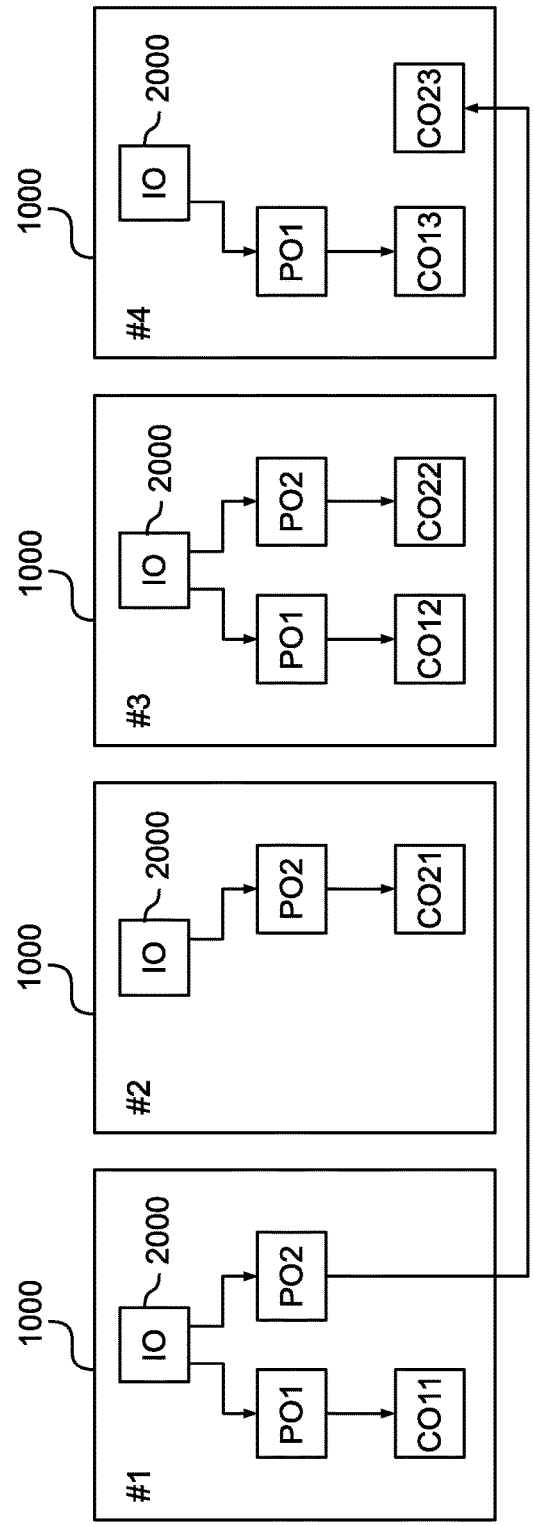
FIGS. 5B to 5D show a distribution of plural large data object across a plurality of node apparatuses of a cluster system according to a hybrid scale-out approach according to some exemplary embodiments after moving a data object segment to another node apparatus.
Figure 5C:
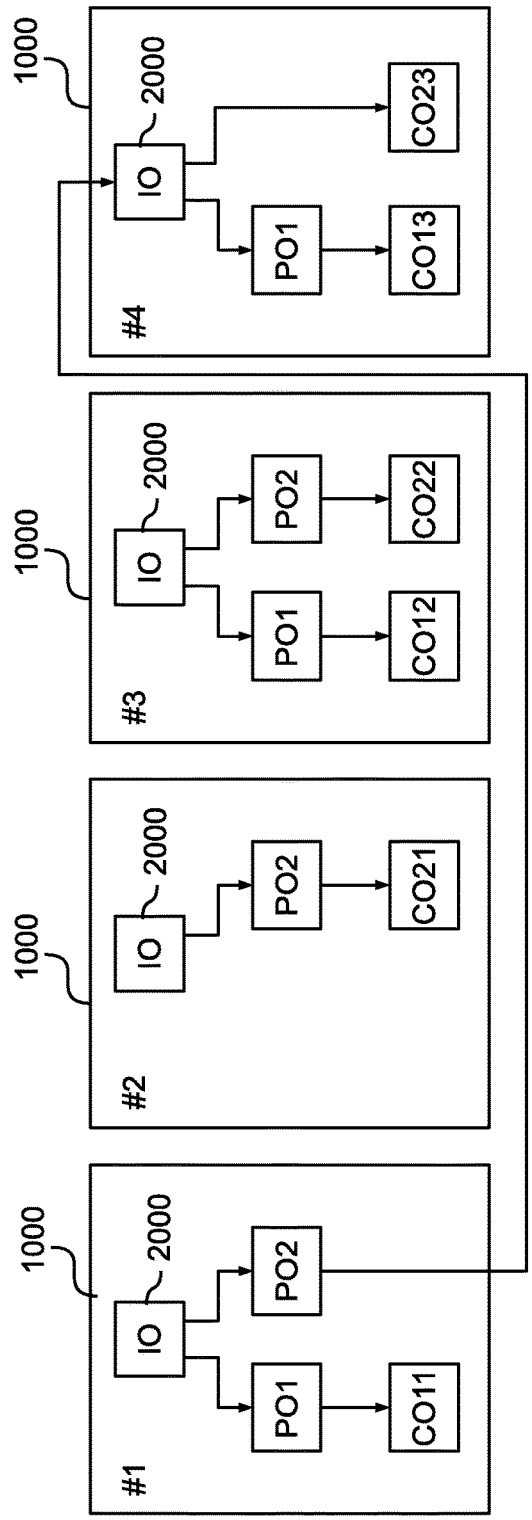
Figure 5D:
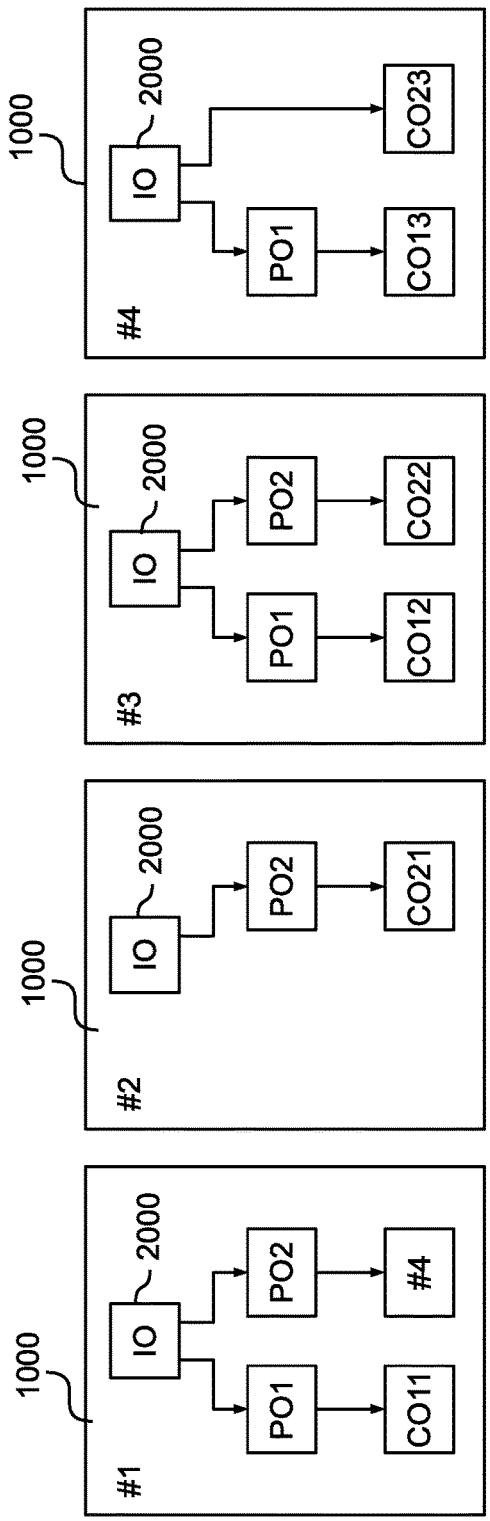

FIG. 5A exemplarily shows a distribution of plural large data object across a plurality of node apparatuses of a cluster system according to a hybrid scale-out approach according to exemplary embodiments, and FIGS. 5B to 5D show a distribution of plural large data object across a plurality of node apparatuses of a cluster system according to a hybrid scale-out approach according to some exemplary embodiments after moving a data object segment to another node apparatus.

Exemplarily, in FIG. 5A, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

A first large object associated with the parent object PO1 is distributed across the node apparatuses #1, #3 and #4 based on a distribution map (1,3,4), and a second large object associated with the parent object PO2 is distributed across the node apparatuses #1, #2 and #3 based on a distribution map (2,3,1).

For example, in the above denotation, a cluster map (#a,#b,#c) would indicate that node apparatuses #a, #b and #c store data segments or child objects of a certain large data object in that the data segments or child objects are stored in a distributed manner on these node apparatuses #a, #b and #c, while, exemplarily, a first data segment/child object of the respective large object is stored on node apparatus #a, a second data segment/child object of the respective large object is stored on node apparatus #b, a third data segment/child object of the respective large object is stored on node apparatus #c, a fourth data segment/child object of the respective large object is stored on node apparatus #a again, a fifth data segment/child object of the respective large object is stored on node apparatus #b again, etc.

That is, if data segments or child objects are distributed across a number of N node apparatuses, the (N+1)-th data segment or child object may be stored initially on the same node apparatus as the $1^{st}$ data segment or child object, and the M-th data segment or child object (M being larger than N) may be stored initially on the same node apparatus as the (M−N)-th data segment or child object, wherein the node apparatuses (and/or the order thereof) storing the first N data segments or child objects may be indicated by the distribution map.

It is to be emphasized that different distribution maps may be used for distribution of different large data objects in some embodiments. However, it is further emphasized that the format of distribution maps is not limited to the above denotation, and plural different formats may be used.

In connection with distribution maps in the sense of the present disclosure, it is mentioned that a distribution map is generally indicative of the node apparatuses 1000 among which the large data object is stored in a distributed manner, and the distribution map may generally be further indicative of a particular node apparatus 1000 storing a particular data segment or child object of a large object.

In the example of FIG. 5A, the indirection objects 2000 point to the respective parent objects PO1 and/or PO2 on the respective node apparatus 1000, and the parent objects PO1 and PO2 respectively point to the child objects of the respective large data object on the respective node apparatus 1000, i.e. parent object PO1 on node #1 points to child object CO11 and parent object PO2 on node #1 points to child object CO23, parent object PO2 on node #2 points to child object CO21, parent object PO1 on node #3 points to child object CO12 and parent object PO2 on node #3 points to child object CO22, and parent object PO1 on node #4 points to child object CO13.

For example, if an I/O access request to the large data object into a data segment pointed to by child object CO13 is received on node apparatus 1000 labeled as #2, the location of child object CO13 is determined based on the deterministic algorithm.

For example, it is determined that the I/O access request is directed to the third segment of the respective large data object which is distributed according to the distribution map (1,3,4), and that, therefore, the child object 13, which stores the third segment of the respective large data object, is typically stored on node #4 based on such distribution map.

The node apparatus #2, as receiving node apparatus, therefore forwards the I/O access request (or a corresponding access request) to node apparatus #4, and the location of the child object 13 is determined based on the metadata structures of the indirection object 2000 on node apparatus

4 to identify the location of the parent object PO1 on node apparatus #4 and based on the metadata structure of the respective parent object PO1 on node apparatus #4 which points to the child object 13 on node apparatus #4.

Then, node apparatus #4 may continue to process the I/O access request in connection with the data of the data segment of child object 13 on node apparatus #4, and a response may be sent back to the initial receiving node apparatus #2 which may then issue a corresponding I/O access response to the requesting client.

V.3 Child Object Movement in Exemplary Embodiments

In the above, the parent object location of a parent object or parent object part pointing to the accessed child object is determined based on a deterministic algorithm. Still, as mentioned above, the hybrid approach allows to move child objects to other node apparatuses for purposes of load balancing.

For example, in FIGS. 5B to 5C, the child object CO23 is exemplarily moved to the fourth node apparatus 1000 (#4). Exemplarily, the pointers of the parent object PO2 on node apparatus 1000 (#1) are adjusted accordingly to reflect the new location of the moved child object CO23, but the location of the child object CO23 is still managed by the parent object PO2 (or parent object part) on node apparatus 1000 (#1).

For example, if an I/O access request to the large data object into a data segment pointed to by child object CO23 is received on node apparatus 1000 labeled as #2, the designated (intended) location of child object CO23 is determined based on the deterministic algorithm.

For example, it is determined that the I/O access request is directed to the third segment of the respective large data object which is distributed according to the distribution map (2,3,1), and that, therefore, the child object CO23, which stores the third segment of the respective large data object, is typically stored on node #1 based on such distribution map.

The node apparatus #2, as receiving node apparatus, therefore forwards the I/O access request (or a corresponding access request) to node apparatus #1, and the location of the child object CO23 is determined based on the metadata structures of the indirection object 2000 on node apparatus #1 to identify the location of the parent object PO2 on node apparatus #1 and based on the metadata structure of the respective parent object PO2 on node apparatus #1 which points to the child object CO23 on the other node apparatus #4.

Then, node apparatus #1 may forward the I/O access request (or a corresponding access request) to node apparatus #4, and node apparatus #4 may continue to process the I/O access request in connection with the data of the data segment of child object CO23 on node apparatus #4, and a response may be sent back directly or indirectly (via node apparatus #1) to the initial receiving node apparatus #2 which may then issue a corresponding I/O access response to the requesting client.

In the above, by referring to the metadata structure of the parent object PO2 on node apparatus #1, the location of child object CO23 may be determined even though the child object CO23 is not stored anymore on node apparatus #1 as was indicated by the determination based on the deterministic algorithm, in that the location of child object CO23 is determined based on a pointer of parent object PO2 on node apparatus #1 including a pointing reference to the child object CO23 in the new location of node apparatus #4.

Plural possible embodiments of pointers to child objects on other node apparatuses are possible, and the present invention is not limited to a certain embodiment thereof.

For example, in FIG. 5B, the parent object PO2 on node apparatus #1 exemplarily includes a direct pointer to the child object CO23 on node apparatus #4 (e.g. by including a reference information indicative of a storage location of a root metadata node of the child object CO23 on storage devices of the node apparatus #4), so that the child object CO23 on node apparatus #4 can be accessed without the requirement to reference the indirection object 2000 of node apparatus #4 for identifying the location of the child object CO23 on node apparatus #4.

Further exemplarily, in FIG. 5C, the parent object PO2 on node apparatus #1 exemplarily includes a direct pointer to the indirection object 2000 on node apparatus #4 (e.g. by including a reference information indicative of a storage location of a root metadata node of the indirection object 2000 on storage devices of the node apparatus #4), so that the indirection object 2000 of node apparatus #4 can be accessed to identify the location of the child object CO23 on node apparatus #4.

Further exemplarily, in FIG. 5D, the parent object PO2 on node apparatus #1 exemplarily includes a block pointer pointing to a data block on storage devices of the node apparatus #1 in which location information is stored that allows to identify the node apparatus on which the child object CO23 is newly stored after movement thereof. This is exemplarily indicated in FIG. 5D by the data block indicating the node apparatus #4 on which the child object CO23 is newly stored after movement thereof.

However in further embodiments as described in more detail below the location information may store an identifier of the child object CO23 (such as an object ID or object number) that can be used as input to the same deterministic algorithm as used for distribution of small data objects, to determine the new location of the respective child object CO23 based on the identifier stored in the data block pointed to by the parent object PO2 on node apparatus #1 and the deterministic algorithm underlying the data distribution in the cluster system.

In some exemplary embodiments, child objects can be pointed to by an indirection object similar to small data objects and parent objects being pointed to by the indirection object. Such metadata structure is exemplarily illustrated in FIG. 6A, which exemplarily shows a schematic diagram of an exemplary metadata tree structure on a node apparatus according to some exemplary embodiments.

For example, in FIG. 6A, the metadata tree structure of a parent object on a node apparatus is pointed to by the metadata tree structure of the indirection object (rooted in a root metadata node R(IO)) in that a pointer of a direct metadata node of the indirection object points to the root metadata node R(CO) of the parent object CO.

In the same way, the metadata tree structure of a child object on the node apparatus is pointed to by the metadata tree structure of the indirection object (rooted in a root metadata node R(IO)) in that a pointer of a direct metadata node of the indirection object points to the root metadata node R(CO) of the child object CO.

In this sense, the parent and child objects, and small data objects, may exist in parallel metadata tree structures at a data object level below the metadata tree structure of the indirection object level, in that all root metadata nodes of data objects (parent objects, child objects, small data object, system objects) may be directly pointed to by pointers of a direct metadata node tree level of the indirection object on a particular node apparatus.

In FIG. 6A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects, at least the ones locally managed on the same node apparatus; see e.g. FIG. 6B. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

VI. Object Number Allocation in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

Exemplarily, each node apparatus is assigned another range in the object number space, and a deterministic algorithm is used to provide a mapping function uniquely (and optionally surjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same node apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#1).

In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

It is to be noted that the invention is not limited to any specific deterministic algorithm used to provide a deterministic mapping function for determining a distribution map in the cluster.

In general, a deterministic mapping function algorithm may take one or more input values, including e.g. a total number of nodes of the cluster (which may change by adding or removal of one or more node apparatuses), a number of a subset of nodes used to distribute data segments of parent objects (e.g. if in a cluster of N node apparatuses, the data segments/child objects of certain parent objects shall not be distributed across all N nodes but to respective subsets of M node apparatuses with M<N), an object identifier or a parameter deterministically determined based on such object identifier (e.g. an object number or parameter determined based on the object number), and/or a data segment number.

As output value(s), e.g. if the deterministic algorithm takes the object identifier or a parameter deterministically determined based on such object identifier (e.g. an object number or parameter determined based on the object number) as input value, the deterministic algorithm may directly output a distribution map indicating the respective main node apparatus to store the small data object or first data segment of a parent object being associated with the input value object identifier and optionally additionally indicating the one or more other node apparatuses to store the other data segments of the associated parent object in a distributed manner.

In other exemplary embodiments, the e.g. if the deterministic algorithm takes the object identifier or a parameter deterministically determined based on such object identifier (e.g. an object number or parameter determined based on the object number) as one input value and a data segment number as another input value, the deterministic algorithm may directly output information identifying a certain specific node apparatus to store a certain data segment of a certain object. Then, locations of small data objects and locations of a first data segment of a parent object being associated with the input value object identifier would be output if the other input value would indicate the first data segment (such as e.g. being the lowest data segment number, such as e.g. data segment number 0).

VI.1 Object Number Lists in Exemplary Embodiments

Generally, object numbers can be managed in such a way that each node apparatus of the cluster system stores a respective object number list of object numbers handled by itself, i.e. a list indicative of plural object numbers which map, when using the mapping function of the deterministic algorithm, to the node apparatus itself.

That is, each object number of an object number list stored at a certain node apparatus includes those (and preferably only those) object numbers that map, when being used an input parameter in the mapping function, to the certain node apparatus.

When using a deterministic algorithm that provides a distribution map on the basis of an object number as input parameter, each object number of an object number list stored at a certain node apparatus includes those (and preferably only those) object numbers that map, when being used an input parameter in the distribution map providing function, to distribution maps that indicate that a first data segment of a large data object is to be stored to the certain node apparatus.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), the object number list stored on the first node apparatus (#1) would be indicative of the object numbers (and preferably only those object numbers) that map to the distribution maps (1,2,3) and (1,3,2); or more generally to one or more or all distribution maps (1,2), (1,3), (1,2,3), and (1,3,2) (if M is 1, 2 or 3).

Furthermore, in the object number list on each node apparatus, the node apparatus preferably tracks whether the respective object number is used or not used on the particular node apparatus.

Accordingly, when a new object is created on a node apparatus, the node apparatus can allocate/assign a free (non-used) object number from the object number list to the newly created object. Then, the respective object number may be indicated to be used in the object number list by updating the object number list upon creation of a new object.

Accordingly, each node can autonomously assign unique object numbers to newly created objects, and still if another node apparatus, which has no knowledge about creation of the newly created object, receives a request to access the newly created object by an I/O request including the object number thereof as object reference, such receiving node apparatus can determine the location of the newly created based on the deterministic algorithm.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), if the first node apparatus (#1) receives an I/O access request to a data object having the object number 14 and the deterministic algorithm using the input of the object number 14 returns an identifier of the second node apparatus (#2) or any of the distribution maps (2,3,1), (2,1,3), (2,1), or (2,3), then the first node apparatus (#1) is able to determine that a location of the respective object is on the second node apparatus (#2).

VI.2 Child Object Numbers in Exemplary Embodiments

Object numbers of child objects may not be communicated to upper layers (above the metadata layer or above the scale-out layer) and only object numbers of the large data object may be communicated to such upper layers, in exemplary embodiments, such that upper layers issue access requests to large data object by the object number of the large data object and an offset in the large data object, e.g. in that an object reference may include a segment number as an indicator of an offset.

Then, a first data segment of a large data object having the object number R may be addressed as R:0, a second data segment of a large data object having the object number R may be addressed as R:1, etc.

Then, the deterministic algorithm still allows to determine, by any node apparatus, the (intended) location of a respective child object based on a distribution map associated with the respective object number of the large data object, and the actual location of the child object may be indicated by the parent object stored on the node apparatus of the (intended) location of the respective child object.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), if the first node apparatus (#1) receives an I/O access request to a large data object having the object number 14 at an offset 5 (14:5), indicating the sixth data segment of the large data object with object number 14, and the deterministic algorithm using the input of the object number 14 returns a distribution map (1,2,3), then the first node apparatus (#1) is able to determine that a (intended) location of the respective child object is on the third node apparatus (#3).

VII. Deterministic Distribution Algorithm in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

As previously mentioned, exemplarily, each node apparatus is assigned another range in the object number space, and a deterministic algorithm is used to provide a mapping function uniquely (and optionally surjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same node apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#1). In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

For example, according to object number grouping described above, if the number of pointers of a metadata node of the indirection object is N(BP), the input parameter of the mapping function (or distribution map providing function) may be taken as the quotient of the object number (or the object number minus one, if the object number counting starting at 1) for divisor $N(BP)^L$ (L being an integer of one, two or three or more) by neglecting the remainder, such that each group of $N(BP)^L$ subsequent object numbers leads to a same input parameter and thus to a same mapped node apparatus or same distribution map.

In some examples, a known algorithm such as the CRUSH (Controlled Replication Under Scalable Hashing) algorithm may be used to realize a mapping function and a distribution map providing function. Also, modified mapping algorithms based on the CRUSH algorithm may be used.

The deterministic algorithm according to some exemplary embodiments may include a pseudo-random number generator which takes the input value combined with a node number (node ID) as a seed and returns a pseudo-random number which is however returned each time the same seed is used. Accordingly, each seed is associated with a fixed pseudo-random number. Accordingly, each combination of an input value being determined based on the object number and node ID (node number) is associated with a fixed pseudo-random number.

Further exemplarily, for each object number of the range of object numbers 1 to N and for each node apparatus, a respective seed is determined and used to determine an associated pseudo-random number.

For a given object number, the main node apparatus (e.g. a node apparatus intended to store a small data object of the given object number or a first segment of a large data object of the given object number) can be determined for example as the node apparatus which is associated with the largest pseudo-random number (or the smallest pseudo-random object number) among the pseudo-random numbers returned for the node apparatuses for the given object numbers.

Furthermore, in order to determine a distribution map based on the above algorithm using pseudo-random numbers, a distribution sequence of node apparatuses storing further data segments of large data objects may be determined based on the ordering of the pseudo-random numbers returned for the node apparatuses for the given object numbers.

Also, only a subset of node apparatuses may be selected for the distribution of data segments, i.e. by taking only the node apparatuses having the M largest (or smallest) pseudo-random numbers among all pseudo-random numbers. In the example, the distribution maps are exemplarily determined to select four node apparatuses among the six node apparatuses by exemplarily taking the four largest pseudo-random numbers among all pseudo-random numbers returned for the node apparatuses for the given object numbers.

It is emphasized that the algorithm can be extended to be used for an arbitrary number of object numbers, an arbitrary total number of node apparatuses in the cluster system, as well as to an arbitrary number of node apparatuses (between two and the total number of node apparatuses in the cluster system) being used for a certain distribution map.

It is to be noted that the invention is not limited to any specific deterministic algorithm used to provide a deterministic mapping function for determining a distribution map in the cluster.

In general, a deterministic mapping function algorithm may take one or more input values, including e.g. a total number of nodes of the cluster (which may change by adding or removal of one or more node apparatuses), a number of a subset of nodes used to distribute data segments of parent objects (e.g. if in a cluster of N node apparatuses, the data segments/child objects of certain parent objects shall not be distributed across all N nodes but to respective subsets of M node apparatuses with M<N), an object identifier or a parameter deterministically determined based on such object identifier (e.g. an object number or parameter determined based on the object number), and/or a data segment number.

As output value(s), e.g. if the deterministic algorithm takes the object identifier or a parameter deterministically determined based on such object identifier (e.g. an object number or parameter determined based on the object number) as input value, the deterministic algorithm may directly output a distribution map indicating the respective main node apparatus to store the small data object or first data segment of a parent object being associated with the input value object identifier and optionally additionally indicating the one or more other node apparatuses to store the other data segments of the associated parent object in a distributed manner.

In other exemplary embodiments, the e.g. if the deterministic algorithm takes the object identifier or a parameter deterministically determined based on such object identifier (e.g. an object number or parameter determined based on the object number) as one input value and a data segment number as another input value, the deterministic algorithm may directly output information identifying a certain specific node apparatus to store a certain data segment of a certain object. Then, locations of small data objects and locations of a first data segment of a parent object being associated with the input value object identifier would be output if the other input value would indicate the first data segment (such as e.g. being the lowest data segment number, such as e.g. data segment number 0).

VIII. Data De-Duplication in Exemplary Embodiments

According to preferred exemplary embodiments, the data storage system is controlled so as to perform data de-duplication.

In principle, data de-duplication could be executed as disclosed in the patent application "SYSTEM AND METHOD FOR MANAGING DE-DUPLICATION USING CHECKPOINTS IN A FILE STORAGE SYSTEM" filed on Sep. 19, 2012 as application No. PCT/US2012/056032 A1, published as WO 2014/046650 A1, which is incorporated herein by reference.

In such examples, data objects are managed as metadata tree structures and direct metadata nodes of such data objects include block pointers (block references) pointing to data blocks storing the data. This is similar to some exemplary embodiments in that direct metadata nodes of data objects, and in particular small data objects and child data objects of large data objects, include block pointers (block references) pointing to data blocks storing the data.

When it is determined that data blocks associated with different data objects contain the same data ("duplicate data block"), the metadata direct node of one of the data objects is updated in that its block pointer is updated to point to the same data block, so that two block pointers of two direct metadata node associated with different data objects point to the same data block (i.e. the data block is shared between the data objects). Then, the other data block can be freed and only one data block containing the duplicate data is referenced by two data objects.

However, the data is stored only once in a single data block, and thus data storage capacity can be saved efficiently.

Such process is referred to as "de-duplication" in that duplicate data being associated with two or more data objects only needs to be physically stored once, and also only takes one logical block address in the logic block address space. The number of direct metadata nodes pointing to the same data block is unlimited.

However, in contrast to the above process of de-duplication as known from WO 2014/046650 A1, in some exemplary embodiments the duplicate data in a data storage system is managed by storing and managing a specific data object, referred to as "de-duplication object". The de-duplication object can be managed similar as the other data objects in the data system, in particular in connection with data distribution of and I/O access to data objects.

VI11.1 De-Duplication Object in Exemplary Embodiments

Accordingly, in some exemplary embodiments, the de-duplication object may be managed by a metadata tree structure similar to other data objects, e.g. in that a root metadata node of the de-duplication object is referenced by the indirection object (e.g. a pointer of a direct metadata node of the indirection object points to the root metadata node of the de-duplication object).

The root metadata node of the de-duplication object may include plural pointers (metadata node references) pointing to indirect and/or direct metadata nodes of the de-duplication object, and pointers (block references) of the direct metadata nodes of the de-duplication object may point to data blocks (e.g. similar to the direct metadata nodes of small and child data objects).

In principle the number of tree levels of the metadata tree structure of the de-duplication object may be unlimited, however, in preferred exemplary embodiments the de-duplication object is managed similar to other data objects as either a small data object, if the size of the de-duplication object is smaller than or equal to the distribution size being the unit of data distribution across the node apparatuses of the cluster system, or as a plurality of independent small data objects or even preferably as a large data object, if the size of the de-duplication object is larger than the distribution size.

In the latter case, the de-duplication object includes a parent object and plural child objects as described for regular data objects discussed above. Then, the de-duplication object is distributed across the node apparatuses of the cluster system in that the data of the de-duplication object is divided into plural data segments of the distribution size and each data segment is managed by a respective child object, and the child objects are stored in a distributed manner across the node apparatuses in accordance with above-described exemplary embodiments.

On the other hand, each of the child objects of the de-duplication object may be referenced by a respective object reference of a parent object (or parent object part) of the de-duplication object, and the parent object (or parent object parts) of the de-duplication object is distributed across the node apparatuses of the cluster system, and typically a parent object (or parent object part) of the de-duplication object on one of the node apparatuses points to child objects of the de-duplication object on the same node apparatus (e.g. unless the respective child object has been moved to another node apparatus for load balancing purposes).

In some exemplary embodiments, pointer portions in direct metadata nodes of metadata tree structures may include either block pointers indicating logical block addresses (e.g. logical block numbers) of data blocks (e.g. in direct metadata nodes of the small data objects, child objects and the de-duplication object) or object references indicating object identifiers (e.g. object numbers) and optionally including block/offset identifiers (e.g. offsets) indicating a target portion in the referenced object. Such object references may be used by parent objects for pointing to their child objects or by small data objects and child objects for referencing the de-duplicated data managed by the de-duplication object.

As an advantage of the above, while the de-duplication object may manage de-duplicated data in the data storage system, the de-duplication object may be distributed across the node apparatuses in a same efficient and reliable manner as other data objects, and de-duplicated data can be moved for load balancing purposes (and can be re-distributed by node apparatus addition or node apparatus removal) in the same way as other objects. On the other hand, the de-duplication object can be accessed within the whole data storage system, and efficiently allows de-duplication of duplicate data on all node apparatuses in contrast to only on the respective node apparatuses individually and separately.

VIII.2 General De-Duplication Procedure in Exemplary Embodiments

In general, according to exemplary embodiments, the direct metadata nodes of the de-duplication object (or of child objects thereof) include block pointers pointing to data blocks storing user data that has been de-duplicated (i.e. which may relate to multiple other data objects or at least different data blocks of the same or different data objects).

The direct metadata nodes of data objects (such as small data objects or child objects of large data objects) may include block pointers pointing to data blocks storing user data or may include object references to the de-duplication object in connection with de-duplicated data blocks.

For example, if the data of a first data block of a first data object is a duplicate of another second data block of a second data object, a previously non-used block pointer of a direct metadata node of the duplication object may be updated to point to the first (or second) data block (or to another data block to which the same duplicate data is copied). Instead of including block pointers to the first and second data blocks, the respective direct metadata nodes of the first and second data object can be updated to include object references to the de-duplication object to indirectly reference the duplicate data block.

Figure 7A:
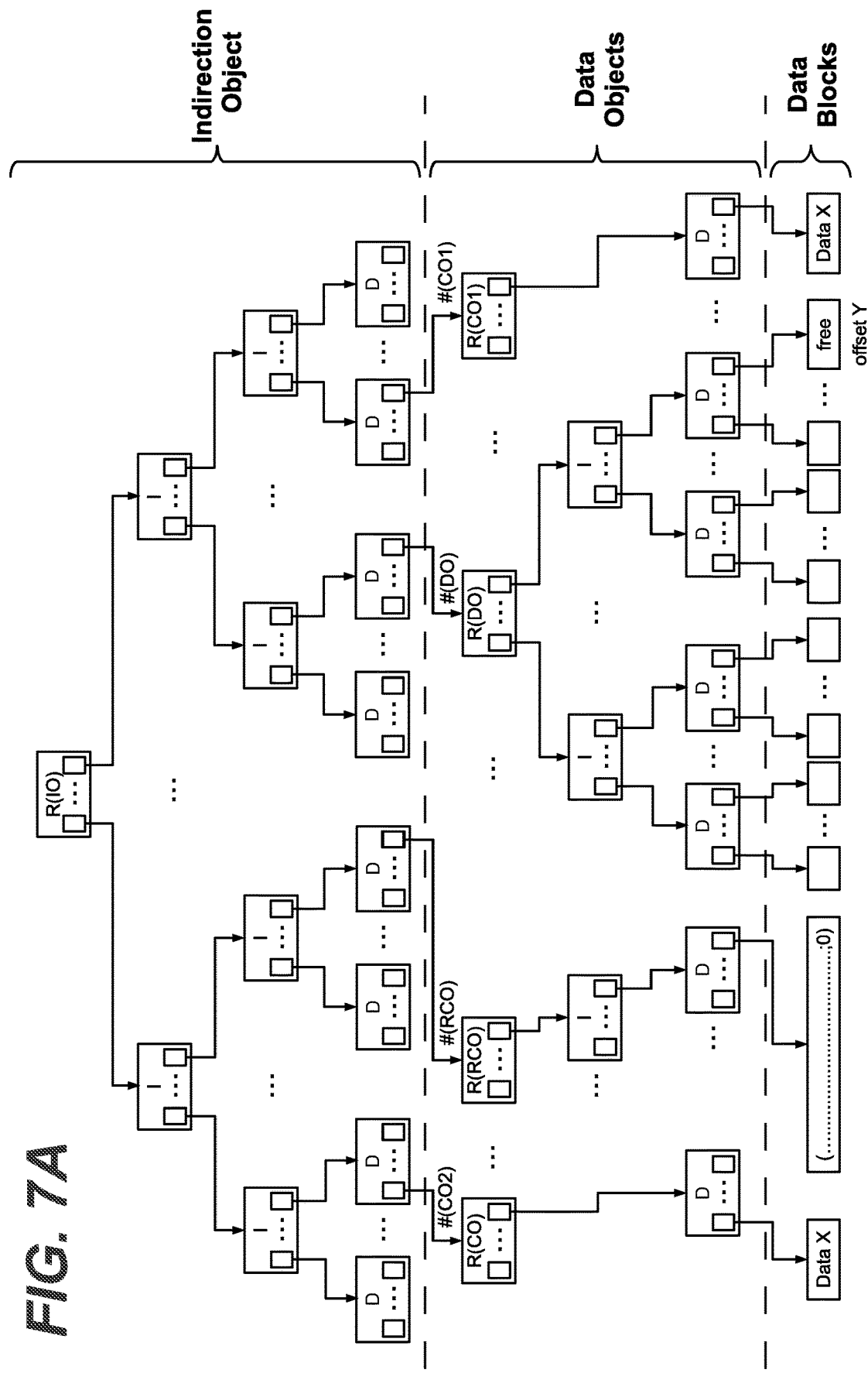
FIGS. 7A and 7B exemplarily show schematic diagrams of an exemplary metadata tree structure on a node apparatus exemplarily illustrating de-duplication of data according to some exemplary embodiments.
Figure 7B:
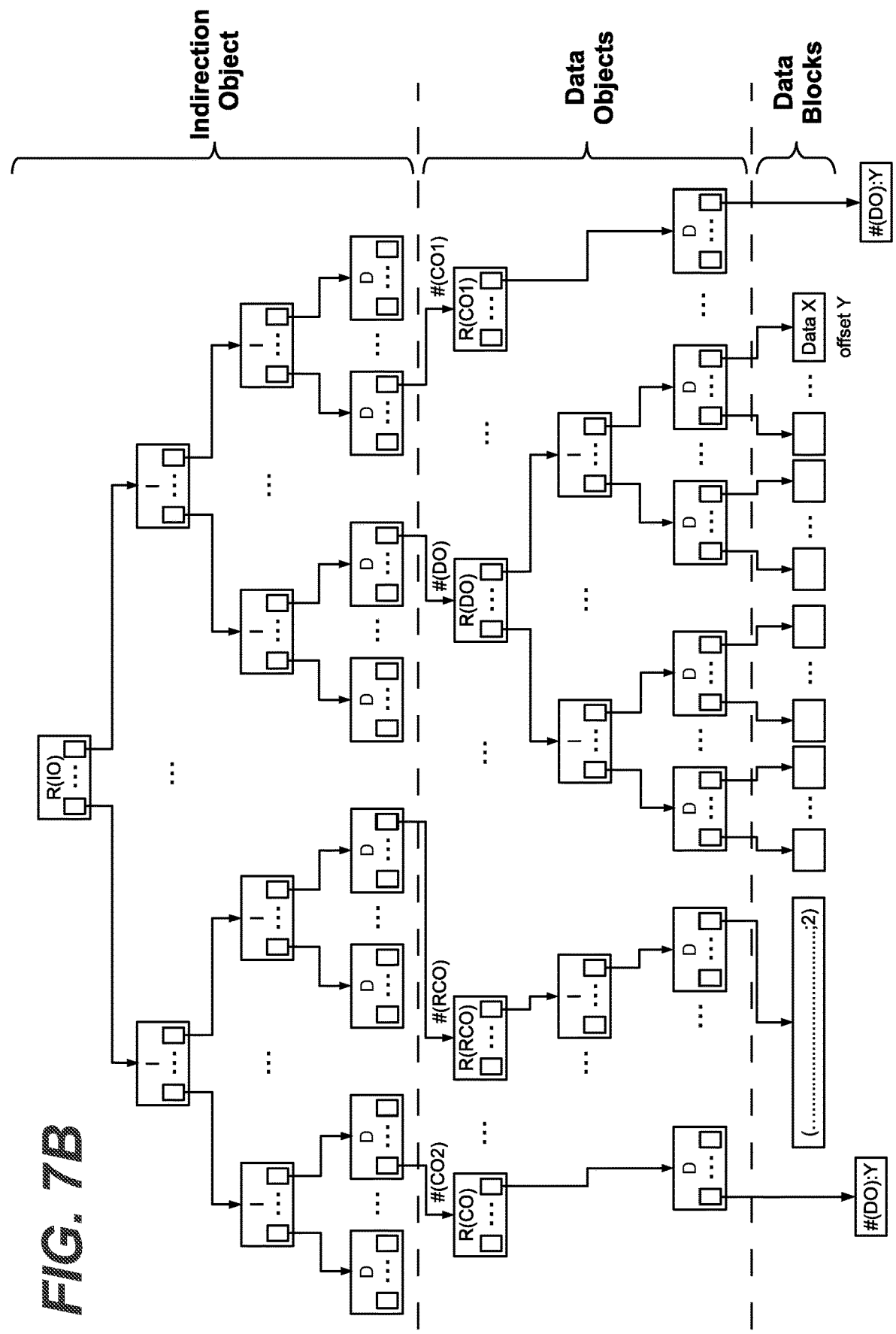

For example, FIGS. 7A and 7B exemplarily show schematic diagrams of an exemplary metadata tree structure on a node apparatus exemplarily illustrating de-duplication of data according to some exemplary embodiments.

In FIG. 7A, e.g. based upon the general metadata tree structure of FIG. 6, a metadata structure exemplarily includes the metadata tree structure of the indirection object.

Exemplarily, the direct metadata nodes of the indirection objects include pointers to root metadata nodes of two different child objects CO1 and CO2 (which may be child objects of the same large data object of different data objects, and/or which may be stored to storage devices on the same or different node apparatuses of the cluster system).

Exemplarily, the object numbers (object identifiers) of the child objects are given as #(CO1) and #(CO2), and may be allocated as discussed above (e.g. based on a deterministic algorithm). The object numbers (object identifiers) of the child objects may additionally refer to offsets of the respective root metadata nodes of the child objects in the indirection object.

Exemplarily, a data block pointed to by a block pointer of a direct metadata node of the first child object CO1 stores data referred to as "DATA X", and a data block pointed to by a block pointer of a direct metadata node of the second child object CO2 stores the same (duplicate) data referred to as "DATA X" (e.g. determined based on a comparison of a hash value determined on the basis of the DATA X, or determined based on a binary bit-by-bit comparison thereof).

FIG. 7A further exemplarily shows the metadata structure of the de-duplication object including a root metadata node R(DO) of the de-duplication object. Exemplarily, the object number (object identifier) of the de-duplication object is given as #(DO), and may be allocated as discussed above (e.g. based on a deterministic algorithm). The object number (object identifier) of the de-duplication object may additionally refer to an offset of the respective root metadata node of the de-duplication object (or of a parent object thereof) in the indirection object.

Only exemplarily, the de-duplication object is a data object having three tree levels in FIG. 7A. In preferred embodiments, the de-duplication object may be separated into a parent object (of unlimited tree level number) and plural child objects (of a pre-determined tree level number, depending on the distribution size). Then, child objects of the de-duplication object would have the same tree level number as child objects of regular large data objects or as small data objects, in some exemplary embodiments.

Exemplary, at an offset Y of the de-duplication object, the de-duplication object references a free (non-used) data block in FIG. 7A. According to de-duplication according to some exemplary embodiments, the duplicate data DATA X can be copied to the free data block at offset Y of the de-duplication object, and instead of block pointers pointing to the data block(s) storing the data DATA X in the child objects CO1 and CO2, the respective direct metadata nodes of the child objects CO1 and CO2 are adapted (updated) to include (or indicate locations) of object references to the de-duplication object at offset Y, i.e. object references #(DO):Y indicating the object identifier (e.g. object number #(DO) of the de-duplication object) and the offset of the respective de-duplicated data block. A result can be exemplarily seen in FIG. 7B.

In some exemplary embodiments, in FIG. 7A, de-duplication may be achieved without copying the duplicate data DATA X but by adapting (updating) an unused block pointer of a direct node metadata of the de-duplication object to point to the data block previously pointed to by the first or second child object's direct metadata nodes' block pointers, and freeing the other data block.

VIII.3 Reference Count Object in Exemplary Embodiments

In the above de-dude-duplication process, it may be desired to keep track of a reference count to data blocks of the de-duplication object, e.g. in order to know when a data block used by the de-duplication object can be freed again and a block pointer of a direct metadata node of the de-duplication object could be re-used in de-duplication.

For example, each direct metadata node of the de-duplication object could store the respective associated reference count of the data blocks associated with the respective direct metadata node, and/or each block pointer of the direct metadata nodes of the de-duplication object could store the respective associated reference count of the data block associated with the respective block pointer.

However, in some exemplary embodiments, there can be provided another data object, referred to as reference count object storing data indicative of a reference count of data blocks used (referenced by) the de-duplication object. For example, the data of the reference count object could be a reference count list storing entries, each entry indicating a reference count of a data block used by the de-duplication object, or the data of the reference count object could be a reference count bit map indicating references counts of the data block used by the de-duplication object (e.g. similar to a free space bitmap used for allocation of data blocks).

The reference count object can be managed similar as the other data objects in the data system, in particular in connection with data distribution of and I/O access to data objects.

Accordingly, in some exemplary embodiments, the reference count object may be managed by a metadata tree structure similar to other data objects, e.g. in that a root metadata node of the reference count object is referenced by the indirection object (e.g. a pointer of a direct metadata node of the indirection object points to the root metadata node of the reference count object).

The root metadata node of the reference count object may include plural pointers (metadata node references) pointing to indirect and/or direct metadata nodes of the reference count object, and pointers (block references) of the direct metadata nodes of the reference count object may point to data blocks (e.g. similar to the direct metadata nodes of small and child data objects).

In principle the number of tree levels of the metadata tree structure of the reference count object may be unlimited, however, in preferred exemplary embodiments the reference count object is managed similar to other data objects as either a small data object, if the size of the reference count object is smaller than or equal to the distribution size being the unit of data distribution across the node apparatuses of the cluster system, or as a plurality of independent small data objects or even preferably as a large data object, if the size of the reference count object is larger than the distribution size.

In the latter case, the reference count object includes a parent object and plural child objects as described for regular data objects discussed above. Then, the reference count object is distributed across the node apparatuses of the cluster system in that the data of the reference count object is divided into plural data segments of the distribution size and each data segment is managed by a respective child object, and the child objects are stored in a distributed manner across the node apparatuses in accordance with above-described exemplary embodiments.

On the other hand, each of the child objects of the reference count object may be referenced by a respective object reference of a parent object (or parent object part) of the reference count object, and the parent object (or parent object parts) of the reference count object is distributed across the node apparatuses of the cluster system, and typically a parent object (or parent object part) of the reference count object on one of the node apparatuses points to child objects of the reference count object on the same node apparatus (e.g. unless the respective child object has been moved to another node apparatus for load balancing purposes).

Furthermore, since the reference count object is closely related to the de-duplication object, the distribution thereof across the node apparatuses is preferably synchronized and/or executed in accordance with each other. Preferably, the child objects of the reference count object are stored on and managed by the same node apparatus as the node apparatus storing and managing the associated child objects of the de-duplication object.

For example, a child object of the reference count object pointing to a data block including an indicator being indicative of a reference count of a certain data block of the de-duplication object is preferably stored on a same node apparatus as the respective child object of the de-duplication object pointing to the certain data block.

However, it is emphasized that a data block of the reference count object may include plural indicators being indicative of reference counts of plural data blocks of the de-duplication object.

For example, if the number of pointers per metadata node is, for example, 128 and the block size BS of data blocks is exemplarily fixed to 4 kB in exemplary embodiments, the maximal size of a child object (or small object) at a maximum of two tree levels per child object (or small object) is 64 MB. This amounts exemplarily to a number 16382 of data blocks of size 4kB per child object.

Then, assuming that the reference count object indicates a bitmap of 1 byte per reference count of a data block of the de-duplication object, this would require a data of 16 kB in total to indicate the reference counts of all data blocks of a child object of the de-duplication object. Therefore, a child object of the same number of blocks of the reference count object could be associated with more than 4000 de-duplication object's child objects.

For example, if the number of pointers per metadata node is, for example, 256 and the block size BS of data blocks is exemplarily fixed to 4 kB in exemplary embodiments, the maximal size of a child object (or small object) at a maximum of two tree levels per child object (or small object) is 256 MB. This amounts exemplarily to a number 65536 of data blocks of size 4 kB per child object.

Then, assuming that the reference count object indicates a bitmap of 1 byte per reference count of a data block of the de-duplication object, this would require a data of 64 kB in total to indicate the reference counts of all data blocks of a child object of the de-duplication object. Therefore, a child object of the same number of blocks of the reference count object could be associated with more than 4000 de-duplication object's child objects.

In the above examples there would be one-to-one correspondence of each byte of the reference count object being associated with a respective data block of the de-duplication object.

In order to reduce the number, it is possible in some exemplary embodiments to make the size of the child objects of the reference count object smaller, and reduce the distribution size. For example, the distribution size (child object size) of the reference count object could be made such that the data thereof indicates reference counts for a number of blocks that is equal to (or two, three, four or more times) the number of bocks of a child object of the de-duplication object.

For example, in the above example, the distribution size (child object size) of a reference count object could be selected as 16 kB while the distribution size for regular child objects is 64 MB, exemplarily, or could be selected as 64 kB while the distribution size for regular child objects is 256 MB. Such correspondence may be used to translate offsets in the de-duplication object to offsets in the reference count object (e.g. the reference count object offset N×1B corresponds to the de-duplication object offset N×4K).

Reducing the distribution size (child object size) of the reference count object can be achieved by reducing the maximum number of tree levels of the reference count object's child object compared to regular child objects, by reducing the number of pointers per metadata node of the reference count object' child object compared to the regular number of pointers per metadata node of other objects, and/or by reducing the block size.

Referring again to FIG. 7A and FIG. 7B, these also exemplarily show that a direct metadata node of the indirection object points to a root metadata node R(RCO) of the reference count object, referenced by the object identifier/object number #(RCO).

In a data block pointed to by a pointer of a direct metadata node of the reference count object includes a list of reference counts including the reference count "0" for the free (non-used) data block of the de-duplication object in FIG. 7A.

On the other hand, in FIG. 7B, after the duplicate data DATA X after de-duplication thereof is stored in the data block with offset Y in the duplication object, and since the data block is referenced by the two child objects CO1 and CO2 and therefore has a reference count 2, the respective data block pointed to by the pointer of the direct metadata node of the reference count object includes the list of reference counts including the updated reference count "2" for the now used data block of the de-duplication object in FIG. 7B.

Of course, if another data block of the same data (duplicate data) is identified, the respective data object can be modified as well to include an object reference to the de-duplication object at the respective offset thereof, and the corresponding reference count in the reference count object can be incremented.

On the hand, if the data is deleted in one of the data objects including an object reference to the de-duplication object at the respective offset thereof the corresponding reference count in the reference count object can be decremented.

In exemplary embodiments, when the reference count in the reference count object is decremented and reaches zero, indicating that the associated data block of the de-duplication object (or holding object) is not referenced anymore by any data object (e.g. small or child object), then the corresponding data block can be considered "free" to be re-used for new data block allocation in case of a holding object in exemplary embodiments for newly written data blocks or at least to be re-used in the de-duplication object in other exemplary embodiments when newly de-duplicating another previously written data block and its one or more detected duplicate(s), so as to be re-usable for new data writes or new de-duplication data.

Also, it is to be noted that such decrementing and incrementing processing performed on the reference count object as discussed above for exemplary embodiments may lead to multiple and highly frequent random updates (which may include not only random writes but also random reads for reading metadata of the tree structure of the reference count object).

In preferred exemplary embodiments, the reference count object may be divided into plural regions and a respective change list or update list may be managed for each region so that the updates of the reference count object can be done by region based on accumulated updates according to the respective change lists or update lists.

Preferably, processing of updates of the reference count object may be done in a similar way as update processing performed in connection with updates of a free space object indicating free and used blocks for allocation purposes. Also, in other embodiments the reference count object may be used also for allocation purposes, specifically in connection with embodiments such as those using a holding object.

The reference count object may exemplarily be managed as a bit map, and the above processing of updates of the reference count object may be performed such as described for exemplary embodiments of bitmap processing or free space allocation object update processing as exemplarily disclosed in international patent application PCT/US16/31811 (PCT/US2016/031811) which was filed on May 11, 2016 with the title "DATA STORAGE SYSTEM, PROCESS AND COMPUTER PROGRAM FOR SUCH DATA STORAGE SYSTEM FOR REDUCING READ AND WRITE AMPLIFICATIONS", and which is incorporated herein by reference.

Figure 8:
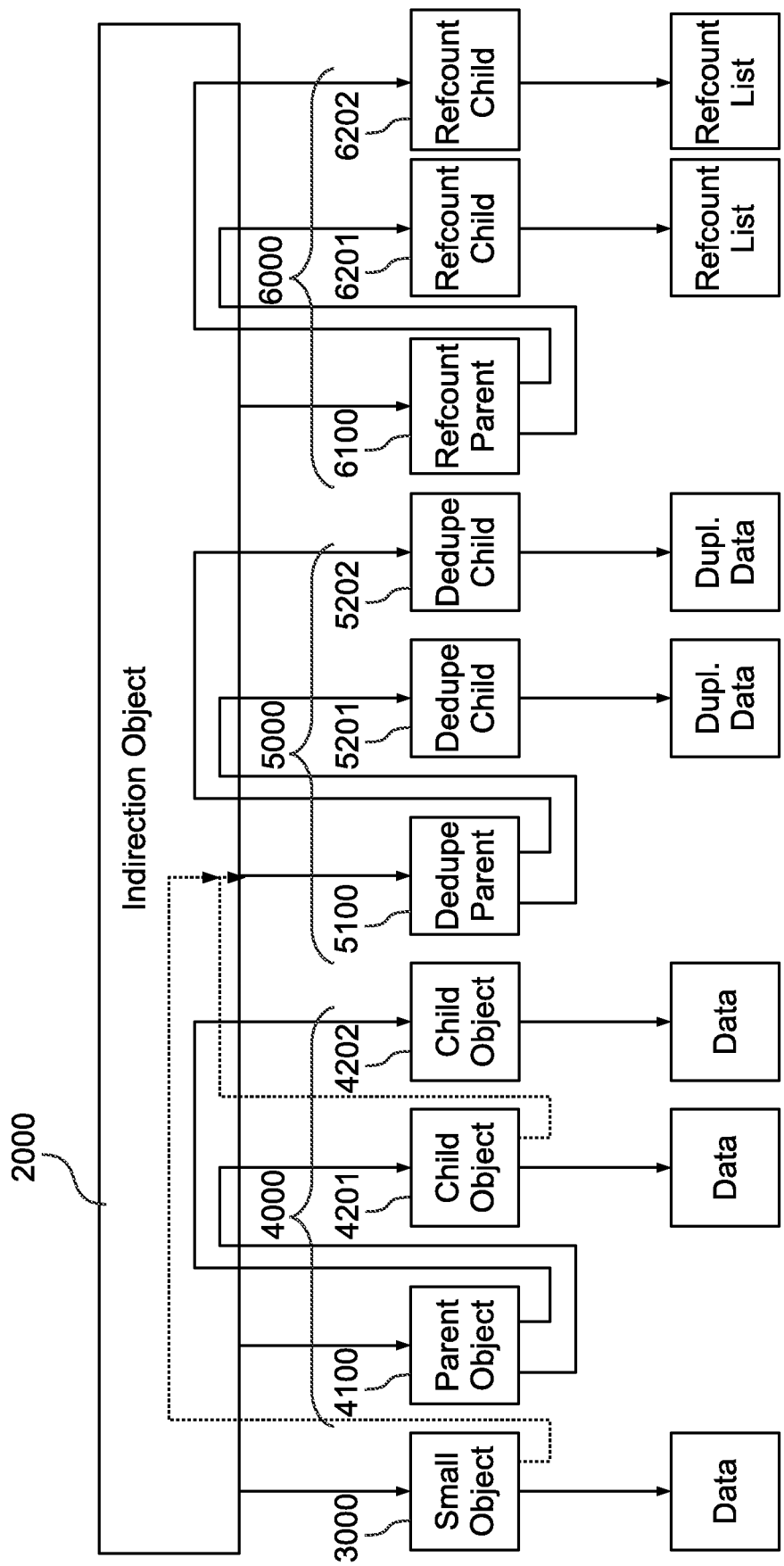
FIG. 8 exemplarily shows a schematic diagram of an exemplary metadata tree structure on a node apparatus including a de-duplication object and a reference count object according to some exemplary embodiments.

VIII.4 De-Duplication Object and Reference Count Object in Exemplary Embodiments FIG. 8 exemplarily shows a schematic diagram of an exemplary metadata tree structure on a node apparatus including a de-duplication object and a reference count object according to some exemplary embodiments.

FIG. 8 exemplarily shows a small data object 3000, a large data object 4000 including the parent object 4100 and child objects 4201 and 4202, as well as the de-duplication object 5000 and the reference count object 6000 being pointed to by the indirection object 2000.

Exemplarily, the de-duplication object 5000 includes a parent object 5100 of the de-duplication object 5000 as well as child objects 5201 and 5202 of the de-duplication object 5000, and the reference count object 6000 includes a parent object 6100 of the reference count object 6000 as well as child objects 6201 and 6202 of the reference count object 6000.

The parent objects 4100, 5100 and 6100 respectively point to their respective child objects via object references through the indirection object 2000.

Exemplarily, the small data object 3000 as well as the child objects 4201 and 4202 of the large data object 4000 point to data (in units of blocks by respective block pointers). Similarly, the child objects 5201 and 5202 of the de-duplication object 5000 point to de-duplicated data (in units of blocks by respective block pointers), and the child objects 6201 and 6202 of the reference count object 6000 point to data (in units of blocks by respective block pointers) indicative of reference counts of the de-duplicated data blocks of the de-duplication object 5000, e.g. as reference count lists or bitmap information indicative of reference counts.

Exemplarily, the small data object 3000 and the child object 4201 of the large data object 4000 include additional object references (dotted arrows) through the indirection object 2000 to the de-duplication object 5000 to reference duplicate data shared with other objects after de-duplication thereof.

IX. Holding Object in Exemplary Embodiments

In the above exemplary embodiments, direct metadata nodes of small data objects or of child objects of large data objects included block pointers to regular data in data blocks and optionally object references to the de-duplication object for indirectly pointing to de-duplicated data blocks shared with other objects (duplicate data).

However, in some exemplary alternative embodiments, it is possible to manage all data in a new object, exemplarily referred to as holding object. Then, all direct metadata nodes of small data objects or of child objects of large data objects include no direct block pointers to data in data blocks but only object references to the holding object for indirectly pointing to all data blocks independent of whether these are shared with other objects.

Accordingly, in some exemplary embodiments, the holding object may be managed by a metadata tree structure similar to other data objects, e.g. in that a root metadata node of the holding object is referenced by the indirection object (e.g. a pointer of a direct metadata node of the indirection object points to the root metadata node of the holding object).

The root metadata node of the holding object may include plural pointers (metadata node references) pointing to indirect and/or direct metadata nodes of the holding object, and pointers (block references) of the direct metadata nodes of the holding object may point to data blocks (e.g. similar to the direct metadata nodes of small and child data objects).

In principle the number of tree levels of the metadata tree structure of the holding object may be unlimited, however, in preferred exemplary embodiments the holding object is managed similar to other data objects as either a small data object, if the size of the holding object is smaller than or equal to the distribution size being the unit of data distribution across the node apparatuses of the cluster system, or as a plurality of independent small data objects or even preferably as a large data object, if the size of the holding object is larger than the distribution size.

In the latter case, the holding object includes a parent object and plural child objects as described for regular data objects discussed above. Then, the holding object is distributed across the node apparatuses of the cluster system in that the data of the holding object is divided into plural data segments of the distribution size and each data segment is managed by a respective child object, and the child objects are stored in a distributed manner across the node apparatuses in accordance with above-described exemplary embodiments.

On the other hand, each of the child objects of the holding object may be referenced by a respective object reference of a parent object (or parent object part) of the holding object, and the parent object (or parent object parts) of the holding object is distributed across the node apparatuses of the cluster system, and typically a parent object (or parent object part) of the holding object on one of the node apparatuses points to child objects of the holding object on the same node apparatus (e.g. unless the respective child object has been moved to another node apparatus for load balancing purposes).

As an advantage of the above, while the holding object may manage all data including non-duplicate data and de-duplicated data in the data storage system, the holding object may be distributed across the node apparatuses in a same efficient and reliable manner as other data objects, and the data can be moved for load balancing purposes (and can be re-distributed by node apparatus addition or node apparatus removal) in the same way as other objects. On the other hand, the holding object can be accessed within the whole data storage system, and efficiently allows data management and de-duplication of duplicate data on all node apparatuses in contrast to only on the respective node apparatuses individually and separately.

In general, according to exemplary embodiments, the direct metadata nodes of the holding object (or of child objects thereof) include block pointers pointing to regular (non-duplicate) data as wells as block pointers pointing to data blocks storing user data that has been de-duplicated (i.e. which may relate to multiple other data objects or at least different data blocks of the same or different data objects).

The direct metadata nodes of data objects (such as small data objects or child objects of large data objects) may include block pointers pointing to data blocks storing user data or may include object references to the holding object in connection with regular data blocks and de-duplicated data blocks.

Figure 9:
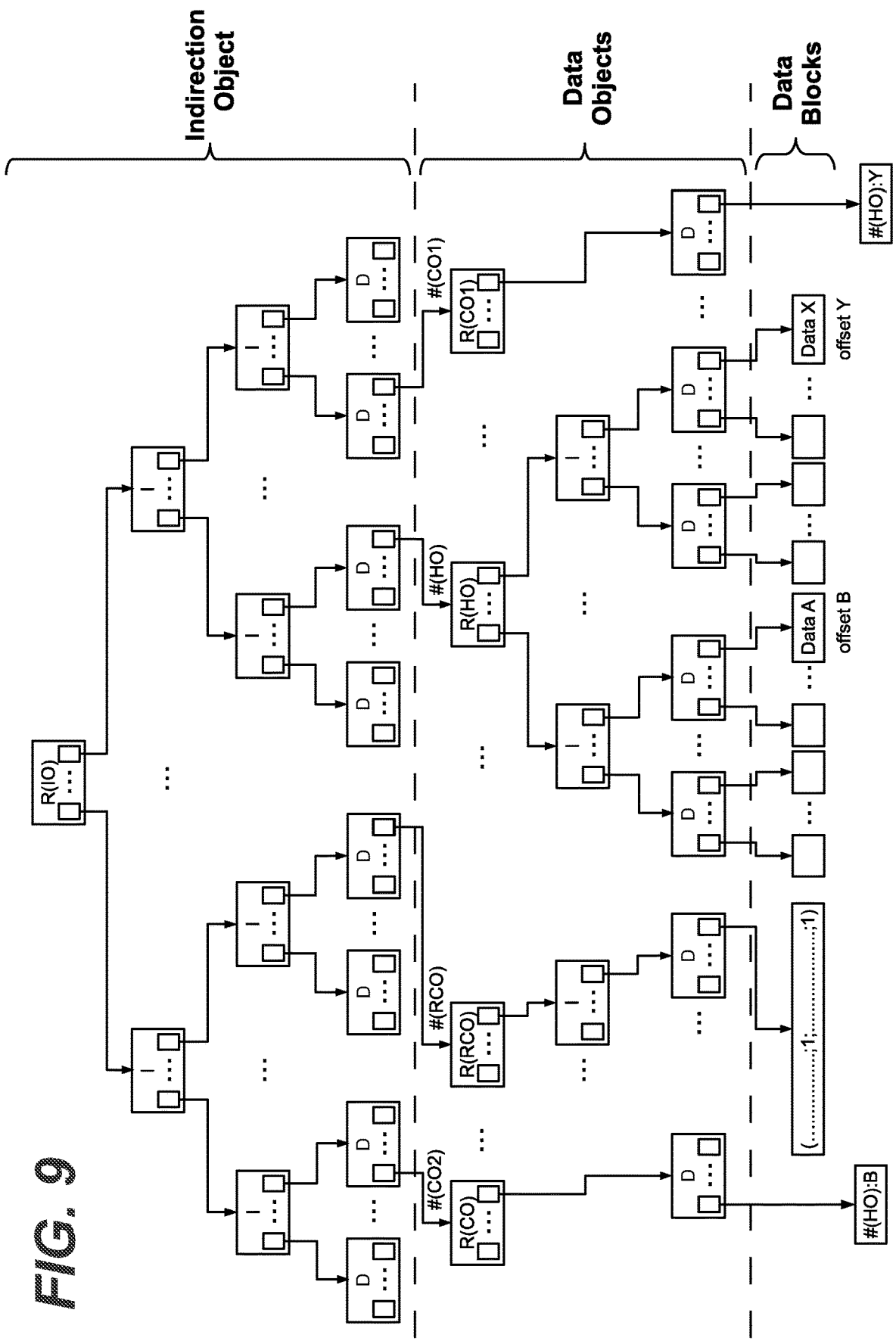
FIG. 9 exemplarily shows a schematic diagram of an exemplary metadata tree structure on a node apparatus exemplarily illustrating object-based data holding according to some exemplary embodiments.

For example, FIG. 9 exemplarily shows a schematic diagram of an exemplary metadata tree structure on a node apparatus exemplarily illustrating object-based data holding according to some exemplary embodiments.

In FIG. 9, e.g. based upon the general metadata tree structure of FIG. 6, a metadata structure exemplarily includes the metadata tree structure of the indirection object.

Exemplarily, the direct metadata nodes of the indirection objects include pointers to root metadata nodes of two different child objects CO1 and CO2 (which may be child objects of the same large data object of different data objects, and/or which may be stored to storage devices on the same or different node apparatuses of the cluster system).

Exemplarily, the object numbers (object identifiers) of the child objects are given as #(CO1) and #(CO2), and may be allocated as discussed above (e.g. based on a deterministic algorithm). The object numbers (object identifiers) of the child objects may additionally refer to offsets of the respective root metadata nodes of the child objects in the indirection object.

FIG. 9 further exemplarily shows the metadata structure of the holding object including a root metadata node R(HO) of the holding object. Exemplarily, the object number (object identifier) of the holding object is given as #(HO), and may be allocated as discussed above (e.g. based on a deterministic algorithm). The object number (object identifier) of the holding object may additionally refer to an offset of the respective root metadata node of the holding object (or of a parent object thereof) in the indirection object.

Only exemplarily, the holding object is a data object having three tree levels in FIG. 9. In preferred embodiments, the holding object may be separated into a parent object (of unlimited tree level number) and plural child objects (of a pre-determined tree level number, depending on the distribution size). Then, child objects of the holding object would have the same tree level number as child objects of regular large data objects or as small data objects, in some exemplary embodiments.

Exemplary, at an offset Y of the holding object, a block pointer of a direct metadata node of the holding object points to a data block storing the data referred to as DATA X. At the same time, since this data is associated with a data block of the child object CO1, a direct metadata node of the child object CO1 has an object reference pointing to the offset Y in the object identified by the object identifier (object number) #(HO), i.e. in the holding object. At an offset B of the holding object, a block pointer of a direct metadata node of the holding object points to a data block storing the data referred to as DATA A. At the same time, since this data is associated with a data block of the child object CO2, a direct metadata node of the child object CO2 has an object reference pointing to the offset B in the object identified by the object identifier (object number) #(HO), i.e. in the holding object.

Accordingly, by such object references, all data objects can indirectly point to data which is managed by the holding object, including regular (non-duplicated) data as well as de-duplicated data, the latter analogously to the above de-duplication object.

Here, it may also be desired to keep track of a reference count to data blocks of the holding object, e.g. in order to know how many objects share a certain data block and when a data block used by the holding object can be freed again and a block pointer of a direct metadata node of the holding object could be re-used.

For example, each direct metadata node of the holding object could store the respective associated reference count of the data blocks associated with the respective direct metadata node, and/or each block pointer of the direct metadata nodes of the holding object could store the respective associated reference count of the data block associated with the respective block pointer.

However, in some exemplary embodiments, there can be provided another data object, referred to as reference count object storing data indicative of a reference count of data blocks used (referenced by) the holding object, similar to the reference count object described above. For example, the data of the reference count object could be a reference count list storing entries, each entry indicating a reference count of a data block used by the holding object, or the data of the reference count object could be a reference count bit map indicating references counts of the data block used by the holding object (e.g. similar to a free space bitmap used for allocation of data blocks).

The reference count object can be managed similar as the other data objects in the data system, in particular in connection with data distribution of and I/O access to data objects, as already discussed above.

Referring again to FIG. 9, it also exemplarily shows that a direct metadata node of the indirection object points to a root metadata node R(RCO) of the reference count object, referenced by the object identifier/object number #(RCO).

In a data block pointed to by a pointer of a direct metadata node of the reference count object includes a list of reference counts including the reference count "1" for the data block at offset B in the holding object storing the data of DATA A as referenced (exemplarily only) by the child object CO2 and further including the reference count "1" for the data block at offset Y in the holding object storing the data of DATA X as referenced (exemplarily only) by the child object CO1.

Of course, if another data block of the same data (duplicate data) is identified, the respective data object can be modified as well to include an object reference to the holding object at the respective offset thereof, and the corresponding reference count in the reference count object can be incremented.

On the hand, if the data is deleted in one of the data objects including an object reference to the holding object at the respective offset thereof the corresponding reference count in the reference count object can be decremented.

Figure 10:
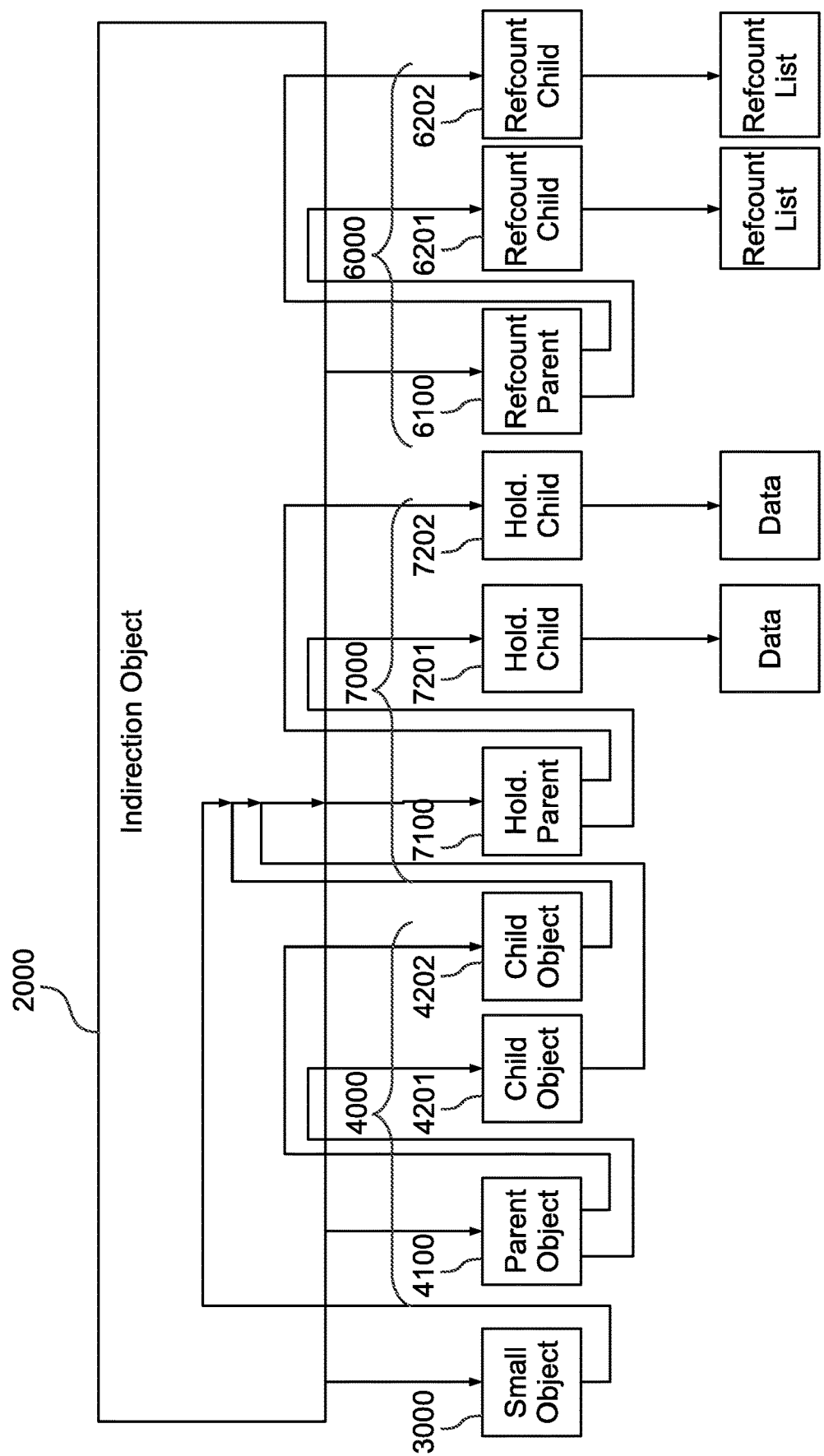
FIG. 10 exemplarily shows a schematic diagram of an exemplary metadata tree structure on a node apparatus including a holding object and a reference count object according to some exemplary embodiments.

FIG. 10 exemplarily shows a schematic diagram of an exemplary metadata tree structure on a node apparatus including a holding object and a reference count object according to some exemplary embodiments.

FIG. 10 exemplarily shows a small data object 3000, a large data object 4000 including the parent object 4100 and child objects 4201 and 4202, as well as the holding object 7000 and the reference count object 6000 being pointed to by the indirection object 2000.

Exemplarily, the holding object 7000 includes a parent object 7100 of the holding object 7000 as well as child objects 7201 and 7202 of the holding object 7000, and the reference count object 6000 includes a parent object 6100 of the reference count object 6000 as well as child objects 6201 and 6202 of the reference count object 6000.

The parent objects 4100, 7100 and 6100 respectively point to their respective child objects via object references through the indirection object 2000.

Exemplarily, the small data object 3000 as well as the child objects 4201 and 4202 of the large data object 4000 indirectly point to data (in units of blocks) by including object references through the indirection object 2000 to the holding object 7000 to reference all data including regular data as well as duplicate data shared with other objects after de-duplication thereof The child objects 7201 and 7202 of the holding object 7000 point to data (in units of blocks by respective block pointers), and the child objects 6201 and 6202 of the reference count object 6000 point to data (in units of blocks by respective block pointers) indicative of reference counts of the data blocks of the holding object 7000, e.g. as reference count lists or bitmap information indicative of reference counts.

Accordingly, in the example, none of the small data objects or child objects of large data objects directly point to data blocks by block pointers but only include object references to the holding object, and the holding object holds and manages all data referenced by all small data objects or child objects of large data objects in the data storage system.

The relationship between the reference count object and the holding object may be similar to a relationship between the reference count object and the de-duplication object in the above description of exemplary embodiments.

An advantage of the holding object is that de-duplication of a first duplicate block can be performed more efficiently than in the case of a de-duplication object, since upon detecting the first duplicate data block (second write of duplicate date), the data block does not need to be written and only the pointer of its object needs to be updated to point to the associated data block in the holding object, and it (and/or rather the originally written data block) does not have to be moved into the de-duplication object. This will be described in more detail below for some exemplary embodiments. However, upon writing the second duplicate (third write of the same duplicate data), the processing of the holding object and the de-duplication object may be very similar or identical in exemplary embodiments.

Figure 11:
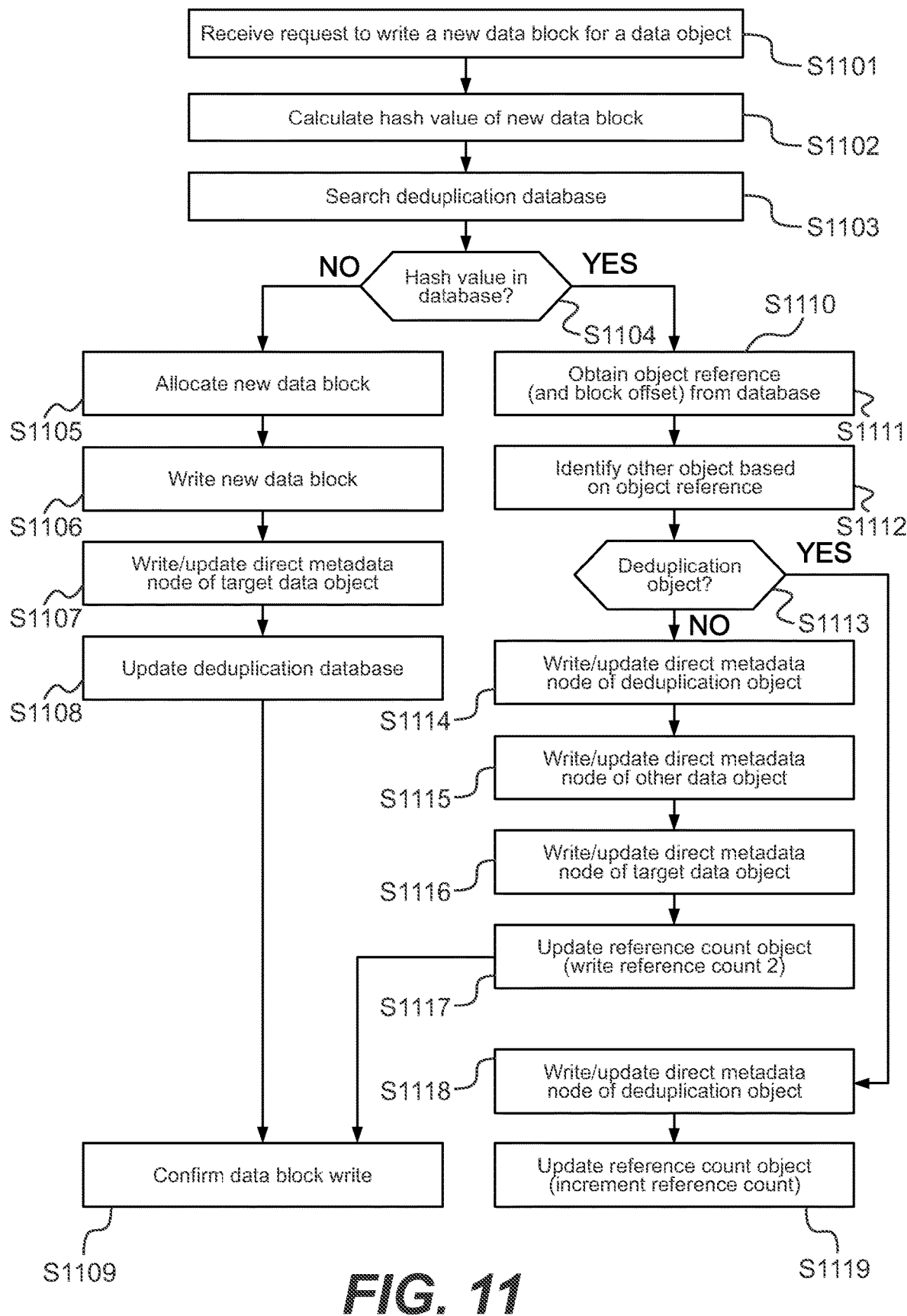
FIG. 11 exemplarily illustrates a flow chart of writing a new data block in connection with de-duplication processing using a de-duplication object according to some exemplary embodiments.

X. De-Duplication Processing in Connection With a Data Block Write in Exemplary Embodiments X.1 De-Duplication Processing Using a De-Duplication Object in Exemplary Embodiments FIG. 11 exemplarily illustrates a flow chart of writing a new data block in connection with de-duplication processing using a de-duplication object according to some exemplary embodiments.

This exemplary flow chart assumes that a de-duplication object as described in exemplary embodiments above exists, and a data write request is received that requires to write at least one data block for a target data object (e.g. being a small data object or a large data object). This may be a data write of writing one or more new data blocks or modifying one or more previously written data blocks.

In step S1101, the request to write a new data block for a target data object is received. The request may be received at any receiving node apparatus in the cluster. The receiving node may determine the location of the target data object (or a designated location of a child object thereof) based on the deterministic algorithm and forward the request to a node apparatus being designated to store (or at least manage a location of) the target data object or a target child object thereof.

In step S1102, a hash value of the data of the data block to be written is calculated by using a pre-determined hashing algorithm (such as e.g. SHA-256), and in step S1102 a de-duplication database is searched for the calculated hash value.

The de-duplication database is a database that stores a list of previously written data blocks and associated hash values. For each entry, the de-duplication database may store additional information such as location information (e.g. an object reference and offset of the block in the object). By referencing the stored hash values in the de-duplication database and comparing them to the calculated hash value, it may be determined whether a duplicate data block of the data block to be written is already stored in the data storage system.

It is to be noted that the de-duplication database may store hash values for each previously written data block in some exemplary embodiments, but in other embodiments the de-duplication database may store only hash values for a subset of the previously written data block. Also, the de-duplication database may maintain all stored hash values or may delete stored hash values based on one or more criteria or parameters, e.g. based on a total number of stored hash values, a time that the respective hash value has not been requested anymore, the time since a data block of the respective hash value has been originally written, or other criteria or parameters.

The de-duplication database may be stored on all node apparatuses as a whole, on a centralized database server connected to the data storage system, or be preferably distributed across the node apparatuses of the cluster system, such that each node apparatus stores a part of the de-duplication database. For example, each node apparatus may store a part of the de-duplication database corresponding to a respective range of hash values.

Accordingly, the search of step S1103 may involve messages and database search requests as well as database search result responses being exchanged among the node apparatuses of the cluster system.

In step S1104, it is determined whether an entry already exists in the de-duplication database for the respective calculated hash value, i.e. to determine whether the data block to be written is a duplicate data block or not.

If step S1104 returns NO, and it is determined that the data block to be written is an original data block for which no duplicate data block yet exists, the process continues with step S1105 and allocates a free storage block for writing the new data block and writes the data block in step S1106 to the newly allocated storage block.

In accordance with writing the data block, in step S1107, the corresponding direct metadata node of the target data object (or child object thereof) is written (optionally including writing and/or updating of other metadata nodes of the metadata tree structure) or at least updated, so as to contain a block pointer to the newly written data block.

In step S1108, the de-duplication database is updated, e.g. in that a new entry is added in the de-duplication database including the hash value of the newly written data block. Further exemplarily, the de-duplication database may be updated to store additional information such as location information (e.g. an object reference and offset of the block in the object) for the newly written data block.

In exemplary embodiments, the data block may be written to storage device(s) on the same node apparatus that stores the metadata structure of the target data object (or the target child object thereof), preferably so that the direct metadata node pointing to the data block is stored on the same node apparatus. In other exemplary embodiments, the newly written data block may be written to storage device(s) on the same node apparatus that stores a part of the de-duplication database including the entry for the newly written data block. This may be the same node apparatus as the node apparatus that stores the metadata structure of the target data object (or the target child object thereof), or it may be a different node apparatus, e.g. in exemplary embodiments in which node apparatuses store parts of the de-duplication database according to hash value ranges.

In step S1109, the write request is acknowledged by issuing a write response to confirm the data block write.

On the other hand, if step S1104 returns YES, and the calculated hash value already exists in the de-duplication database, it is determined that a duplicate data block already exists in the storage system and a de-duplication process may be executed. This may include further verifications of re-calculating the hash value of the duplicate data block and comparing it with the calculated hash value to verify whether the hash values match. Alternatively, this may also include an (optional or configurable) comparison of the data blocks on a binary bit-by-bit level.

In step S1110, based on an entry in the de-duplication database associated with the respective hash value, an object reference (and optionally a block offset) relating to the other data object having the already stored duplicate data block is obtained from the de-duplication database, and the respective other data object is identified in step S1112.

In step S1113, it is determined whether the identified other object is the de-duplication object (i.e. indicating that the duplicate data block has been previously de-duplicated already) or another regular data object.

If the step S1113 returns NO and the other object is a regular data object such as a small data object or a child object of a large data object, the method continues with writing (or updating) the corresponding direct metadata node of the de-duplication object (optionally including writing and/or updating of other metadata nodes of the metadata tree structure), so as to contain a block pointer to the duplicate data block of the other object based on the location information indicated in the de-duplication database. This may involve referring to the previous direct metadata node of the other object and reading the corresponding block pointer to the duplicate data block of the other object. This may optionally also include copying or newly writing the data block on another node apparatus (such as e.g. the node apparatus of the target data object or a node apparatus storing a part of the de-duplication database having the entry relating to the data block). However, in preferred embodiments, the corresponding direct metadata node of the de-duplication object is written or updated on the same node apparatus storing already the duplicate data block, so that no new data block needs to be written or copied Furthermore, in step S1115, the corresponding direct metadata node of the other data object (or child object thereof) is written (optionally including writing and/or updating of other metadata nodes of the metadata tree structure) or at least updated, so as to contain an object reference with a corresponding offset to the de-duplication object for indirectly pointing to the duplicate data block, and, in step S1116, the corresponding direct metadata node of the target data object (or child object thereof) is written (optionally including writing and/or updating of other metadata nodes of the metadata tree structure) or at least updated, so as to also contain an object reference with a corresponding offset to the de-duplication object for indirectly pointing to the duplicate data block.

In step S1117, the reference count object is updated to indicate the reference count 2 for the duplicate data block of the de-duplication object being now referenced by two data objects.

In step S1109, the write request is acknowledged by issuing a write response to confirm the data block write.

On the other hand, if the step S1113 returns YES and the other object is the de-duplication object, and it is thereby determined that the duplicate data block has been de-duplicated before, the method continues with step S1118 and the corresponding direct metadata node of the target data object (or child object thereof) is written (optionally including writing and/or updating of other metadata nodes of the metadata tree structure) or at least updated, so as to also contain an object reference with a corresponding offset to the de-duplication object for indirectly pointing to the duplicate data block.

In step S1119, the reference count object is updated to indicate that the reference count is incremented by one unit (plus one additional reference count) for the duplicate data block of the de-duplication object being now referenced by at least three or more data objects.

In step S1109, the write request is acknowledged by issuing a write response to confirm the data block write.

As can be seen above, regarding writes (data writes and metadata node writes), the first write of a data block (step S1104 gives NO) includes two writes (data block and one direct metadata node; steps S1106 and S1107), the second write of a duplicate data block (step S1113 gives NO) includes three writes (three direct metadata nodes; steps S1114, S1115 and S1116), and the third write and any further writes of a duplicate data block (step S1113 gives YES) includes one write (one direct metadata node; step S1118).

Accordingly, while the first write includes two write operations and the second write includes three write operations (the first two writes including five write operations), all further writes of duplicate data of a same data block are very efficient and include only one write operation.

X.2 De-Duplication Processing Using a Holding Object in Exemplary Embodiments

Figure 12:
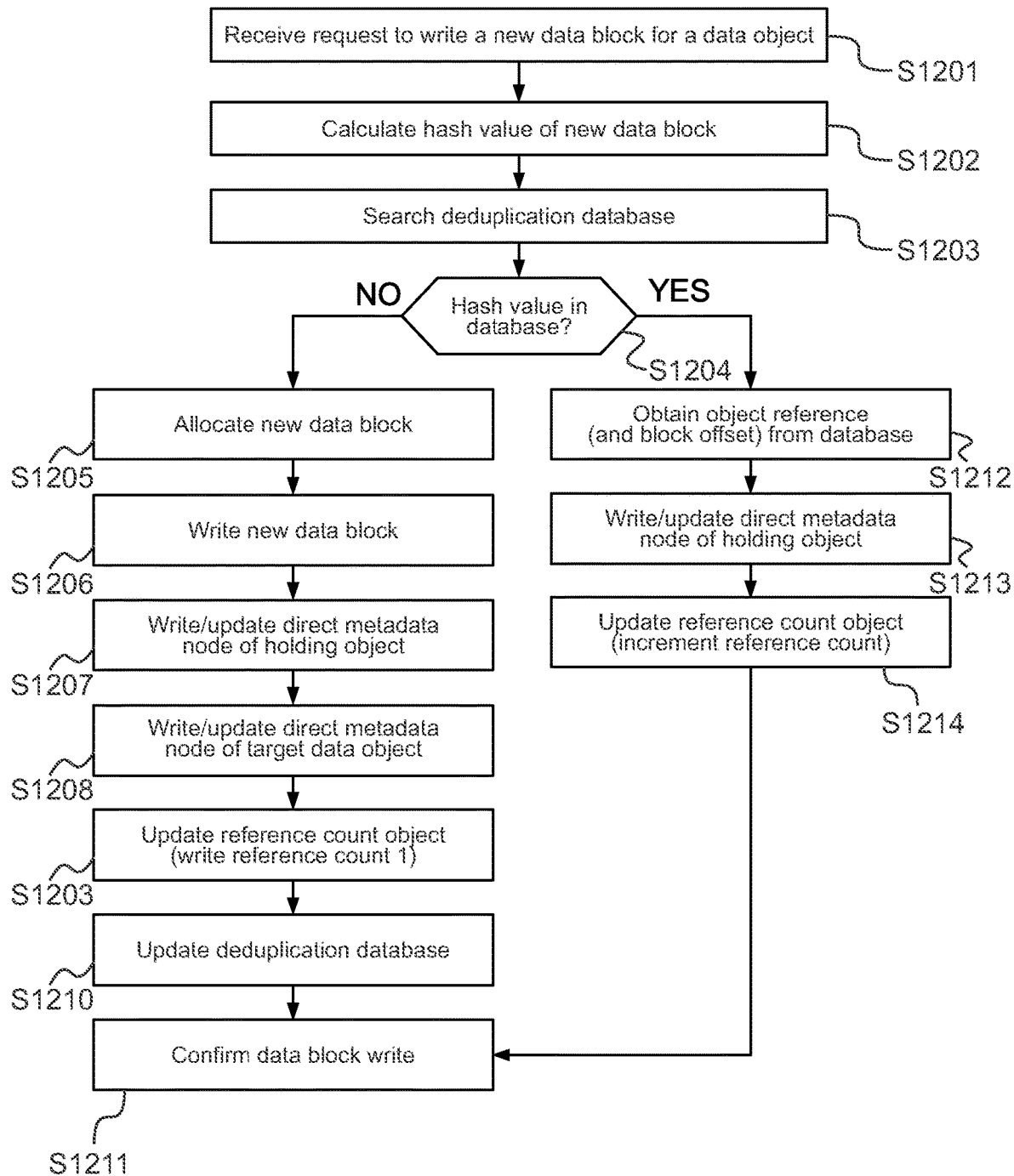
FIG. 12 exemplarily illustrates a flow chart of writing a new data block in connection with de-duplication processing using a holding object according to some exemplary embodiments.

FIG. 12 exemplarily illustrates a flow chart of writing a new data block in connection with de-duplication processing using a holding object according to some exemplary embodiments.

This exemplary flow chart assumes that a holding object as described in exemplary embodiments above exists, and a data write request is received that requires to write at least one data block for a target data object (e.g. being a small data object or a large data object). This may be a data write of writing one or more new data blocks or modifying one or more previously written data blocks.

In step S1201, the request to write a new data block for a target data object is received. The request may be received at any receiving node apparatus in the cluster. The receiving node may determine the location of the target data object (or a designated location of a child object thereof) based on the deterministic algorithm and forward the request to a node apparatus being designated to store (or at least manage a location of) the target data object or a target child object thereof.

In step S1202, a hash value of the data of the data block to be written is calculated by using a pre-determined hashing algorithm (such as e.g. SHA-256), and in step S1202 a de-duplication database is searched for the calculated hash value.

As above, the de-duplication database is a database that stores a list of previously written data blocks and associated hash values. For each entry, the de-duplication database may store additional information such as location information (e.g. an object reference and offset of the block in the object). By referencing the stored hash values in the de-duplication database and comparing them to the calculated hash value, it may be determined whether a duplicate data block of the data block to be written is already stored in the data storage system.

The de-duplication database may be stored on all node apparatuses as a whole, on a centralized database server connected to the data storage system, or be preferably distributed across the node apparatuses of the cluster system, such that each node apparatus stores a part of the de-duplication database. For example, each node apparatus may store a part of the de-duplication database corresponding to a respective range of hash values.

Accordingly, the search of step S1203 may involve messages and database search requests as well as database search result responses being exchanged among the node apparatuses of the cluster system.

In step S1204, it is determined whether an entry already exists in the de-duplication database for the respective calculated hash value, i.e. to determine whether the data block to be written is a duplicate data block or not.

If step S1204 returns NO, and it is determined that the data block to be written is an original data block for which no duplicate data block yet exists, the process continues with step S1205 and allocates a free storage block for writing the new data block and writes the data block in step S1206 to the newly allocated storage block.

In accordance with writing the data block, in step S1207, the corresponding direct metadata node of the holding object (or child object thereof) is written (optionally including writing and/or updating of other metadata nodes of the metadata tree structure) or at least updated, so as to contain a block pointer to the newly written data block.

In step S1208, the corresponding direct metadata node of the target data object (or child object thereof) is written (optionally including writing and/or updating of other metadata nodes of the metadata tree structure) or at least updated, so as to also contain an object reference with a corresponding offset to the holding object for indirectly pointing to the newly written data block.

In step S1209, the reference count object is updated to indicate the reference count 1 for the newly written data block of the holding object being now referenced by an object reference of the target data object.

In step S1210, the de-duplication database is updated, e.g. in that a new entry is added in the de-duplication database including the hash value of the newly written data block. Further exemplarily, the de-duplication database may be updated to store additional information such as location information (e.g. an object reference and offset of the block in the object) for the newly written data block.

In exemplary embodiments, the data block may be written to storage device(s) on the same node apparatus that stores the metadata structure of the target data object (or the target child object thereof) and/or on the same node apparatus that stores the metadata structure of the holding object (or the target child object thereof), preferably so that the direct metadata node pointing to the data block is stored on the same node apparatus. In other exemplary embodiments, the newly written data block may be written to storage device(s) on the same node apparatus that stores a part of the de-duplication database including the entry for the newly written data block. This may be the same node apparatus as the node apparatus that stores the metadata structure of the target data object (or the target child object thereof) and/or the holding object, or it may be a different node apparatus, e.g. in exemplary embodiments in which node apparatuses store parts of the de-duplication database according to hash value ranges.

In step S1211, the write request is acknowledged by issuing a write response to confirm the data block write.

On the other hand, if step S1204 returns YES, and the calculated hash value already exists in the de-duplication database, it is determined that a duplicate data block already exists in the storage system and a de-duplication process may be executed. This may include further verifications of re-calculating the hash value of the duplicate data block and comparing it with the calculated hash value to verify whether the hash values match. Alternatively, this may also include an (optional or configurable) comparison of the data blocks on a binary bit-by-bit level.

In step S1212, based on an entry in the de-duplication database associated with the respective hash value, an object reference (and optionally a block offset) relating to the holding object having the already stored duplicate data block is obtained from the de-duplication database.

In step S1213, the corresponding direct metadata node of the target data object (or child object thereof) is written (optionally including writing and/or updating of other metadata nodes of the metadata tree structure) or at least updated, so as to also contain an object reference with a corresponding offset to the holding object for indirectly pointing to the duplicate data block.

In step S1214, the reference count object is updated to indicate that the reference count is incremented by one unit (plus one additional reference count) for the duplicate data block of the de-duplication object being now referenced by at least two or more data objects.

In step S1211, the write request is acknowledged by issuing a write response to confirm the data block write.

As can be seen above, regarding writes (data writes and metadata node writes), the first write of a data block (step S1204 gives NO) includes three writes (data block and two direct metadata nodes; steps S1206, S1207 and S1208), the second write and any further writes of a duplicate data block (step S1204 gives YES) includes one write (one direct metadata node; step S1213).

Accordingly, while the first write includes three write operations, all further writes of duplicate data of a same data block are very efficient and include only one write operation (the first two writes including four write operations, so that for low number of writes, the holding object may lead to even more efficient de-duplication (especially in use cases where almost all data is very likely to have at least one data duplicate, i.e. each data block or at least a high fraction of all data blocks has at least one duplicate data block), while both processes perform very well for larger numbers of writes).

Such aspects refer to an advantage of the holding object that de-duplication of a first duplicate block can be performed more efficiently than in the case of a de-duplication object, since upon detecting the first duplicate data block (second write of duplicate date), the data block does not need to be written and only the pointer of its object needs to be updated to point to the associated data block in the holding object, and it (and/or rather the originally written data block) does not have to be moved into the de-duplication object.

As will be appreciated by one of skill in the art, the present invention and aspects and exemplary embodiments, as described hereinabove and in connection with the accompanying figures, may be embodied as a method (e.g., a computer-implemented process, a business process, or any other process), apparatus (including a device, machine, system, computer program product, and/or any other apparatus), or a combination of the foregoing.

Accordingly, exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A non-transitory computer readable storage medium storing thereon a computer program including instructions to cause a computer to execute a method for managing de-duplication of data, in a data storage system, comprising:
    storing plural data objects to one or more storage devices of the data storage system in units of blocks;
    managing I/O access to the plural data objects based on metadata structures being respectively provided for each data object, each metadata structure including a root metadata node and including one or more direct metadata nodes, and further including one or more indirect metadata nodes; and
    storing a first metadata object for managing de-duplicated data blocks based on a metadata structure of the first metadata object including a root metadata node and including one or more direct metadata nodes, and further including one or more metadata indirect nodes;
    wherein at least one direct metadata node of the metadata structure of the first metadata object includes a block reference pointing to a de-duplicated data block being associated with two or more data, objects,
    wherein each of the metadata structures of the two or more data objects being associated with the de-duplicated data block includes a respective direct metadata node including an object reference to the metadata structure of the first metadata object; and
    wherein upon receiving a request to write a new data, block for a target data object;
    calculating a hash value for the new data block,
    searching the calculated hash value in the stored de-duplication database, and
    determining whether a duplicate data block corresponding to the new data block is already stored in the data storage system based on a result whether a matching hash value exists in the de-duplication database.

2. The non-transitory computer readable storage medium according to claim 1, further comprising:
    the de-duplication database, having stored therein hash values corresponding to data blocks being associated with data objects stored in the data storage system.

3. The non-transitory computer readable storage medium according to claim 1, wherein
    direct metadata nodes of the metadata structure of the first metadata object only include block references pointing to de-duplicated data blocks being associated with two or more data objects.

4. The non-transitory computer readable storage medium according to claim 1, wherein upon determining that the duplicate data block corresponding to the new data block is not yet stored in the data storage system,
    newly writing the data block in the data storage system, and
        writing or updating at least one direct metadata node of the target data object to include a block reference pointing to the newly written data block.

5. The non-transitory computer readable storage medium according to claim 1, wherein upon determining that the duplicate data block corresponding to the new data block is already stored in the data storage system and the duplicate data block is pointed to by a direct metadata node of another data object,
    writing or updating at least one direct metadata node of the first metadata object to include a block reference pointing to the duplicate data block,
    updating at least on direct metadata node of the other data object to include an object reference to the first metadata object to indirectly reference the duplicate data block, and
    wiring or updating at least one direct metadata node of the target data object to include an object reference to the first metadata object to indirectly reference the duplicate data block.

6. The non-transitory computer readable storage medium according to claim 1, wherein upon determining that the duplicate data block corresponding to the new data block is already stored in the data storage system and the duplicate data block is pointed to by a direct metadata node of the first metadata object, writing or updating at least on direct metadata node of the target data object to include an object reference to the first metadata object to indirectly reference the duplicate data block.

7. The non-transitory computer readable storage medium according to claim 1, wherein direct metadata nodes of data objects only include object references pointing to the metadata structure of the metadata object, and at least one direct metadata node of the metadata structure of the first metadata object includes a block reference pointing to a data block being associated with only one data object.

8. The non-transitory computer readable storage medium according to claim 1, wherein upon determining that the duplicate data block corresponding to the new data block is not yet stored in the data storage system, newly writing the data block in the data storage system,
writing or updating at least one direct metadata node of the first metadata object to include a block reference pointing to the newly written data block, and
writing or updating at least one direct metadata node of the target data object to include an object reference to the first metadata object to indirectly reference the newly written data block.

9. The non-transitory computer readable storage medium according to claim 1, wherein upon determining that the duplicate data block corresponding to the new data block is already stored in the data storage system, writing or updating at least one direct metadata node of the target data object to include an object reference to the first metadata object to indirectly reference the duplicate data block.

10. The non-transitory computer readable storage medium according to claim 1, the method further comprising:

storing a second metadata object for managing reference counts of data blocks based on a metadata structure of the second metadata object including a root metadata node and including one or more direct metadata nodes, and further including one or more metadata indirect nodes,
wherein at least one direct metadata node of the metadata structure of the second metadata object includes a block reference pointing to a data block storing information indicative of a reference count of a certain data block pointed to by a direct metadata node of the first metadata object.

11. The non-transitory computer readable storage medium according to claim 10, wherein the respective direct metadata node of the metadata structure of the second metadata object and the respective data block storing information indicative of the reference count of the certain data block pointed to by the respective direct metadata node of the first metadata object are stored on a same node apparatus in the data storage system as the certain data block and the respective direct metadata node of the first metadata object.

12. A data storage system for managing de-duplication of data in a data storage system, comprising:

a plurality of node apparatuses communicably connected to each other, each node apparatus comprising at least one processor and at least one memory;
the data storage system being configured to store plural data objects to one or more storage devices of the data storage system in units of blocks, the plural data objects being distributed across a group of node apparatuses of the data storage system;
the data storage system being configured to manage I/O access to the plural data objects based on metadata structures being respectively provided for each data object, each metadata structure including a root metadata node, one or more direct metadata nodes, one or more indirect metadata nodes; and
the data storage system being configured to store a metadata object for managing de-duplicated data blocks based on a metadata structure of the metadata object including a root metadata node, one or more direct metadata nodes, and one or more metadata indirect nodes;
wherein at least one direct metadata node of the metadata structure of the metadata object includes a block reference pointing to a de-duplicated data block being associated with two or more data objects,
wherein each of the metadata structures of the two or more data objects being associated with the de-duplicated data block includes a respective direct metadata node including an object reference to the metadata structure of the first metadata object; and
wherein upon receiving a request to write a new data block for a target data object;
calculating a hash value for the new data block,
searching the calculated hash value in the stored de-duplication database, and
determining whether a duplicate data block corresponding to the new data block is already stored in the data storage system based on a result whether a matching hash value exists in the de-duplication database.

13. A node apparatus for managing de-duplication of data in a data storage system, the apparatus, comprising:

an interface for establishing a communication connection to one or more other node apparatuses of the data storage system, each node apparatus comprising at least one processor and at least one memory;
one or more storage devices for storing data; and
a storage controller for controlling a data storage distribution in the data storage system, including:
storing plural data objects to one or more storage devices of the data storage system in units of blocks, the plural data objects being distributed across a group of node apparatuses of the data storage system;
managing I/O access to the plural data objects based on metadata structures being respectively provided for each data object, each metadata structure including a root metadata node, one or more direct metadata nodes, and one or more indirect metadata nodes; and
storing a metadata object for managing de-duplicated data blocks based on a metadata structure of the metadata object including a root metadata node, one or more direct metadata nodes, and one or more metadata indirect nodes;
wherein at least one direct metadata node of the metadata structure of the metadata object includes a block reference pointing to a de-duplicated data block being associated with two or more data objects,
wherein each of the metadata structures of the two or more data objects being associated with the de-duplicated data block includes a respective direct metadata node including an object reference to the metadata structure of the first metadata object; and
wherein upon receiving a request to write a new data, block for a target data object;
calculating a hash value for the new data block,
searching the calculated hash value in the stored de-duplication database, and
determining whether a duplicate data block corresponding to the new data block is already stored in the data storage system based on a result whether a matching hash value exists in the de-duplication database.

14. A method for managing de-duplication of data in a data storage system, comprising:

storing plural data objects to one or more storage devices of the data storage system in units of blocks;
managing I/O access to the plural data objects based on metadata structures being respectively provided for each data object, each metadata structure including a root metadata node, one or more direct, metadata nodes, and one or more indirect metadata nodes; and storing a metadata object for managing de-duplicated data blocks based on a metadata structure of the metadata object including a root metadata node, one or more direct metadata nodes, and one or more metadata indirect nodes;

wherein at least one direct metadata node of the metadata structure of the metadata object includes a block reference pointing to a de-duplicated data block being associated with two or more data objects, wherein each of the metadata structures of the two or more data, objects being associated with the de-duplicated data block includes a respective direct metadata node including an object reference to the metadata structure of the first metadata object, and wherein upon receiving a request to write a new data block for a target data object;

calculating a hash value for the new data block;

searching the calculated hash value in the stored de-duplication database; and determining whether a duplicate data block corresponding to the new data block is already stored in the data storage system based on a result whether a matching hash value exists in the de-duplication database.

* * * * *